(12) United States Patent
Kadowaki et al.

(10) Patent No.: US 8,027,237 B2
(45) Date of Patent: Sep. 27, 2011

(54) OPTICAL STORAGE MEDIUM, INFORMATION RECORDING APPARATUS, AND INFORMATION REPRODUCING APPARATUS

(75) Inventors: Shin-ichi Kadowaki, Hyogo (JP); Masaru Yamaoka, Osaka (JP); Takashi Yumiba, Kyoto (JP); Toyoji Gushima, Osaka (JP); Makoto Usui, Osaka (JP); Shin-ichi Tanaka, Kyoto (JP); Mitsurou Moriya, Nara (JP)

(73) Assignee: Panasonic Corporation, Osaka (JP)

( * ) Notice: Subject to any disclaimer, the term of this patent is extended or adjusted under 35 U.S.C. 154(b) by 6 days.

(21) Appl. No.: 12/500,161

(22) Filed: Jul. 9, 2009

(65) Prior Publication Data
US 2009/0268598 A1    Oct. 29, 2009

Related U.S. Application Data

(62) Division of application No. 10/609,709, filed on Jun. 30, 2003, now Pat. No. 7,649,824.

(30) Foreign Application Priority Data

Jul. 1, 2002    (JP) .................................. 2002-192614
Sep. 2, 2002   (JP) .................................. 2002-256970
Dec. 6, 2002   (JP) .................................. 2002-355846
Mar. 12, 2003  (JP) .................................. 2003-066455

(51) Int. Cl.
*G11B 7/00* (2006.01)
(52) U.S. Cl. .................. 369/59.25; 369/59.24
(58) Field of Classification Search .......... None
See application file for complete search history.

(56) References Cited

U.S. PATENT DOCUMENTS

| | | | |
|---|---|---|---|
| 4,872,152 A | 10/1989 | Tsuyoshi et al. |
| 5,572,502 A | 11/1996 | Naruse et al. |
| 5,608,715 A | 3/1997  | Yokogawa et al. |
| 5,696,757 A | 12/1997 | Ozaki et al. |
| 5,708,653 A | 1/1998  | Okada et al. |
| 5,790,487 A | 8/1998  | Moriya et al. |
| 5,850,379 A | 12/1998 | Moriya et al. |
| 5,999,504 A | 12/1999 | Aoki |
| 6,331,969 B1 | 12/2001 | Kobayashi et al. |
| 6,343,062 B1 | 1/2002  | Furukawa et al. |

(Continued)

FOREIGN PATENT DOCUMENTS

JP    7-235058    9/1995

(Continued)

OTHER PUBLICATIONS

"*ITE Technical Report*", vol. 21, No. 31, pp. 15-19, May 1997.

*Primary Examiner* — Joseph Haley
(74) *Attorney, Agent, or Firm* — Hamre, Schumann, Mueller & Larson, P.C.

(57) ABSTRACT

An optical storage medium can be provided by which illegal usage of the optical storage medium involving an infringement on the copyright can be prevented effectively without impairment of the functions for reproducing physical format information and optical storage medium manufacturing information. The optical storage medium includes a main information region in which encrypted data information is recorded as a pit row that is capable of being read out by means of light and a control data region. In the control data region, key information for decoding the encryption of the data information, the physical format information and the optical storage medium manufacturing information are recorded by wobbling a groove.

14 Claims, 48 Drawing Sheets

U.S. PATENT DOCUMENTS

| | | | |
|---|---|---|---|
| 6,611,481 B1 | 8/2003 | Koishi et al. | |
| 6,665,240 B1 * | 12/2003 | Kobayashi et al. | 369/47.15 |
| 6,671,238 B1 | 12/2003 | Ko et al. | |
| 6,700,862 B2 | 3/2004 | Tsukuda et al. | |
| 6,735,160 B1 | 5/2004 | Miyashita et al. | |
| 6,801,490 B1 | 10/2004 | Sako et al. | |
| 6,813,681 B1 | 11/2004 | Kanota et al. | |
| 6,819,645 B2 | 11/2004 | Jeon et al. | |
| 6,996,052 B1 | 2/2006 | Mizuno et al. | |
| 2001/0050890 A1 * | 12/2001 | Okamoto et al. | 369/59.24 |
| 2002/0027869 A1 | 3/2002 | Morita et al. | |
| 2003/0165095 A1 | 9/2003 | Iimura et al. | |
| 2005/0174915 A1 | 8/2005 | Nagai et al. | |

FOREIGN PATENT DOCUMENTS

| | | |
|---|---|---|
| JP | 10-69646 | 3/1998 |
| JP | 10-172149 | 6/1998 |
| JP | 11-167733 | 6/1999 |
| JP | 2000-090595 | 3/2000 |
| JP | 2000-105948 | 4/2000 |
| JP | 3061098 | 4/2000 |
| JP | 2000-242929 | 9/2000 |
| JP | 2001-250338 | 9/2001 |
| JP | 2001-357533 | 12/2001 |
| JP | 2002-203374 | 7/2002 |
| JP | 2003-016738 | 1/2003 |

* cited by examiner

| n-th | pattern | |
|---|---|---|
| | 1 | 0 |
| 6P1 | 000111 | 111000 |
| 6P2 | 001011 | 110100 |
| 6P3 | 001101 | 110010 |
| 6P4 | 001110 | 110001 |
| 6P5 | 010011 | 101100 |
| 6P6 | 010101 | 101010 |
| 6P7 | 010110 | 101001 |
| 6P8 | 011001 | 100110 |
| 6P9 | 011010 | 100101 |
| 6P10 | 011100 | 100011 |

FIG. 13

| n-th | pattern | |
|---|---|---|
| | 1 | 0 |
| 4P1 | 0011 | 1100 |
| 4P2 | 0101 | 1010 |
| 4P3 | 0110 | 1001 |

FIG. 14

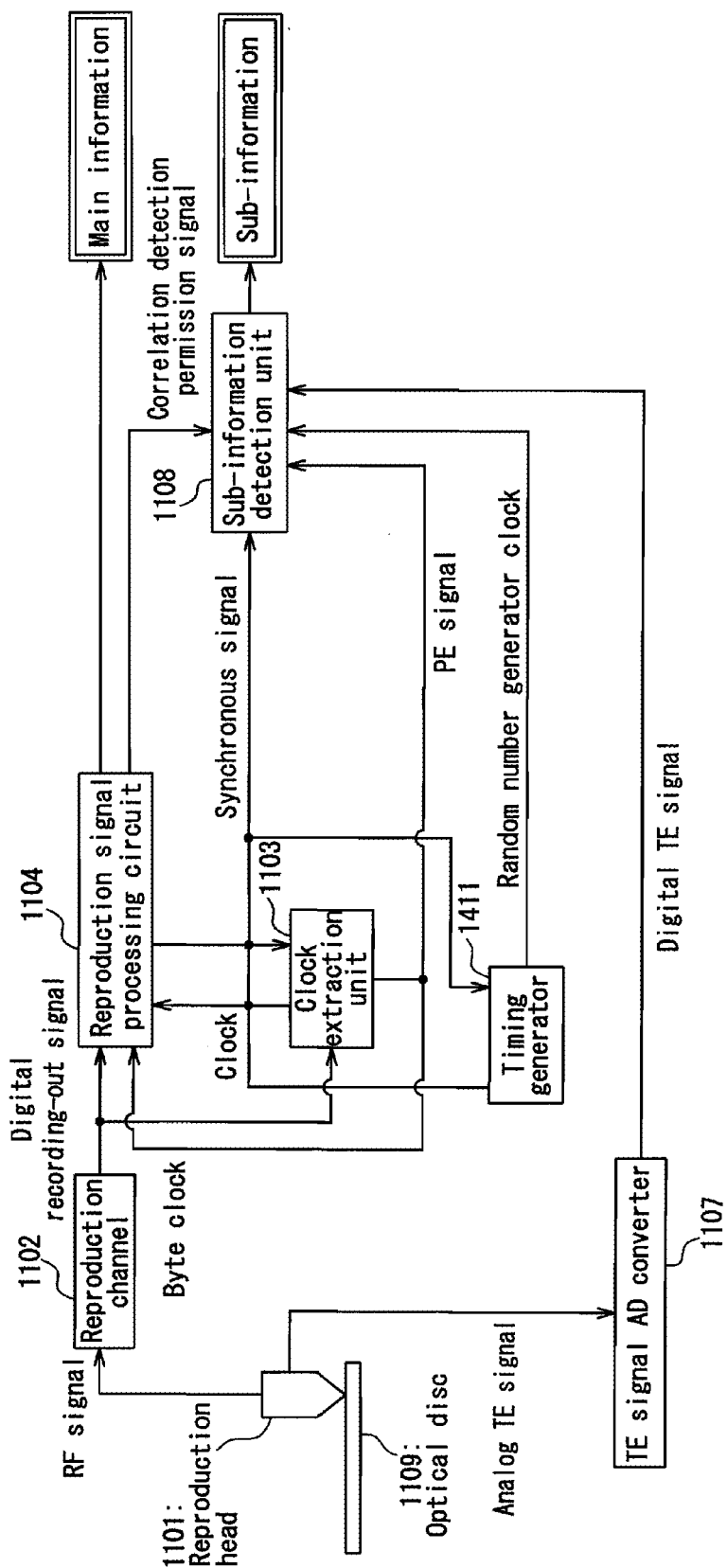
F I G. 51

OPTICAL STORAGE MEDIUM, INFORMATION RECORDING APPARATUS, AND INFORMATION REPRODUCING APPARATUS

CROSS-REFERENCE TO RELATED APPLICATION

This application is a Division of application Ser. No. 10/609,709, filed Jun. 30, 2003, which application is incorporated herein by reference.

BACKGROUND OF THE INVENTION

1. Field of the Invention

The present invention relates to an optical storage medium and an information recording/reproducing apparatus for recording or reproducing information with respect to the optical storage medium. More particularly, the present invention relates to an optical storage medium in which recording signals of images, sounds and the like are encrypted for protecting works from improper duplication, and relates to an information recording/reproducing apparatus for recording or reproducing information with respect to such an optical storage medium.

2. Related Background Art

Optical discs exemplified by DVDs (Digital Versatile/Video Discs) have become widespread as a medium for recording massive amounts of digital data such as AV (Audio Visual) data, a medium used for computers and the like. For example, DVDs in which high quality moving images are recorded for two hours or longer are now on the market. In order to protect such digital works against improper copying to another recording medium, a method called contents encryption is adopted (See ITE Technical Report Vol. 21, No. 31, pp. 15 to 19, for example).

According to this method, compressed digital works such as a movie are encrypted by means of secret keys with a three-level hierarchy (title key, disc key and master key) and are recorded in a user region to which a user is allowed to access. Then, only the authorized maker having a license is notified of the master key that is the most important key among the secret keys. The disc key and the title key that are necessary for each DVD and each title are encrypted based on the master key and are stored in a control information region to which a user is not allowed access. With this configuration, a restriction is imposed on the user so as not to access the secret keys required for decoding, and therefore improper copy by means of file copying and the like can be prohibited. However, such technology cannot cope with an improper action in which contents of all regions including the control information region for recording the secret keys are improperly copied in their entirety to another optical disc.

To address this, a method for judging whether an optical disc is an authorized one or an improperly copied one is suggested as shown in FIG. 53, where recording marks in the optical disc are displaced in units of a frame (A of FIG. 53) in the radial direction so as to record a singular pit row (B of FIG. 53) (See JP 3061098 B, for example).

The presence of such a singular pit row can be detected by a burst TE signal (D of FIG. 53) that is generated from a tracking error signal (C of FIG. 53). Therefore, by counting the number of frames in which a signal level of a standard signal that is generated internally and that of the burst TE signal agree with each other, the optical disc can be distinguished between the authorized medium and the copied medium based on this counter value.

When this optical disc in which recording marks are displaced in the radial direction is copied by an ordinary method, the singular pits cannot be generated in the copied optical disc. Therefore, it becomes possible to find an improperly copied optical disc.

However, when pit rows are recorded so as to wobble, the tolerance for offtrack will be narrowed correspondingly, thus reducing the reliability of the optical storage medium and an information reproducing apparatus. In order to secure the reliability, a pitch of tracks for recording the pit rows has to be widened by the size of the wobble, thus decreasing the storage capacity.

In addition, according to the above conventional technology, judgment on the authorized disc is conducted depending on the presence of singular pits only, and therefore if a location of the singular pits is determined, improper copying can be conducted by generating any singular pit row at that location. As a result, unauthorized disc makers who do not have a license can manufacture a large amount of copied digital works, which might hinder the appropriate distribution of digital contents.

SUMMARY OF THE INVENTION

Therefore, with the foregoing in mind, it is an object of the present invention to provide an optical storage medium that can be identified precisely without the degradation of storage capacity and by which illegal usage of the optical storage medium involving an infringement on the copyright can be prevented effectively and to provide an information recording/reproducing apparatus for recording or reproducing information with respect to the optical storage medium.

In order to fulfill the above-stated object, a first optical storage medium according to the present invention includes an information recording layer including: a main information region in which information is recorded as a concave or convex mark row that is capable of being read out by means of light; and a control data region. In this medium, optical storage medium information concerning the optical storage medium is recorded in the control data region by wobbling a groove that is concave or convex relative to a side on which light is incident.

In order to fulfill the above-stated object, a second optical storage medium according to the present invention includes an information recording layer including: a main information region in which information is recorded as a mark row that is capable of being read out by means of light; and a control data region. In this medium, optical storage medium information concerning the optical storage medium is recorded in the control data region by wobbling a mark row.

In order to fulfill the above-stated object, a third optical storage medium according to the present invention includes an information recording layer including: a main information region in which information is recorded as a mark row that is capable of being read out by means of light; and a control data region. In the medium, optical storage medium information concerning the optical storage medium is recorded with a mark row in the control data region, and the mark row recorded in the main information region is wobbled, where, assuming that a track pitch is $Tp_2$, a maximum amplitude of an amount of displacement of the wobbling is not more than $Tp_2/30$.

In order to fulfill the above-stated object, a fourth optical storage medium according to the present invention includes a plurality of information recording layers each including: a main information region in which information is recorded as a mark row that is capable of being read out by means of light;

and a control data region in which optical storage medium information concerning the optical storage medium is recorded. In this medium, optical storage medium information concerning all of the plurality of information recording layers is recorded in a control data region of one information recording layer of the plurality of information recording layers.

In order to fulfill the above-stated object, an information reproducing apparatus according to the present invention includes an optical pickup that irradiates an optical storage medium with light so as to read out main data information and optical storage medium information recorded in the optical storage medium, where the optical storage medium includes main information region in which the main data information is encrypted and recorded and control data region in which optical storage medium information is recorded with a mark row or by wobbling a groove that is concave or convex relative to a side on which the light is incident, the optical storage medium information containing key information for decoding the encryption of the main data information or identification information indicating that the optical storage medium is manufactured properly or information therein may be reproduced; a key information detection unit that detects the key information based on a signal read out by the optical pickup; and a demodulation unit that decodes the encryption of the main data information based on the key information detected by the key information detection unit.

In order to fulfill the above-stated object, a fifth optical storage medium according to the present invention is one in which main information is recorded in frames provided with synchronous codes by means of optically readable recording marks. In this medium, at a portion in which the synchronous codes are not recorded in at least a part of the frames, sub-information is recorded by forming the recording marks so as to be displaced slightly toward an outer rim side or an inner rim side of the optical storage medium relative to a standard position.

In order to fulfill the above-stated object, an information recording apparatus according to the present invention records main information in an optical storage medium, where the recording is conducted in frames provided with synchronous codes by means of optically readable recording marks. The apparatus includes: a modulation unit that modulates the main information and inserts a synchronous code at predetermined intervals; a displacement control signal generation unit that generates a displacement control signal with reference to a timing of the insertion of the synchronous code; and a sub-information recording unit that records sub-information by slightly displacing the recording marks to an outer rim side or to an inner rim side in accordance with the displacement control signal.

In order to fulfill the above-stated object, a second information reproducing apparatus according to the present invention reproduces main information from recording marks formed on an optical disc, the reproduction being conducted in frames provided with synchronous codes. The apparatus includes: a radial phase difference detection unit that detects displacement of the recording marks in a radial direction; a clock extraction unit that extracts, from a reproduction signal of the recording marks, a standard clock signal that is in synchronization with the reproduction signal; a reproduction signal processing unit that detects the synchronous codes from the reproduction signal and modulates the reproduction signal; a correlation sequence generation unit that generates a correlation sequence with reference to a timing when the synchronous codes are detected; and a sub-information detection unit that detects sub-information from a radial phase difference signal generated by the radial phase difference detection unit and the correlation sequence.

BRIEF DESCRIPTION OF THE DRAWINGS

FIG. 9 schematically shows a cross section of a pit in an optical storage medium, where

FIG. 13 shows a wobble pattern recorded in an information recording layer of the optical storage medium that is used in the information reproducing apparatus according to Embodiment 7 of the present invention.

FIG. 14 shows another wobble pattern recorded in an information recording layer of the optical storage medium that is used in the information reproducing apparatus according to Embodiment 7 of the present invention.

FIG. 51 is a schematic block diagram of an information recording apparatus according to Embodiment 10.

DETAILED DESCRIPTION OF THE INVENTION

Figure 1:
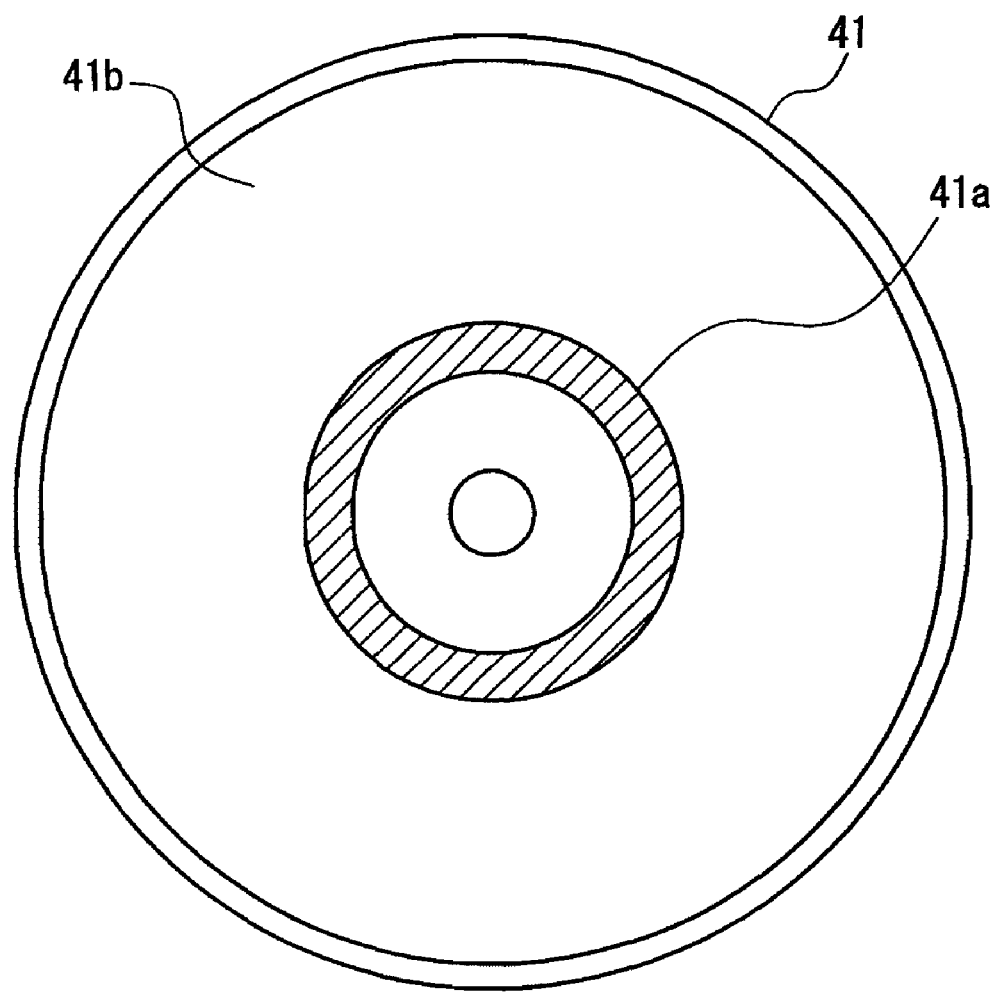
FIG. 1 schematically shows a configuration of an optical storage medium according to Embodiment 1 of the present invention.

According to the first optical storage medium of the present invention, optical storage medium information concerning the optical storage medium is recorded in the control data region by wobbling a groove that is concave or convex relative to a side on which light is incident. The optical storage medium information contains key information for decoding data information that is encrypted and recorded in the main information region and the like, in addition to physical format information and optical storage medium manufacturing information. In this way, by recording the optical storage medium information in the control data region by wobbling the groove, an optical storage medium by which individual media can be identified precisely without the degradation of storage capacity can be provided. Furthermore, since the optical storage medium information including the key information is recorded by wobbling the groove, it becomes difficult to duplicate this optical storage medium information improperly to another optical storage medium. Therefore, illegal usage of the optical storage medium involving an infringement on the copyright can be prevented effectively.

According to the second optical storage medium of the present invention, optical storage medium information concerning the optical storage medium is recorded in the control data region by wobbling a mark row. The optical storage medium information contains physical format information, optical storage medium manufacturing information and the like. In this way, by recording the optical storage medium information in the control data region by wobbling the mark row, an optical storage medium by which individual media can be identified precisely without the degradation of storage capacity can be provided. Furthermore, since the mark row is wobbled to be recorded, it becomes difficult to duplicate this optical storage medium information improperly to another optical storage medium.

According to the third optical storage medium, the mark row in the main information region is wobbled, whereby improper copying can be prevented. In addition, assuming that a track pitch is $Tp_2$, a maximum amplitude of a displacement amount of the wobbling is not more than $Tp_2/30$. Therefore, the influence of crosstalk can be ignored totally.

According to the fourth optical storage medium, optical storage medium information concerning all of the information recording layers is recorded in a control data region of at least one information recording layer of the plurality of information recording layers. Therefore, by simply accessing a control data region of one of the information recording layers, optical storage medium information concerning all of the information recording layers can be obtained. With this configuration, a time required for learning can be shortened.

According to the information reproducing apparatus of the present invention, by reading out the optical storage medium information from the control data region, where the optical storage medium information is recorded by wobbling the groove that is concave or convex relative to the light incident side or by wobbling the mark row, an individual medium can be identified precisely. In addition, by reproducing information using the key information detected from the optical storage medium information, illegal usage of the optical storage medium involving an infringement on the copyright can be prevented effectively. Needless to say, the information reproducing apparatus of the present invention is not limited to an apparatus exclusively used for reproduction, but includes an apparatus having a recording function and the like.

Preferably, in the first or the second optical storage medium, the information recorded in the main information region is recorded as a mark row that is concave or convex relative to a side on which light is incident. By recording the information with mark rows in both of the main information region and the control data region, a molding pressure applied when the optical storage medium is manufactured can be made small, and correspondingly the cost required for the molding machine can be reduced. In addition, the mark rows are preferably wobbled. With this configuration, improper duplication can be prevented securely.

In the second optical storage medium, it is preferable that a mark row recorded in the main information region is a mark row that is concave or convex relative to the side on which light is incident.

In the second or the third optical storage medium, assuming that a track pitch in the control data region is $Tp_1$ and a width of a mark therein is $Mw_1$, the following relationship preferably is satisfied:

$$0.3 \times Tp_1 \leq Mw_1 \leq 0.7 \times Tp_1.$$

Even if an error in a width of marks occurs during the fabrication, the influence of the error on the information recorded in the optical storage medium can be made small.

In the second or the third optical storage medium, assuming that a width of a mark recorded in the control data region is $Mw_1$ and a width of a mark recorded in the main information regions is $Mw_2$, the following relationship preferably is satisfied:

$$Mw_1 > Mw_2.$$

For both of the information recorded in the main information region and the information recorded in the control data region, favorable signals can be obtained. In this configuration, assuming that a track pitch in the main information region is $Tp_2$ and a width of a mark therein is $Mw_2$, it is preferable that the following relationship further is satisfied:

$$Mw_2 < 0.5 \times Tp_2.$$

Even if an error in a width of marks occurs during the fabrication, the influence of the error on the reproduction signal can be made small.

In the second or the third optical storage medium, it is preferable that changing a polarity of the wobbling is carried out at a timing of a space in the mark row. By changing the polarity of the wobbling at a space portion, the influence of the cutting machine can be reduced, which allows favorable signal detection. In addition, a plurality of conversion tables preferably are provided for making fine adjustment of a recording operation by an apparatus for recording the mark row so that the changing a polarity of wobbling is carried out at a timing of a space in the mark row. With this configuration, a timing in displacement of the wobbling can be adjusted properly, thus preventing the deterioration due to jitter.

In the second or the third optical storage medium, it is preferable that information recorded in the control data region is represented by an edge portion of a mark. With this configuration, a S/N in the same level as in the wobbled continuous groove can be secured, so that the information recorded in the control data region can be detected with high reliability. In the second optical storage medium, it is preferable that information recorded in the control data region is represented by a central portion of a mark. This configuration makes the influence of jitter small, so that the information recorded in the control data region can be detected with high reliability.

In the second or the third optical storage medium, it is preferable that the mark row has a synchronous pattern in a specific period, which is used for reproducing information, and the wobbling is carried out in synchronization with the synchronous pattern. A clock signal can be generated from the mark row, and therefore in the case of a very small amount of the wobble, signals can be detected with stability.

Furthermore, in the above configurations, assuming that a period of one synchronous pattern is $Cy_1$ and a period of the wobbling is $Cy_2$, the following relationship preferably is satisfied:

$$Cy_2 = Cy_1 \times M/2,$$

where M is a natural number.
Or the following relationship preferably is satisfied:

$$Cy_1 = Cy_2 \times M/2,$$

where M is a natural number.
With these preferable configurations, the influence of bit slip can be avoided. When the latter relationship is satisfied, signals can be detected at a timing of the synchronous pattern.

In the second or the third optical storage medium, assuming that a length of a mark recorded in the control data region is $ML_1$, a wavelength of light applied when the mark is recorded is $\lambda$, and a numerical aperture of an optical system from which the light is applied is NA, the following relationship preferably is satisfied:

$$ML_1 \geq 2 \times \lambda / NA.$$

Without the use of an equalizer, a signal with a sufficiently large amplitude can be obtained.

In the second or the third optical storage medium, assuming that a length of a mark recorded in the control data region is $ML_1$, a wavelength of light applied when the mark is recorded is $\lambda$, and a numerical aperture of an optical system from which the light is applied is NA, the following relationship preferably is satisfied:

$$ML_1 \geq \lambda / (2 \times NA).$$

With this configuration, a clock signal can be generated using a signal obtained from the repetition of the marks and the spaces. In the second or the third optical storage medium, it is preferable that each of marks and spaces that are recorded in the control data region have lengths as an integral multiple of a predetermined period T. In addition, it is preferable that each of the marks and the spaces have a uniform length or a plurality of types of lengths.

In the first to third optical storage media, the information recorded in the main information region may be encrypted data information, and the optical storage medium information may contain key information for decoding the encryption of the data information. With this configuration, illegal usage of the optical storage medium involving an infringement on the copyright can be prevented effectively. Furthermore, it is preferable that the key information is recorded by wobbling the concave or convex groove or a mark row. In addition, it is further preferable that the key information is represented by a central portion of the wobbling. Instead of the above-mentioned key information, the medium may be configured so as to contain identification information that indicates that the optical storage medium is manufactured properly or information therein may be reproduced.

In the first to third optical storage media, it is preferable that a period of the wobbling is longer than a length of a pair of a mark and a space. This configuration can reduce an influence of an adjacent track. It is further preferable that a period of the wobbling is four times or more a length of a pair of a mark and a space.

In the first to third optical storage media, it is preferable that a period of the wobbling is an integral multiple of a predetermined period T. Using a clock signal that can be generated from the repetition of the marks and the spaces, the wobbling modulated optical storage medium information can be detected.

In the first to third optical storage media, assuming that an optical depth of a mark or the groove that is recorded in the control data region is $Md_1$, and a wavelength of light applied when the mark or the groove is recorded is $\lambda$, the following relationship preferably is satisfied:

$\lambda/8 \leq Md_1 \leq \lambda/4$. With this configuration, a high quality signal can be obtained.

In the first to third optical storage media, it is preferable that a wobble frequency in the control data region is higher than a tracking servo band.

In the first to third optical storage media, it is preferable that the wobbling does not have a direct-current component in a tracking servo band. With this configuration, tracking can be conducted with stability.

In the first to third optical storage media, it is preferable that a timing of displacement in the wobbling is pseudo random. With this configuration, decoding can be made more difficult.

In the first to third optical storage media, it is preferable that a plurality of wobbles are allocated to 1-bit of the key information. With this configuration, when a signal is detected, a direct-current component or a low frequency component can be cancelled, so that a S/N can be improved.

In the first to third optical storage media, it is preferable that the key information is recorded discretely or continuously. To record discretely is advantageous because the difficulty in decoding is increased, and to record continuously is advantageous because a time required for reading-out can be shortened and therefore a waiting time for a user during reproduction can be reduced.

In the first to third optical storage media, it is preferable that a buffer region having a groove or a mark, in which failure in reading out therefrom poses no special problems, is provided at a boundary between the control data region and the main information region. Such a groove or a mark row may be concave or convex relative to the light incident side. With this configuration, a tracking error signal with favorable qualities can be obtained also at a boundary between the control data region and the main information region.

In the first or the second optical storage medium, it is preferable that a track pitch $Tp_1$ in the control data region is different from a track pitch $Tp_2$ in the main information region. In addition, it is preferable that the track pitch $Tp_1$ in the control data region is larger than the track pitch $Tp_2$ in the main information region. For both of the information recorded in the main information region and the information recorded in the control data region, a reproduction signal and a tracking error signal with favorable qualities can be obtained.

The first to third optical storage media may be configured so as to include a plurality of information recording layers. In these media, information may be recorded as a concave or convex mark row in a main information region of at least one information recording layer of the plurality of information recording layers, and optical storage medium information concerning all of the plurality of information recording layers may be recorded in a control data region of at least one information recording layer of the plurality of information recording layers. With this configuration, by simply accessing the one information recording layer, optical storage medium information concerning all of the information recording layers can be obtained. Therefore, a time required for learning can be shortened.

In the first to third optical storage media having the plurality of information recording layers or in the fourth optical storage medium, it is preferable that the optical storage medium information concerning all of the plurality of information recording layers is recorded in each of the control data regions of the plurality of information recording layers. Irrespective of the focus being adjusted into which one of the information recording layers, it becomes possible to read out the optical storage medium information concerning all of the information recording layers, and therefore the optical storage medium can be identified precisely.

In the first to third optical storage media having the plurality of information recording layers or in the fourth optical storage medium, it is preferable that the optical storage medium information concerning all of the plurality of information recording layers is recorded in a control data region of a standard layer of the optical storage medium.

In the first to third optical storage media having the plurality of information recording layers or in the fourth optical storage medium, it is preferable that information concerning a polarity of a tracking error signal is recorded in a control data region of at least one layer of the plurality of information recording layers. It is further preferable that the information concerning a polarity of a tracking error signal is recorded in a control data region of a standard layer of the optical storage medium or is recorded in control data regions of all information recording layers of the optical storage medium. With this configuration, when the optical storage medium is reproduced, a time required for learning the polarity of the tracking error signal can be saved.

In the first to third optical storage media having the plurality of information recording layers or in the fourth optical storage medium, it is preferable that recording layer information concerning a surface shape that is formed for recording the information in the plurality of information recording layers is recorded in a control data region of at least one layer of the plurality of information recording layers The recording layer information is information concerning a recording pattern of the information in the control data region, such as information indicating that the pattern is one of a concave groove, a convex groove, a concave mark and a convex mark relative to the light incident side. Furthermore, it is further preferable that the information recorded as the optical storage medium information contains information concerning a depth of the surface shape.

In the first to fourth optical storage media, at least two types of information recording layers selected from a read-only type, a write-once type and a rewritable type may be provided as the information recording layer, and the optical storage medium information may be recorded at approximately the same radial position in the control data region. This configuration is favorable because when the optical storage medium is reproduced, a time required for learning the polarity of the tracking error signal can be saved.

The above information reproducing apparatus further includes a judgment unit that judges whether the optical storage medium is improperly duplicated or not based on a result of the detection by the key information detection unit; and a reproduction inhibition unit that inhibits reproduction of information from the optical storage medium as a target of the reproduction when the judgment unit judges that the optical storage medium is improperly duplicated. With this configuration, improper duplication can be prevented effectively.

In addition, in the information reproducing apparatus of the present invention, it is further preferable that the reproduction inhibition unit stops output of a signal from the demodulation unit. Alternatively, it is also preferable that the reproduction inhibition unit ejects the optical storage medium as a target of the reproduction from the information reproducing apparatus. In addition, it is preferable to further include a warning unit that issues a warning that the optical storage medium is improperly duplicated when the judgment unit judges that the optical storage medium is improperly duplicated. With this configuration, improper duplication of the optical storage medium can be prevented more securely.

Preferably, the information reproducing apparatus of the present invention uses as the optical storage medium at least two types of information recording layers selected from a read-only type, a write-once type and a rewritable type, where the optical storage medium information is recorded at a common position in the control data region with a common modulation method. With this configuration, an information reproducing apparatus that can protect the optical storage medium having various types of information recording layers from the improper duplication can be realized.

In the information reproducing apparatus of the present invention, preferably, if the key information detection unit does not detect the key information, and if a duplication permission identifier can be detected from a signal read out from the optical storage medium by the optical pickup, then the judgment unit judges that the optical storage medium is not improperly duplicated. This configuration does not excessively protect the information whose copying does not need to be inhibited, and therefore can provide the convenience of users.

In the information reproducing apparatus of the present invention, preferably, wobble detection unit that is used for detecting a wobbled signal is a differential operational unit or a phase comparison unit. The use of the differential operational unit can simplify the configuration of a detection system and the use of the phase comparison unit can improve the reliability because the apparatus becomes free from the influence of a direct-current component.

In the information reproducing apparatus of the present invention, it is preferable that the key information is modulated using a signal obtained from a plurality of wobbles. With this configuration, the reliability can be enhanced. Furthermore, as the number of wobbles used for obtaining the key information is increased, the amplitude of the wobbles can be made small, and correspondingly an influence of crosstalk can be reduced.

In the information reproducing apparatus of the present invention, it is preferable that the key information is modulated by integrating and averaging a signal output from a wobble detection unit. Note here that as the number of integration increases, a S/N can be improved, so that the reliability of the read-out key information can be enhanced.

In the information reproducing apparatus of the present invention, it is preferable that a clock signal is generated using a signal obtained from the mark row and the key information is detected using the clock signal. With this configuration, signals can be detected with stability.

In the information reproducing apparatus of the present invention, it is preferable that in order to modulate a signal obtained from the mark row, a clock signal is generated using a signal obtained from the mark row, and the key information is detected using the clock signal. With this configuration, a circuit configuration can be simplified.

In the fifth storage medium, it is preferable that there is no displacement from the outer rim side to the inner rim side or from the inner rim side to the outer rim side within the recording marks.

In the fifth storage medium, it is preferable that an amount of the displacement of the recording marks in a radial direction is within an amount of displacement in the radial direction that is permissible in an optical disc in which the sub-information is not recorded.

In the fifth storage medium, it is preferable that at least 1-bit of the sub-information is recorded by slightly displacing recording marks in a plurality of the frames in the radial direction. It is preferable that the plurality of frames are a group of frames that are continuously arranged on a track of the optical storage medium or a group of frames that are discretely arranged at predetermined intervals on a track.

In the fifth storage medium, it is preferable that the slight displacement in the radial direction is not conducted in a specific frame and/or in a specific region of a frame.

In the fifth storage medium, it is preferable that the region in which the sub-information is recorded by the slight displacement of the recording marks in the radial direction is a lead-in region in the optical storage medium.

In the fifth storage medium, it is preferable that the portion in which the synchronous code is not recorded in the frame is divided into a plurality of blocks having nonuniform lengths, a period for slightly displacing the recording marks to the outer rim side or to the inner rim side is different for each of the blocks, and a length of the recording marks that are displaced to the inner rim side and a length of the recording marks that are displaced to the outer rim side are approximately equal to each other in each block. In addition, it is preferable that a total sum of lengths of recording marks displaced to the inner rim side and a total sum of lengths of recording marks displaced to the outer rim side in all of the frames are approximately equal to each other.

In the fifth storage medium, it is preferable that the portion in which the synchronous code is not recorded in the frame is divided into a plurality of blocks having a predetermined length, a period for slightly displacing the recording marks to the outer rim side or to the inner rim side is different for each of the blocks, and a total sum of lengths of the recording marks that are displaced to the inner rim side and a total sum of lengths of the recording marks that are displaced to the outer rim side are approximately equal to each other in each block.

In the fifth storage medium, it is preferable that the portion in which the synchronous code is not recorded in the frame is divided into n pieces of blocks having a predetermined length, where n is a natural number not less than 4, a period for slightly displacing the recording marks to the outer rim side or to the inner rim side is different for every m pieces of blocks, where m is a divisor of n except for 1, and a total sum of lengths of the recording marks that are displaced to the inner rim side and a total sum of lengths of the recording marks that are displaced to the outer rim side are approximately equal to each other in each block.

In the fifth storage medium, it is preferable that information required for reproducing the sub-information is recorded by slightly displacing recording marks to the outer rim side or to the inner rim side in a frame in which the sub-information is not recorded. The information required for reproducing the sub-information is, for example, an error-correcting code of the sub-information.

In the fifth storage medium, it is preferable that an amount of the displacement of the recording marks to the outer rim side or to the inner rim side is determined based on a signal obtained by superimposing dummy information to the sub-information.

In the information recording apparatus according to the present invention, it is preferable that the slight displacement in the radial direction is not conducted at least with respect to the synchronous code that is inserted in units of a frame.

In the information recording apparatus according to the present invention, it is preferable that the displacement control signal is a signal obtained by performing spread-spectrum of the sub-information using a pseudo random number sequence that is initialized at the timing of the insertion of the synchronous code.

In the information recording apparatus according to the present invention, it is preferable that the displacement control signal is subjected to PE modulation so that a probability of the displacement of the recording marks to the outer rim side and a probability of the displacement of the recording marks to the inner rim side become approximately equal to each other.

In the information recording apparatus according to the present invention, it is preferable that the displacement control signal makes a probability of the displacement of the recording marks to the outer rim side approximately equal to a probability of the displacement of the recording marks to the inner rim side, and there is no changing point of the displacement control signal in a section where the recording marks are to be formed.

In the information recording apparatus according to the present invention, it is preferable that at least 1-bit of the sub-information is recorded in units of a plurality of frames. In addition, it is preferable that the plurality of frames are a group of frames that are continuously arranged on a track of the optical storage medium or a group of frames that are discretely arranged at predetermined intervals on a track.

In the information recording apparatus according to the present invention, it is preferable that a portion in which the synchronous code is not recorded in the frames is divided into a plurality of blocks having nonuniform lengths, a period for slightly displacing the recording marks to the outer rim side or to the inner rim side is different for each of the blocks, and a length of the recording marks that are displaced to the inner rim side and a length of the recording marks that are displaced to the outer rim side are approximately equal to each other in each block.

In the information recording apparatus according to the present invention, it is preferable that a total sum of lengths of recording marks displaced to the inner rim side and a total sum of lengths of recording marks displaced to the outer rim side in all frames are approximately equal to each other.

In the information recording apparatus according to the present invention, it is preferable that a portion in which the synchronous code is not recorded in the frames is divided into a plurality of blocks having a predetermined length, a period for slightly displacing the recording marks to the outer rim side or to the inner rim side is different for each of the blocks, and a total sum of lengths of the recording marks that are displaced to the inner rim side and a total sum of lengths of the recording marks that are displaced to the outer rim side are approximately equal to each other in each block.

In the information recording apparatus according to the present invention, it is preferable that a portion in which the synchronous code is not recorded in the frames is divided into n pieces of blocks having a predetermined length, where n is a natural number not less than 4, a period for slightly displacing the recording marks to the outer rim side or to the inner rim side is different for every m pieces of blocks, where m is a divisor of n except for 1, and a total sum of lengths of the recording marks that are displaced to the inner rim side and a total sum of lengths of the recording marks that are displaced to the outer rim side are approximately equal to each other in each block.

In the information recording apparatus according to the present invention, it is preferable that information required for reproducing the sub-information is recorded by slightly displacing recording marks to the outer rim side or to the inner rim side in a frame in which the sub-information is not recorded.

In the information recording apparatus according to the present invention, it is preferable that an amount of the displacement of the recording marks to the outer rim side or to the inner rim side is determined based on a signal obtained by superimposing dummy information to the sub-information.

In the second information recording apparatus according to the present invention, it is preferable that the correlation sequence is generated by performing PE modulation of a pseudo random number sequence that is initialized at the timing of the detection of the synchronous codes.

In the second information recording apparatus according to the present invention, it is preferable that the correlation sequence does not have a changing point in a section where the recording marks are to be reproduced.

In the second information recording apparatus according to the present invention, it is preferable that at least 1-bit of the sub-information is extracted by reproducing a plurality of the frames.

In the second information recording apparatus according to the present invention, it is preferable that the sub-information is not detected at least from the synchronous codes in the frames.

The following describes embodiments of optical storage media and information recording/reproducing apparatuses of the present invention, with reference to the attached drawings. Note here that in the following drawings, the same reference numeral denotes the same element or the elements having the same functions and operations.

Embodiment 1

FIG. 1 shows one example of a configuration of an optical storage medium according to the present invention. An optical storage medium 41 includes a control data region 41a and a main information region 41b. In the main information region 41b, a mark row is recorded as pits so as to allow encrypted data information to be read out by means of light. On the other hand, in the control data region 41a, optical storage medium information containing key information for decoding the encryption of the data information recorded in the main information region 41b is recorded by wobbling grooves. The optical storage medium information contains physical format information, optical storage medium manufacturing information and the like, in addition to the key information.

When a linear velocity for reproducing information recorded in the optical storage medium 41 is approximately 5 m/s, a wobble frequency is approximately 1 MHz, so that the modulation is conducted at the frequency much higher than a tracking servo band. The information recorded in the optical storage medium 41 may be read out by means of an optical pickup with a wavelength λ of 400 to 420 nm and with a numerical aperture NA of 0.8 to 0.9.

Figure 2:
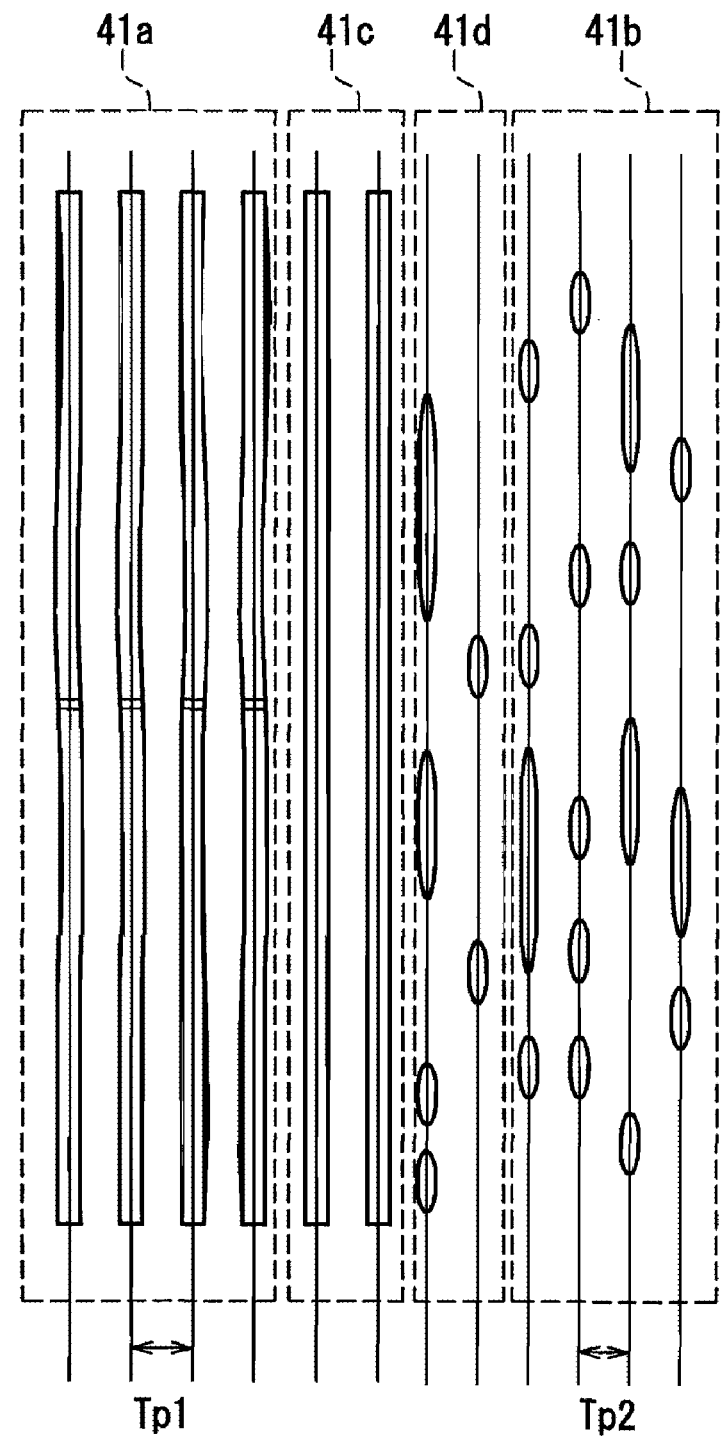
FIG. 2 is an enlarged schematic view showing a boundary between the control data region and the main information region of the optical storage medium of FIG. 1.

FIG. 2 is an enlarged plan view showing a state of the optical storage medium 41 in the vicinity of a boundary between the main information region 41b and the control data region 41a. In this embodiment, a track pitch $Tp_1$ in the control data region 41a is set at 0.35 μm and a track pitch $Tp_2$ in the main information region 41b is set at 0.32 μm. That is to say, the track pitch $Tp_1$ in the control data region 41a is set wider than the track pitch $Tp_2$ in the main information region 41b. This is for obtaining favorable qualities of each of the following signals: (1) a reproduction signal for reading out information recorded in the main information region 41b; (2) a tracking error signal that is used when information recorded in the main information region 41b is read out; (3) a reproduction signal for reading out information recorded in the control data region 41a; and (4) a tracking error signal that is used when information recorded in the control data region 41a is read out.

In terms of the qualities of the signals, the quality of the reproduction signal for reading out information recorded in the main information region 41b becomes the best when a depth of pits equals λ/4, as determined where a cross section of the pits is formed in an ideal rectangle. Furthermore, when the tracking error signal is detected by a phase-difference method, the quality of the tracking error signal that is used when information recorded in the main information region 41b is read out also becomes the best when a depth of the pits equals λ/4. On the other hand, as for the reproduction signal for reading out information recorded in the control data region 41a and the tracking error signal that is used when information recorded in the control data region 41a is read out, the qualities of them become the best when a depth of the grooves equals λ/8, as determined where a cross section of the grooves is formed in an ideal rectangle. This is because both of them are detected by a push-pull method in which a differential operation is performed. However, when the depth of the grooves is set at λ/4, which is the optimum depth for reading out the information recorded in the main information region 41b, favorable signals may not be obtained. In addition, when the depth of the pits becomes shallower than λ/8, influences of the medium's own noise and of noise from a light source become more pronounced. Therefore, such a depth of the pits is not favorable. Thus, the depths of the grooves and the pits need to be shallower than λ/4 but deeper than λ/8, and a depth from λ/8 to λ/5 is preferable. Since pits and grooves are formed practically to have an inclined surface in cross-section and not in the ideal rectangular form, equivalent depths will be shallower than actual depths. In addition, influences of the inclined surface become more pronounced in the tracking error signal detected by the push-pull method than in the information signal for reading out information recorded in the main information region 41b. By letting the pits or the grooves have a predetermined inclined surface, even when the depths of the grooves and the pits are set at λ/4, both of the qualities of the information signal for reading out information recorded in the main information region 41b and the tracking error signal detected by the push-pull method can be kept high. That is to say, if the equivalent depths $Md_1$ of the grooves and the pits substantially have the following relationship, high-quality signals can be obtained:

$$\lambda/8 \leq Md_1 \leq \lambda/4$$

Figure 9A:
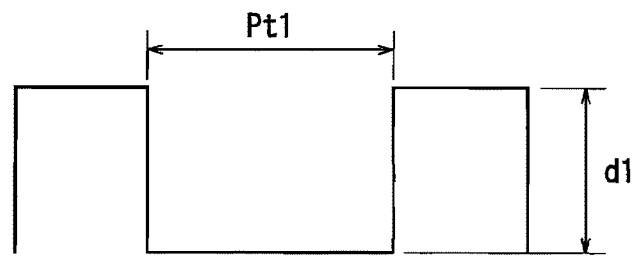
FIG. 9A shows a case where a cross-section of a pit is formed in an ideal rectangular form and FIG. 9B shows a case where a cross-section of a pit is formed in a trapezoidal form.
Figure 9B:
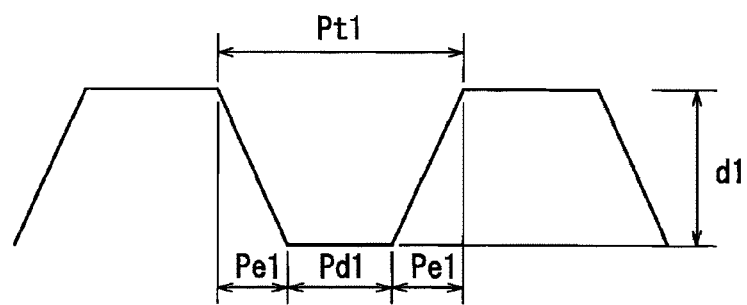

FIG. 9 schematically shows a cross section of a pit. FIG. 9A shows a case where the cross section of a pit is formed in the ideal rectangular form and FIG. 9B shows a case where the cross section of a pit is formed as a trapezoidal form. Assuming that a width of the pit is $Pt_1$ and a depth of the pit is $d_1$, in the case where the cross-section of the pit is in the rectangular form as shown in FIG. 9A, the equivalent depth $Md_1$ of the pit remains $d_1$. On the other hand, in the case of the cross-section of the pit is in a trapezoidal form as shown in FIG. 9B, the equivalent depth $Md_1$ roughly is expressed by the following formula:

$$Md_1 = d_1 \times Pe_1/Pt_1$$

Here, $Pt_1$ satisfies the relationship of $Pt_1 = Pd_1 + 2 \times Pe_1$, where $Pe_1$ denotes a width of an inclined portion of the trapezoid and $Pd_1$ denotes a width of the bottom of the trapezoid. Therefore, when the width $Pd_1$ of the bottom of the pit is, for example, 0, the equivalent depth $Md_1$ becomes $d_1/2$. In this case, even when the depth $d_1$ of the pit is set at λ/4, the equivalent depth $Md_1$ becomes λ/8, so that a large amplitude can be given to the tracking error signal detected by the push-pull method. Here, it is needless to say that, when the actual depths are determined, a consideration should be given to the refractive indexes of materials that make up the optical storage medium.

Furthermore, the optical storage medium 41 is provided with a buffer region 41c that has grooves in which failure in reading out therefrom poses no special problems and a buffer region 41d that has such pits, which are located at a boundary between the control data region 41a and the main information region 41b. The buffer region 41c and the buffer region 41d respectively are provided so as to allow the information recorded at the boundary between the control data region 41a and the main information region 41b to be read out without any problems, that is, so as to obtain a favorable tracking error signal at the boundary between the control data region 41a and the main information region 41b as well.

In the optical storage medium 41 of this embodiment, the optical storage medium information including copy protection information (key information) is recorded as a wobble signal that is modulated at a frequency much higher than the tracking servo band. For that reason, even when copying of the optical storage medium 41 is attempted using an ordinary information recording/reproducing apparatus, the optical storage medium 41 cannot be copied because the wobbling modulated grooves cannot be copied. In this way, improper copying can be precluded effectively.

Note here that information that may be copied also can be recorded in the optical storage medium 41. In such a case, there is no need to encrypt data to be recorded in the main information region 41b, and naturally, there is no need to provide key information for decoding, so that the key information is not recorded in the control data region 41a.

Furthermore, by recording an identifier enabling the distinguishing whether the information recorded in the main information region 41b may be copied or not in the control data region 41a or in the main information region 41b, the information can be distinguished effectively as to whether the copying thereof is permissible or not. Additionally, in the optical storage medium 41 of this embodiment, the track pitch $Tp_1$ in the control data region 41a is set wider than the track pitch $Tp_2$ in the main information region 41b, whereby the quality of the tracking error signal by the push-pull method becomes favorable even when the depth of the grooves is $\lambda/5$. Since the ratio occupied by the control data region 41a to the entire optical storage medium 41 is 5% or less, a slight increase in the track pitch results in a decrease in the storage capacity not more than 1%, which is so small that it may be ignored.

Moreover, since the data recorded in the main information region 41b is not wobbled, the optical storage medium with high reliability, which is free of an increase in cross-talk, that is, free of deterioration in signal qualities, can be provided.

Embodiment 2

Figure 3:
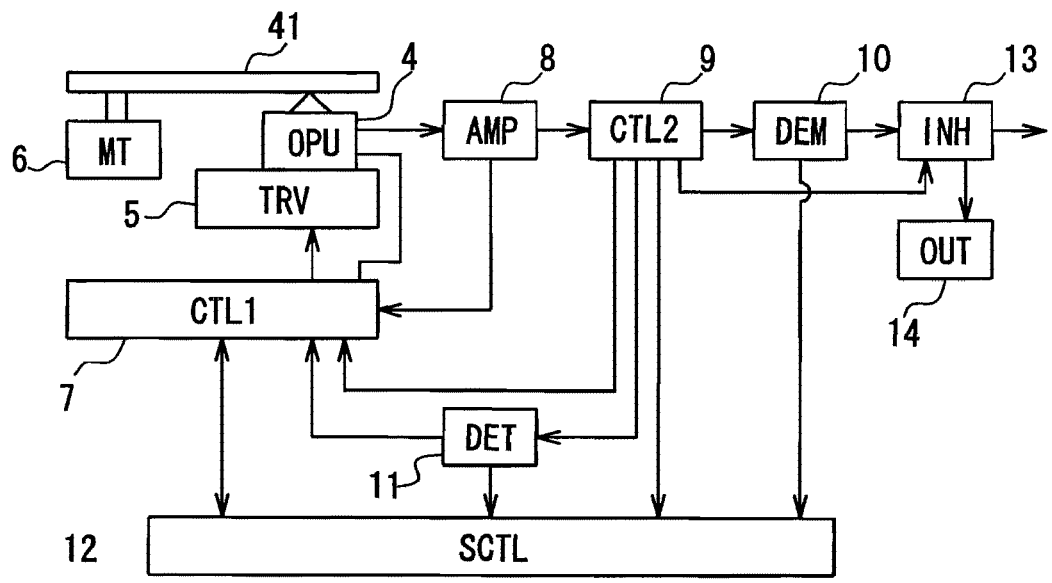
FIG. 3 schematically shows a configuration of an information reproducing apparatus according to Embodiment 2 of the present invention.

FIG. 3 is a block diagram showing a configuration example of an information reproducing apparatus according to the present invention. As an optical storage medium, the optical storage medium 41 described in Embodiment 1 is used. An optical pickup 4 functions so as to irradiate the optical storage medium 41 with a laser beam at a wavelength $\lambda$ of 400 nm to reproduce signals recorded in the optical storage medium 41. A transfer control unit 5 moves the optical pickup 4 in a radial direction of the optical storage medium 41 so as to reproduce signals at any locations in the optical storage medium 41. An optical storage medium motor 6 rotates the optical storage medium 41. A first control unit 7 controls the optical pickup 4, the transfer control unit 5 and the optical storage medium motor 6. An amplifier 8 amplifies a signal read out by the optical pickup 4.

Reference numeral 9 denotes a second control unit. An output signal from the amplifier 8 is input to this second control unit 9. The second control unit 9 generates from this signal a focus error signal and a servo signal such as a tracking error signal that are necessary for the optical pickup 4 to read out a signal in the optical storage medium 41, and outputs these signals to the first control unit 7.

Figure 10:
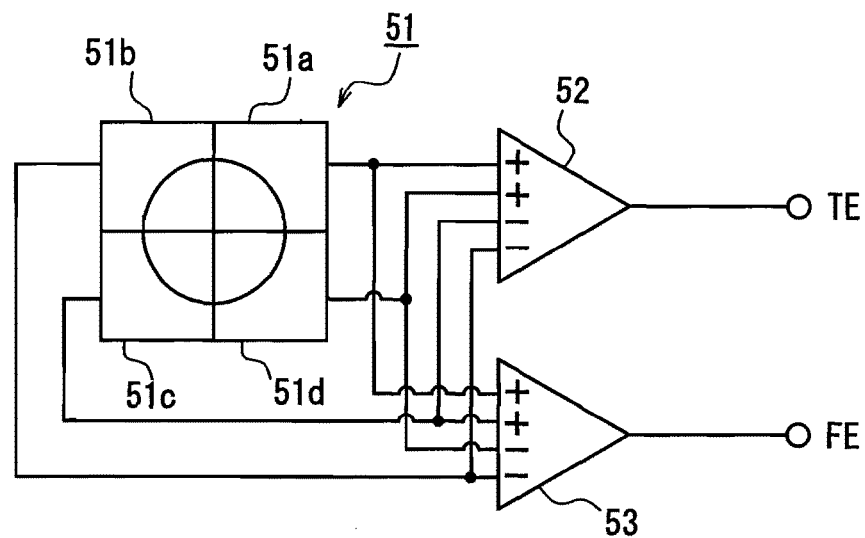
FIG. 10 schematically shows an optical detector and a wobbling signal detection unit that make up the information reproducing apparatus according to Embodiment 2 of the present invention.

FIG. 10 shows an optical detector 51 as an element constituting the optical pickup 4 and differential operation units 52 and 53 each of which is an element constituting the control unit 9. Although the optical pickup 4 may have different configurations depending on a method for detecting a focus error signal and a tracking error signal, the drawing illustrates a general configuration in which astigmatism is assigned to a beam reflected from the optical storage medium 41 and a photo-receptor 51 having four photo-receptive portions 51a to 51d receives light. A focus error signal is obtained by performing a differential operation of signals output from the photo-receptive portions 51a and 51c and signals output from the photo-receptive portions 51b and 51d by the differential operation unit 52. On the other hand, a tracking error signal is obtained by performing a differential operation of signals output from the photo-receptive portions 51a and 51d and signals output from the photo-receptive portions 51b and 51c by the differential operation unit 52. The method for detecting the focus error signal is called an astigmatic method and the method for detecting the tracking error signal is called a push-pull method, both of which are well-known methods. To wobble the grooves or the pits is in the same state as in the focused beam from the optical pickup 4 being offtrack from a desired position in accordance with the wobbling. Therefore, by using a means for detecting a tracking error signal, the signals recorded by wobbling the grooves or the pits can be detected. That is to say, as long as a method is capable of detecting the tracking error signal, the detecting method is not limited to the push-pull method, and various methods such as a phase-difference method and a 3-spot method are applicable to the detection of the wobble signals. When the push-pull method is used, an optical system of the optical pickup 4 and a tracking error signal detection unit constituting the second control unit 9 can be configured in the simplest manner, and correspondingly an information reproducing apparatus can be provided at a low cost. Of course, a method for detecting a focus error signal does not add any constraints to the present invention, and therefore any method can be used.

The signal input to the second control unit 9 is an analog signal, and the second control unit 9 digitizes (binarizes) this analog signal. In addition, the second control unit 9 judges whether the optical storage medium 41 is copied improperly or not, and if judging as the improperly copied medium, the second control unit 9 transmits a control signal so that an output inhibition unit 13 inhibits the output of the signal.

A demodulation unit 10 analyzes the digitized signal read out from the optical storage medium 41 and also decodes encrypted data such as image and music data based on the key information read out from the control data region 41a of the optical storage medium 41. The thus decoded signal is output from an output unit 14. A detection unit 11 detects an address signal and the like from the signal output from the second control unit 9 and outputs the same to a system control unit 12.

The system control unit 12 identifies the optical storage medium based on the optical storage medium information (physical format information and optical storage medium manufacturing information) read out from the control data region 41a, decodes a reproduction condition and the like so as to control the whole of this information reproducing apparatus.

When information recorded in the optical storage medium 41 is reproduced, the first control unit 7 drives and controls the transfer control unit 5 in accordance with an instruction from the system control unit 12. As a result, the transfer control unit 5 moves the optical pickup 4 to a portion corresponding to the control data region 41a. Then, the optical pickup 4 reads out the optical storage medium information recorded in the control data region 41a. On the basis of this information, the system control unit 12 sends an instruction to the first control unit 7. In accordance with the instruction from the system control unit 12, the first control unit 7 drives and controls the transfer control unit 5. As a result, the transfer control unit 5 moves the optical pickup 4 to a desired position in the main information region 41b, where the optical pickup 4 reads out the recorded signal (data information) in the optical storage medium 41.

Even though the optical storage medium 41 originally is not allowed to be copied, if the optical storage medium information read out by the optical pickup 4 from the control data region 41a does not contain key information, the output inhibition unit 13 inhibits the output of the signal. Alternatively, the information reproducing apparatus may eject the optical storage medium 41. In addition to this operation, a warning means (not illustrated) may be provided for issuing a warning indicating an improperly copied optical storage medium. By adding the output inhibition unit 13 and the warning means, a copyright protection function can be reinforced.

As described in Embodiment 1, information that is allowed to be copied might be stored in the optical storage medium 41. In this case, it is preferable to record an identifier (copy permission identifier) in the control data region 41a or in the main information region 41b so as to indicate that the information recorded in the main information region 41b may be copied. When such an optical storage medium 41 is used, even if the data read out by the optical pickup 4 from the control data region 41a does not contain key information, and if the copy permission identifier can be detected from the signals read out from the optical storage medium 41, it is judged that the optical storage medium 41 is not an improper copied medium, so that reproduction from the optical storage medium 41 is conducted. This configuration does not excessively protect the information whose copying does not need to be inhibited, and therefore does not impair the convenience of users.

Note here that although this embodiment describes an information reproducing apparatus, if the optical storage medium has a plurality of information recording layers with one of the information recording layers being a write-once type or a rewritable type, the information reproducing apparatus may be configured as an information reproducing apparatus capable of a recording operation.

Embodiment 3

Figure 4:
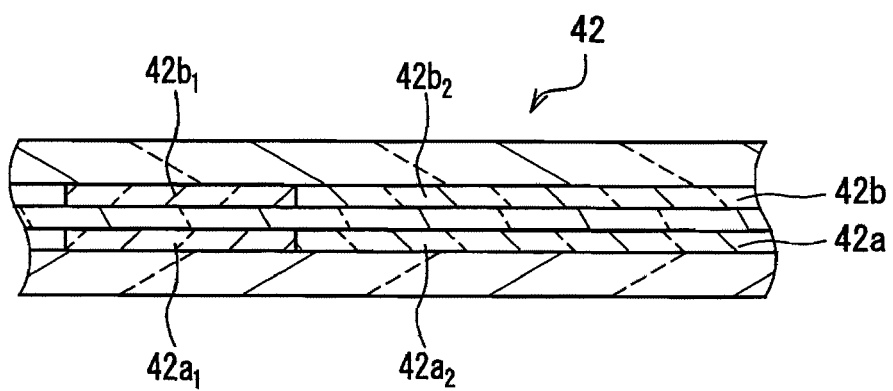
FIG. 4 schematically shows a configuration of an optical storage medium according to Embodiment 3 of the present invention.

FIG. 4 shows a configuration of an optical storage medium 42 as another embodiment according to the optical storage medium of the present invention. The optical storage medium 42 includes two information recording layers 42a and 42b, where the information recording layer 42a is an information recording layer exclusively used for reproduction and the information recording layer 42b is a rewritable information recording layer. The information recording layers 42a and 42b have control data regions $42a_1$ and $42b_1$ and main information regions $42a_2$ and $42b_2$, respectively. In both of the control data regions $42a_1$ and $42b_1$ of the information recording layers 42a and 42b, optical storage medium information containing key information for decoding information recorded in their main information regions is recorded by wobbling grooves with a modulation method common to the both layers. In addition, in each of the control data regions $42a_1$ and $42b_1$ in the information recording layers 42a and 42b, the optical storage medium information for the information recording layer 42a and the optical storage medium information for the information recording layer 42b are both recorded. With this configuration, when the information recorded in the optical storage medium 42 is reproduced or information is recorded therein, irrespective of the focus being adjusted into either one of the information recording layers, it becomes possible to easily distinguish the configuration of the optical storage medium 42.

Meanwhile, in the main information region $42a_2$ of the information recording layer 42a, information is recorded as a pit row, and in the main information region $42b_2$ of the information recording layer 42b, grooves from which a tracking error signal can be obtained are formed. Also in the case of the information recording layer 42b being a write-once type also, grooves are formed in the main information region $42b_2$ similarly. By providing a commonality of positions for recording information by wobbling in the control data regions $42a_1$ and $42b_1$ and their modulation methods among all of a read-only type optical storage medium, a rewritable type optical storage medium and a write-once type optical storage medium, the time required to judge a type of an optical storage medium after the insertion of the optical storage medium to the information recording/reproducing apparatus can be shortened. Therefore, the time required until the information recording/reproducing apparatus becomes ready for the recording/reproduction can be reduced. In addition, since a procedure for identifying an optical storage medium is common to any types of optical storage media, commonality of hardware and software can be provided in an information apparatus exclusively used for reproduction and in an information apparatus capable of recording and reproducing. Correspondingly, the cost for the development of the apparatus and the cost for mass production can be reduced, so that an information apparatus can be provided at a low price. Naturally, the optical storage medium may have three or more information recording layers, or the information recording layers may be any one of a read-only type, a write-once type and a rewritable type. In the case of a recordable optical storage medium in which grooves are formed in a main information region and information is recorded with a mark row, the preferable depths of the grooves and pits are within $\lambda/16$ to $\lambda/8$. The reason for this is as follows: that is, when the information is recorded with a mark row, a smaller depth of the grooves increases the amplitude of information signals obtained from the mark row, because a diffraction loss due to the grooves can be reduced. On the other hand, a tracking error signal detected by the push-pull method becomes the maximum when the depth of the grooves is $\lambda/8$. When the depth of the grooves is shallower than $\lambda/8$, the amplitude of the tracking error signal decreases with decreasing the depth of the grooves. The strength of the tracking error signal when the depth of the grooves is $\lambda/16$ becomes a half of that of the tracking error signal when the depth of the grooves is $\lambda/8$. The decrease in signal amplitude of the tracking error signal up to around a half is sufficiently permissible. Therefore, with consideration given to both of the tracking error signal and the information signal, the optimum range of the depth of the grooves becomes $\lambda/16$ to $\lambda/8$.

Meanwhile, one possible concerns is an improper action of copying of an optical storage medium by peeling a protective layer from the optical storage medium so that pit formation portions are exposed, applying a coating to form a master and stamping the same. To cope with these concerns, a bar code as disclosed in JP 2000-76659A can be used in combination with the above-described optical storage medium of this embodiment, whereby the optical storage medium can be guarded from the copying. Furthermore, in the case of an optical storage medium including a plurality of information recording layers as in this embodiment, it becomes extremely difficult to copy the medium by peeling a protective layer so as to expose pit formation portions.

The above description exemplifies the configuration in which both of the optical storage medium information on the information recording layer 42a and the optical storage medium information on the information recording layer 42b are recorded in each of the control data regions $42a_1$ and $42b_1$ of the information recording layers 42a and 42b. However, the optical storage medium information for both may be recorded in at least one of the control data regions $42a_1$ and $42b_1$ of the information recording layers 42a and 42b. In such a case, it is preferable to record the both optical storage medium information in a standard layer of the optical storage medium 42.

Moreover, in the above description, the optical storage medium information containing the key information for decoding the information recorded in the main information region is recorded in the control data regions $42a_1$ and $42b_1$ of the information recording layers 42a and 42b by wobbling the grooves in a modulation method common to the both layers. However, the grooves are not necessarily wobbled.

Embodiment 4

Figure 5:
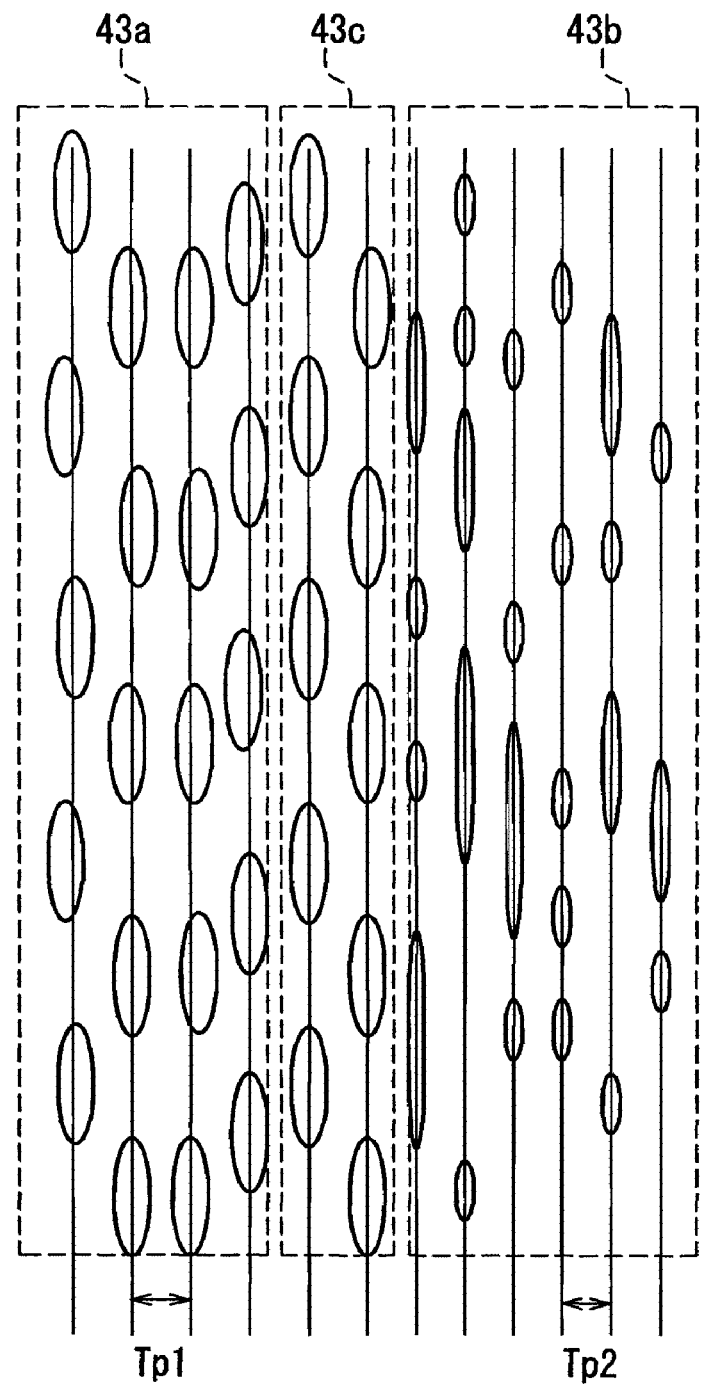
FIG. 5 is an enlarged schematic view showing a boundary between the control data region and the main information region of an optical storage medium according to Embodiment 4 of the present invention.

FIG. 5 shows one example of a configuration of another optical storage medium according to the present invention.

FIG. 5 is an enlarged view of a portion in the vicinity of a boundary between a main information region 43b and a control data region 43a of the optical storage medium according to this embodiment. Like the optical storage medium 41 according to Embodiment 1 or 2, this optical storage medium includes the control data region 43a, the main information region 43b and a buffer region 43c. In the main information region 43b, information to be stored is recorded with pit rows from which the information can be read out by means of light. In the control data region 43a, optical storage medium information (physical format information and optical storage medium manufacturing information) are recorded with pit rows from which the information can be read out by means of light. Also, in the buffer region 43c, pit rows are formed. Although the optical storage medium 41 in Embodiment 1 contains the information (the optical storage medium information) in the control data region 41a recorded by wobbling the continuous grooves, the optical storage medium in this embodiment contains information in the control data region 43a recorded as wobbled pit rows. Since the pit rows are formed also in the control data region 43a, a tracking error signal can be generated by a phase-difference method and tracking control can be performed using the signal.

A reproduction signal of the information recorded in the main information region 43b can be obtained from the total amount of light (hereinafter referred to as a sum signal) received by a photodetector that receives a beam applied to the main information region 43b. On the other hand, a reproduction signal of the information recorded in the control data region 43a can be obtained by receiving a beam applied thereto with a photodetector having two photo-receptive portions and by performing a differential operation of signals output from the two photo-receptive portions (hereinafter referred to as a differential signal). By recording the information with pit rows in both of the control data region 43a and the main information region 43b, a molding pressure applied when the optical storage medium is manufactured can be made small, and correspondingly the cost required for the molding machine can be reduced. In addition, the time required for the molding also can be shortened, so that an optical storage medium can be provided at a low cost.

Here, a track pitch $Tp_2$ in the main information region 43b is 0.32 μm and a track pitch $Tp_1$ in the control data region 43a is 0.35 μm. Assuming that a width of the pits formed in the control data region 43a is $Mw_1$, the following relationship is satisfied:

$$Mw_1 = 0.5 \times Tp_1$$

In addition, assuming that a width of the pits formed in the main information region 43b is $Mw_2$, the following relationship is satisfied:

$$Mw_2 = 0.3 \times Tp_2$$

That is to say, the width $Mw_1$ of the pits formed in the control data region 43a is wider than the width $Mw_2$ of the pits formed in the main information region 43b. With this configuration, both of the information recorded in the control data region 43a and in the main information region 43b can be reproduced with high reliability. The reason for making the width $Mw_1$ of the pits formed in the control data region 43a and the width $Mw_2$ of the pits formed in the main information region 43b different from each other is as follows: that is, a reproduction signal of the information recorded in the control data region 43a is obtained using a sum signal, whereas a reproduction signal of the information recorded in the main information region 43b is obtained using a differential signal, so that the optimum condition for the pit width is different between the regions. Note here that the width $Mw_1$ of the pits formed in the control data region 43a is preferably within the following range:

$$0.3 \times Tp_1 \leq Mw_1 \leq 0.7 \times Tp_1$$

The reasons for this preferable range are as follows: when a signal is obtained by performing a differential operation, the quality of the signal becomes the best if the following relationship is satisfied:

$$Mw_1 = 0.5 \times Tp_1$$

Also, a variation in the signal amplitude caused by a variation in the width $Mw_1$ of pits, generated during the manufacturing of the optical storage medium, also becomes the minimum. Therefore, as long as $Mw_1$ is within the above range, a substantially favorable signal quality can be obtained. Meanwhile, as long as the width $Mw_2$ of the pits formed in the main information region 43b does not exceed $0.5 \times Tp_2$, a favorable signal can be obtained from there.

It is preferable that each of the effective lengths of pits and spaces formed in the control data region 43a, the main information region 43b and the buffer region 43c is an integral multiple of a predetermined period T. The period T, for example, is 0.08 μm. The pits and the spaces formed in the main information region 43b are encoded using a 1-7 modulation, where each of them has a length of 2 T to 8 T. Whereas, each of the pits and the spaces formed in the control data region 43a has a uniform length of 8 T.

Making each of the pits and the spaces have a uniform length can prevent erroneous output of invalid results on the phase comparison in a phase comparison operation by a phase comparator that constitutes a phase-locked loop. As a result, a considerably stable clock signal can be generated. In addition, by making each of the pits and the spaces have a uniform length, a differential signal can be input to a bandpass filter having a narrow band so that noise can be reduced significantly, which leads to an increase in a S/N of the differential signal. Therefore, the information recorded in the control data region 43a can be reproduced with high reliability.

In addition, it is preferable that length $ML_1$ of the pit or the space formed in the control data region 43a has the following relationship, where λ denotes a wavelength of a light source of an optical pickup (e.g., 405 nm) and NA denotes a numerical aperture of an objective lens (e.g., 0.85):

$$ML_1 \geq 2 \times \lambda / NA$$

If this relationship is satisfied, even when an equalizer is not used for generating a clock signal, a signal obtained from the pits and the spaces can have a sufficient large amplitude, so that a favorable clock signal can be obtained and therefore a circuit size can be reduced. Correspondingly, an information reproducing apparatus can be provided at a low cost.

Furthermore, the following relationship for the equivalent depth $Md_1$ of the pits is preferable, because if the relationship is satisfied, a high quality signal can be obtained:

$$\lambda/8 \leq Md_1 \leq \lambda/4$$

Moreover, by setting each of lengths of the pits and the spaces formed in the control data region 43a and a period of the wobble formed therein at an integral multiple of the period T, the information recorded by the wobbling modulation in the control data region 43a can be detected using a clock signal that can be generated from the repetition of the pits and the spaces. Since the pits and the spaces are always capable of being formed alternatively with each other, their occurrence frequencies are higher than the wobble. Thus, a stable clock signal can be generated from the repetition of the pits and the spaces, and therefore the information recorded in the control data region 43a can be detected with high reliability.

Figure 6:
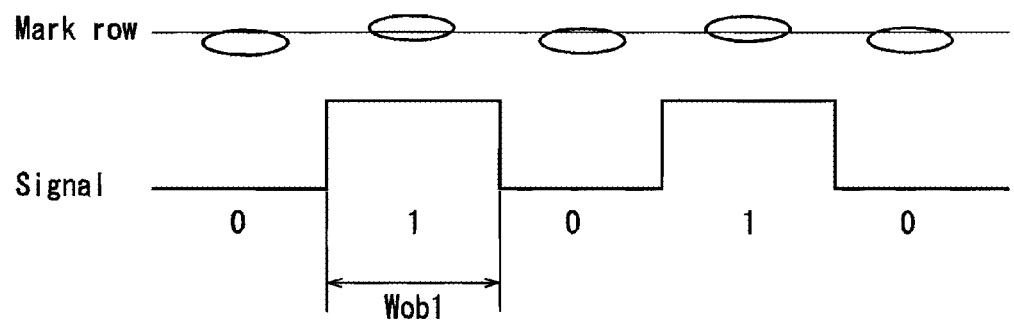
FIG. 6 schematically shows a wobble pit and a digital signal of the optical storage medium according to Embodiment 4 of the present invention.

FIG. 6 shows an example of wobbling pits recorded in the control data region 43a and a digital signal detected using a differential signal.

In this example, a length Wob1 of one wobble is set at 16 T, and there is a pit with a length of, for example, 8 T at a center of information corresponding to 1 or 0. In other words, pulse-position modulation is carried out in this example. Since the pulse-position modulation can impart the jitter-resistance, the information recorded in the control data region 43a can be reproduced with high reliability. Additionally, since there is a transition time required for wobbling the pits at a timing of the spaces, a quick response is not required. Therefore, a modulation device such as an acoustooptic device is available at a low price, and correspondingly an optical storage medium can be provided at a low price.

Also in the optical storage medium in this embodiment, the information is recorded in the control data region as a wobble signal that is modulated at a frequency much higher than the tracking servo band. For that reason, even when copying of the optical storage medium is attempted using an ordinary information recording/reproducing apparatus, the wobbling modulated pits cannot be copied, which can guard the optical storage medium from copying. In this way, improper copying can be precluded effectively.

Note here that although this embodiment describes the pits and the spaces formed in the control data 43a, each having the uniform length of 8 T, pits and spaces with a plurality of different lengths formed according to a specific modulation rule may be formed in the same manner as in the pits recorded in the main information region. In such a case, the pits and the spaces by themselves can have information, and correspondingly a large capacity optical storage medium can be realized. This configuration is particularly effective when identification information is recorded with wobbling so as to indicate that the optical storage medium is manufactured properly or the information therein may be reproduced and pit rows and space rows by themselves have key information for decoding the encrypted data information. In this case, since the key information can contain massive amounts of data, it becomes difficult to conduct an improper analysis of the encrypted data information so as to decode the same. Therefore, this configuration can enhance the confidentiality of the data information recorded in the main information region. By making the modulation rule applied to the pits and the spaces recorded in the control data region 43a identical to a modulation rule applied to the pits and the spaces recorded in the main information region 43b, a circuit for demodulation can be shared with both regions, and correspondingly an information reproducing apparatus can be provided at a low cost.

Note here that although this embodiment describes the example in which the information recorded in the main information region 43b is not encrypted, encrypted data information also can be recorded in the main information region 43b. In such a case, in the same manner as in the optical storage medium according to Embodiment 1, key information for decoding the encrypted data information may be recorded in the control data region 43a as optical storage medium information, in addition to physical format information and optical storage medium manufacturing information. Furthermore, an information reproducing apparatus for reproducing this optical storage medium can be configured in the same manner as in the information reproducing apparatus according to Embodiment 2.

Embodiment 5

Figure 7:
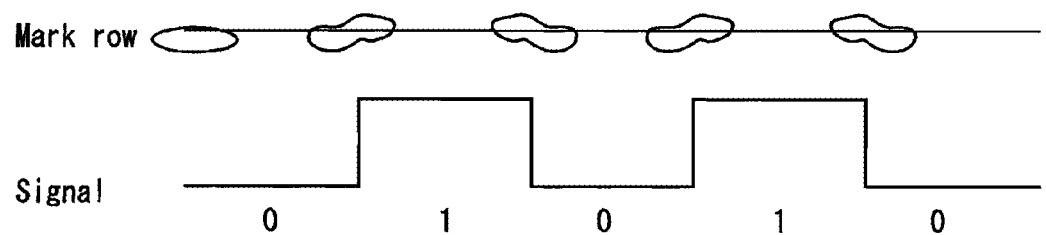
FIG. 7 schematically shows a wobble pit and a digital signal of the optical storage medium according to Embodiment 5 of the present invention.

FIG. 7 shows a modification of the optical storage medium according to Embodiment 4, which shows a state of wobbling pits recorded in a control data region and a digital signal detected using a differential signal. This optical storage medium is different from the optical storage medium described in Embodiment 4 in that a pit is located at an edge of information corresponding to 1 or 0, whereas the pit of the optical storage medium in Embodiment 4 is located at a center of information corresponding to 1 or 0. When the optical storage medium of this embodiment is used, a differential signal is sampled at a timing of the edge of information corresponding to 1 or 0 so as to conduct a judgment between 1 and 0, whereby a S/N in the same level as from a wobbled continuous groove can be secured. Thereby, the information recorded in the control data region 43a can be detected with high reliability.

Embodiment 6

Figure 8:
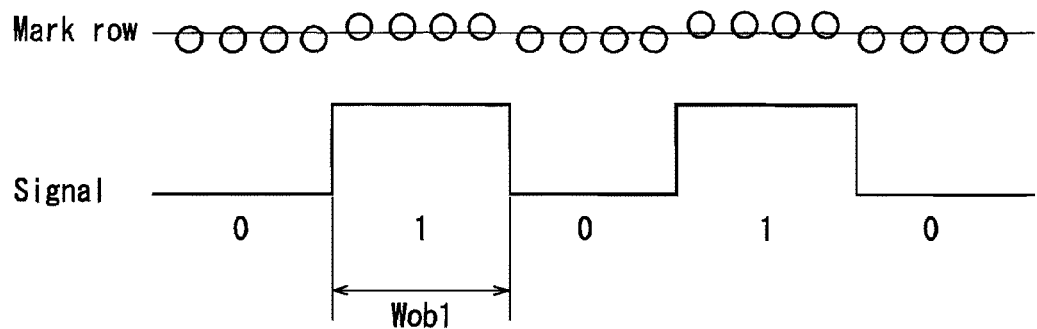
FIG. 8 schematically shows a wobble pit and a digital signal of the optical storage medium according to Embodiment 6 of the present invention.

FIG. 8 shows another modification of the optical storage medium according to Embodiment 4, which shows a state of wobbling pits recorded in a control data region and a digital signal detected using a differential signal. This optical storage medium in this embodiment is different from the optical storage medium described in Embodiment 4 in that pits and spaces each have substantially a length of 2 T, whereas the pits and the spaces of the optical storage medium in Embodiment 4 each have substantially a length of 8 T.

Length $ML_1$ of the pit or the space has the relationship of $ML_1 \geq \lambda/(2 \times NA)$. In this case, a clock signal can be generated using a signal obtained from the repetition of the pits and the spaces.

A length Wob1 of one wobble is set at 16 T, and, if the wobbles are present consistently, a period of the wobbling becomes 32 T. On the other hand, since a repetition period of the pits and the spaces is 4 T, the period of the wobbling equals 8 times the repetition period of the pits and the spaces. By setting the period of the wobbling at 4 times or greater the repetition period of the pits and the spaces, the information recorded in the control data region 43a can be detected with high reliability with a reduced influence from whether a pit or a space is formed on an adjacent track.

Additionally, by making the repetition period of the pits and the spaces shorter than the period of the wobbling, a differential signal can be input to a bandpass filter having a narrow band, through which a signal at a frequency corresponding to the repetition period of the pits and the spaces is passed, so that noise can be reduced significantly, which leads to an increase in a S/N of the differential signal. Also, this configuration can reduce an influence from whether a pit or a space is formed on an adjacent track. Therefore, the information recorded in the control data region 43a can be reproduced with high reliability.

Embodiment 7

Figure 11:
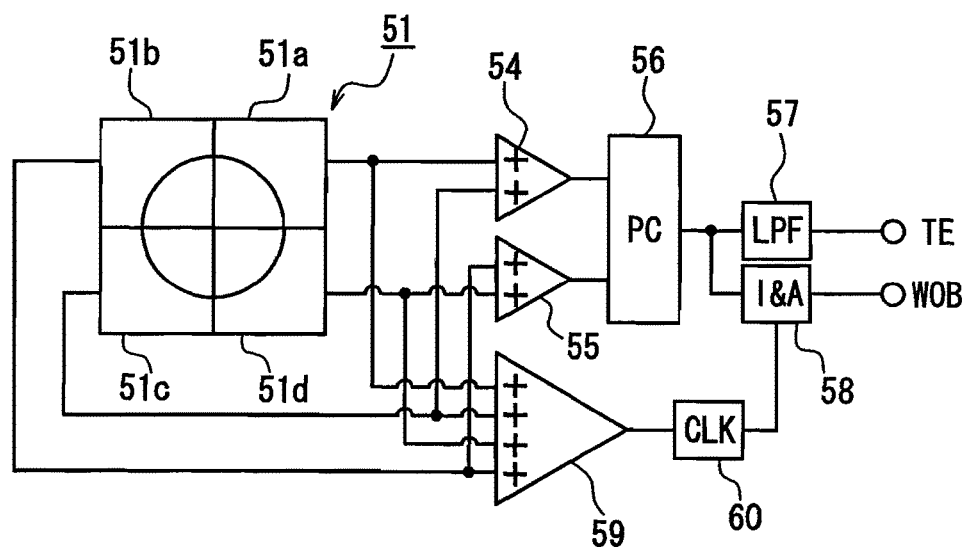
FIG. 11 schematically shows an optical detector and a wobbling signal detection unit that make up the information reproducing apparatus according to Embodiment 7 of the present invention.

FIG. 11 shows a modification of the information reproducing apparatus according to the present invention, which schematically indicates a photodetector 51 as one element of the optical pickup 4 and a configuration for detecting a tracking error signal and a wobbling signal. The configuration for detecting a tracking error signal and a wobbling signal constitutes a portion of an element of the control unit. By replacing the tracking error signal detection unit of the control unit 9 with this configuration, an information reproducing apparatus can be configured. In this embodiment, a tracking error signal and a wobbling signal are detected by a phase-difference method. Signals output from photo-receptive portions 51a and 51c are added by an adding unit 54 and signals output from photo-receptive portions 51*b* and 51*d* are added by an adding unit 55. Signals output from the adding units 54 and 55 are input to a timing comparator 56. The timing comparator 56 outputs a signal responsive to a timing of a change in diffraction light from a beam applied by the optical pickup 4 to a leading edge and to a terminating edge of a mark formed in an information recording layer of the optical storage medium 41. A signal output from the timing comparator 56 is reduced in high frequency components that are unnecessary for tracking servo by a low-pass filter 57 so as to be rendered as a tracking error signal. Also, a signal output from the timing comparator 56 is subjected to integrating-averaging by an integrating-averaging unit 58 so as to be rendered as a wobbling signal.

An adding unit 59 adds signals output from the photo-receptive portions 51*a* to 51*d*, and then outputs the same to a clock signal generation unit 60. The clock signal generation unit 60 generates a clock signal, a frame synchronous signal and a wobble polar signal from a mark row formed in the information recording layer of the optical storage medium 41, and outputs the same to the integrating-averaging unit 58. The integrating-averaging performed by the integrating-averaging unit 58 is controlled by a signal output from the clock signal generation unit 60.

Figure 12:
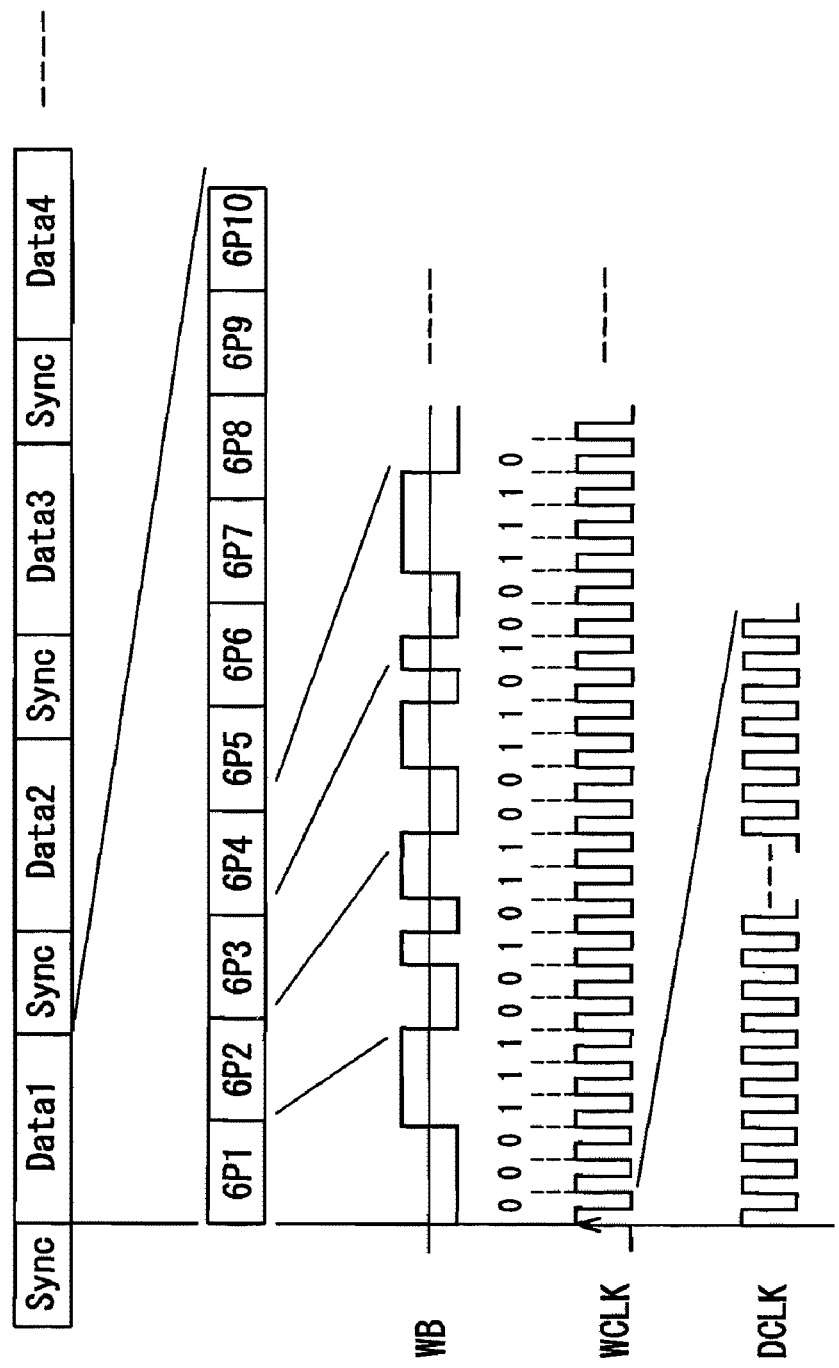
FIG. 12 schematically shows a format of information recorded in an information recording layer of the optical storage medium that is used in the information reproducing apparatus according to Embodiment 7 of the present invention.

FIG. 12 shows a format of information recorded in the information recording layer of the optical storage medium 41. In the information recording layer, a frame synchronous pattern Sync and a data row Data1, Data2, . . . are recorded alternately. Normally, a synchronous pattern of about 1 byte to 10 bytes is provided with respect to a data row of 10 bytes to 1 kilobytes, which can prevent a lot of errors due to bit slip and the like from occurring when the information is read out. In a data row, data that corresponds to 1 or 0 after being subjected to the code translation is recorded as a mark or a space, respectively. According to EFM, a mark or a space with a length of 3 T to 8 T is recorded. According to EFMplus, a mark or a space with a length of 3 T to 14 T is recorded. According to 1-7pp modulation, a mark or a space with a length of 2 T to 8 T is recorded. EFM, EFMplus and 1-7 pp refer to a code translation method that is used for compact discs, DVDs and Blu-ray discs, respectively. Here, T denotes a fundamental frequency, and a mark of 3 T means a mark with a length three times a length of T.

In this optical storage medium, 1-bit key information is allocated to one data row. Each of 6P1 to 6P10 is a group of wobble patterns, and as shown in a table of patterns of FIG. 13, one wobble pattern consists of 6 bits. In the case of the wobble pattern 6P1, if the bit of the key information is 1, then the pattern becomes 000111, and if the bit of the key information is 0, the pattern becomes 111000. That is, complements are allocated. The allocation of complements makes a configuration of hardware or software used for distinguishing whether a bit of the key information is 1 or 0 considerably simple, so that an information reproducing apparatus can be provided at a low cost. The same applies to wobble patterns 6P2 to 6P10, as shown in FIG. 13.

Additionally, by making the amplitude of the wobbling symmetric with respect to a center of a track depending on 1 or 0 of the wobble pattern, DC-free characteristics can be realized in a range of each wobble pattern, thus producing no adverse effects on the tracking servo. Furthermore, by wobbling a mark row in accordance with the wobble pattern shown in the table of patterns of FIG. 13, the wobbling can be recorded as a kind of pseudo random pattern. Therefore, the degree of difficulty in the decoding is increased, so that improper duplication tends to be suppressed. Moreover, in this embodiment, ten wobble patterns 6P1 to 6P10 that are allocated to one data row are in synchronization with each of the synchronous pattern Sync and the data recorded in the data row.

The data row Data1 of FIG. 12 shows a case where the bit of the key information is 1. In accordance with conditions of the wobble patterns 6P1 to 6P10, marks to be recorded in the information recording layer are wobbled. A waveform WB is a signal waveform schematically showing a timing of the wobbling. A length of 1 bit of the wobble patterns 6P1 to 6P10 corresponds to one period of a wobble clock signal WCLK. The wobbling waveform is changed in wobbling at a timing of the rising edge of the wobble clock signal WCLK. It is preferable that one period of the wobble clock signal is set approximately at a few times to 10,000 times of the fundamental frequency T. The minimum length thereof is restricted by a code translation method, and the maximum length thereof is restricted by a condition defined by such a range that would not adversely affect the servo characteristics of the tracking servo. In this embodiment, one period of the wobble clock signal WCLK is set at 100 times the fundamental frequency T. Therefore, there are a plurality of marks and spaces within the length corresponding to 1 bit of the wobble pattern. Thus, a plurality of signals that correspond to the number of the marks are output from the timing comparator 56. The integrating-averaging unit 58 performs an integrating-averaging operation of the plurality of signals output from the timing comparator 56, while switching a polarity of the integration based on the rule of wobble patterns shown in FIG. 13 and wobble polar signals output from the clock signal generation unit 60. Assuming that the number of integration performed by the integrating-averaging unit 58 is N, a S/N ratio is improved by the square root of N. Therefore, as the number of integration N increases, so does the reliability of the read-out key information. The number of wobbles allocated to 1-bit key information can be designed freely depending on the number of bits of key information to be recorded, a time allowed to spend in reading-out, a required S/N ratio and the like. If the required S/N ratio is made fixed, as the number of wobbles allocated to 1-bit key information is increased, the amplitude of the wobbling can be made small, and correspondingly an influence of crosstalk can be reduced. Therefore, even when the key information is recorded in the main information region, in addition to in the control information region, the key information can be recorded without the degradation of a signal quality in the main information region. When the wobble is set to be not more than ⅓₀ of a track pitch, the influence of the crosstalk can be ignored totally.

Note here that the format of FIG. 12 illustrates the case where the key information is provided continuously. However, the key information may be provided discretely in the information recording layer. In such a case, the degree of difficulty in decoding is more increased, so that improper duplication tends to be further suppressed. In the case where the key information is provided continuously, a time required for reading-out can be shortened, so that a waiting time for a user of the information reproducing apparatus can be shortened.

In addition, this embodiment describes the case where the DC-free characteristics can be realized by one wobble pattern consisting of 6 bits. However, this is not particularly limited, and the DC-free may be realized with 4 bits as shown in a table of patterns of FIG. 14, or may be realized with further more bits.

Furthermore, this embodiment does not describe wobble patterns used for the data rows of Data2 or later. In this respect, patterns according to the same rule applied to the patterns recorded in the data row Data 1 may be recorded, or different patterns may be recorded. Additionally, only a specific wobble pattern may be used, for example, the wobble pattern 6P1 only may be recorded in each data row. As the number of wobble patterns used is decreased, a configuration of an information reproducing apparatus can be simplified, and correspondingly the cost can be reduced. On the other hand, as the number of wobble patterns used is increased, it becomes difficult to decode the patterns, so that improper duplication tends to be suppressed.

Alternatively, a plurality of tables of patterns may be provided so that the polarity of wobbling is changed at a timing corresponding to a space and not a mark. By setting a timing of the change in the polarity of wobbling so as to correspond to a space, adverse effects caused by the performance of a modulator that deflects a beam used for cutting a master of the optical storage medium can be reduced, and correspondingly an optical storage medium from which the key information can be read out with high reliability can be provided.

Based on a signal varying with a mark row and a space row, the clock signal generation unit 60 shown in FIG. 11 generates a data clock signal DCLK used for reading out data, a wobble clock signal WCLK used for reading out a frame synchronous signal and the wobbling and a wobble polar signal. The wobble clock signal WCLK and the wobble polar signal can be generated because the wobble pattern is in synchronization with the frame synchronous pattern and the data row. By generating the wobble clock signal WCLK based on the signal varying with a mark row and a space row, the wobble clock signal WCLK can be generated even when the amplitude of the wobble is small or recording is conducted discretely. In addition, by setting one period of the wobble clock signal WCLK at an integral multiple of the data clock signal DCLK, the wobble clock signal WCLK can be generated using a counter circuit without the provision of a new phase-locked loop. Correspondingly, an information reproducing apparatus can be realized with a simple circuit configuration and at low cost. The synchronization of the frame synchronous pattern with the wobble requires only the wobble of M/2 in number for one frame synchronous pattern. Alternatively, there may be a frame synchronous pattern of M/2 in number for one wobble. Here, M is a natural number. Therefore, a relationship between the frame synchronous pattern and the wobble can be set freely depending on the desired design.

In addition, the configuration of the detection unit shown in this embodiment for detecting a tracking error signal by a phase-difference method is described as one example, and needless to say, a configuration with delay means added thereto, and a configuration in which the timing of a change in signals output from two photo-receptive portions out of four photo-receptive portions is compared are both applicable to the configuration for detecting a tracking error signal by a phase-difference method.

Furthermore, this detection method is particularly effective for a wobbled mark row. The phase-difference method is a method to detect the timing of a change in light diffracted by the marks, which only requires an AC coupled signal to be input to a phase comparator, so that this method is free from an influence of an offset that might occur electrically or optically and correspondingly can detect a signal with high reliability.

Moreover, the period of wobble, the track pitches, the wavelength of a light source, the numerical aperture of an objective lens and the like shown in the above-described embodiments are described as one example, and they may have various values so as not to deviate from the scope of the present invention.

In addition, the shape of the optical storage medium is not limited especially, and various shapes such as a disc form and a card form are available as needed.

Note here that the above embodiments illustrate the optical storage medium in which the optical storage medium information including the key information is recorded in the control data region by wobbling the grooves or the pits, where the grooves or the pits may be either one of concaves and convexes. Also, the wobble modulation may be two-valued modulation or three-valued modulation. The modulation rule for encoding also is not limited especially, and therefore various modulation rules are applicable.

Furthermore, in the optical storage medium having a plurality of information recording layers, it is preferable to record recording layer information, which concerns how the surface shape for recording information is formed in each information recording layer, or information concerning a polarity of a tracking error signal (hereinafter referred to as polarity information) as the optical storage medium information in the control data region. This recording layer information indicates which one of concave or convex grooves or concave or convex pits with respect to a side on which light is incident is formed to record information in the information recording layer. In this way, by recording the polarity information, tracking operation can be performed on a desired track even when a tracking error signal is detected by a push-pull method. If the polarity information is not recorded, when information is firstly recorded or reproduced with respect to the optical storage medium, the tracking operation requires a time for learning the polarity because the polarity of the tracking error signal is unknown and it is unknown the tracking is to be conducted on which one of on-the-track and between-the-tracks. If the polarity information is recorded as the optical storage medium information in the control data region, the polarity of a tracking error signal in each layer is known in advance, and therefore a time for learning the polarity is unnecessary. Therefore, the time required for recording or reproducing information can be shortened correspondingly. It is preferable to record the polarity information at least in a layer as a standard layer of the plurality of information recording layers. The standard layer in the optical storage medium having the plurality of information recording layers is a layer located in the same position as that of the information recording layer in the optical storage medium having a single information recording layer. In other words, assuming that a distance from the light incident surface to the information recording layer in the optical storage medium having the single information recording layer is X, the information recording layer in the optical storage medium having the plurality of information recording layers, which is located at the distance X from the light incident surface, is the above-described standard layer. Note here that to record the polarity information in each information recording layer in the optical storage medium having the plurality of information recording layers is more preferable.

Moreover, since the present invention is applicable to both cases where the marks are formed as concaves and convexes, various methods can be selected freely when the optical storage medium is manufactured. Thereby, an optical storage medium can be provided at a low cost.

In the present invention, a medium is not limited to the configuration in which a mark row is formed as convexo-concave pits, and the present invention is applicable to an optical storage medium in which a mark row is formed with a difference in density of a coloring agent.

If data is recorded in the main information region with a concave or convex pit row, it is preferable to record information in the control data region also as with a concave or convex pit row. By recording with a pit row in both of the main information region and the control data region, the shaping operation for manufacturing the optical storage medium becomes much easier than the case where the pits and the grooves are mixed. Therefore, the yields for manufacturing the optical storage medium can be improved correspondingly and an optical storage medium can be provided at a low cost. In addition, by recording the information relating to the optical storage medium in the control data region as a pit row adopting the same modulation method as in the information recorded in the main information region, the hardware that is used for reproducing the information recorded in the main information region can be used also for reproducing the information recorded in the control data region, and therefore an information reproducing apparatus can be provided at a low cost. Furthermore, it is also preferable to record the information relating to the optical storage medium with a pit row and to record the key information by wobbling the pits recorded in the control data region. With this configuration, when the information recorded in the control data region is read out, the key information can be read out at the same time. That is to say, since this configuration substantially can eliminate a time required for reading out the key information, an information reproducing apparatus can be provided so as not to impose restrictions on a time required from the insertion of the optical storage medium into the information reproducing apparatus to the reproduction of the information recorded in the optical storage medium and so as not to impose a burden of a further waiting time. Note here that information for distinguishing whether the optical storage medium is an authorized optical storage medium or an improper duplicated optical storage medium, such as identification information indicating that the optical storage medium is manufactured properly or the information therein may be reproduced, can be used instead of the key information, and in such cases the objects of the present invention can be achieved similarly. In the case of an optical storage medium having a format applying a phase-difference method so as not to interfere with the reproduction of information, it is preferable to set a substantial depth of pits at approximately $\lambda/4$. In this state, the jitter of a signal obtained from the pit row becomes the best, and furthermore a tracking error signal obtained by a phase-difference method also has the best S/N. As a result, an optical storage medium with high reliability can be obtained.

The use of the integrating-averaging unit improves a S/N ratio, and this is not limited to a detection method by a phase-difference method. In other signal detection methods such as a push-pull method, the use of the integrating-averaging unit can improve their S/N ratios.

Embodiment 8

The following describes Embodiment 8 of the present invention in detail, with reference to the drawings. In the following description, a DVD is illustrated as an optical storage medium, but the optical storage medium of the present invention is not limited to a DVD.

Figure 15:
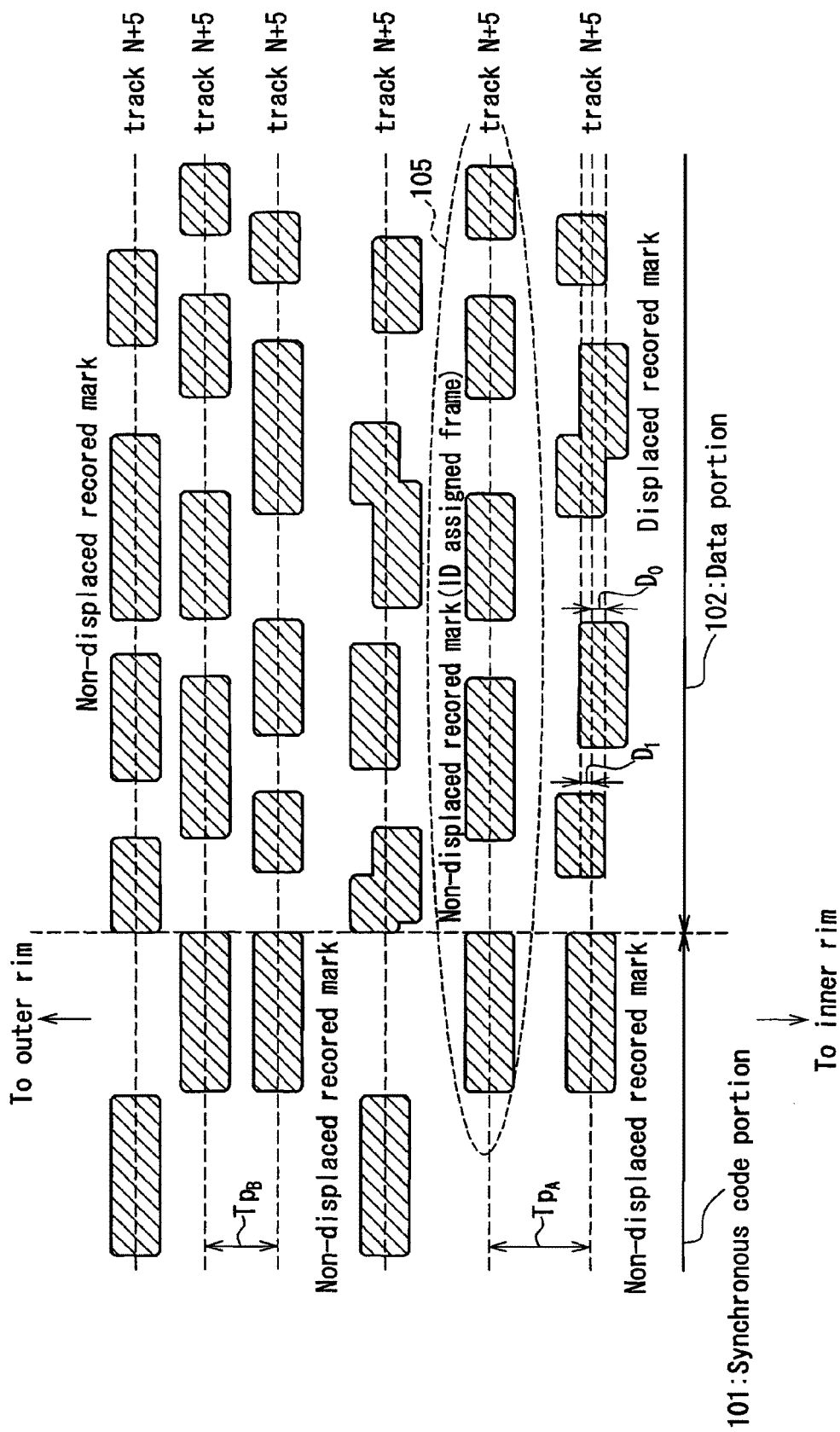
FIG. 15 is a conceptual diagram showing a shape of recording marks in an optical disc according to Embodiment 8.

FIG. 15 is a conceptual diagram showing displacement of recording marks in a DVD of this embodiment. In the DVD of this embodiment, main information is recorded in units of a frame, and a frame includes a synchronous code portion 101 and a data portion 102. In this DVD, in at least a part of frames, sub-information is recorded by displacing recording marks slightly in a radial direction based on a displacement control signal in the data portion 102 and not in the synchronous code portion 101.

The displacement control signal of the DVD according to this embodiment is a signal obtained by performing spread-spectrum of the sub-information using a pseudo random number sequence that is initialized at an insertion position of a synchronous code. In a section with the displacement control signal of "1", recording marks are displaced by a slight displacement amount $D_1$ toward an outer rim side of the disc. On the other hand, in a section with the displacement control signal of "0", recording marks are displaced by a slight displacement amount $D_0$ toward an inner rim side of the disc.

Here, it is preferable that the amount of displacement of the recording marks ranges from 5 nm p-p (nanometer peak to peak) to 20 nmp-p. By setting the displacement amount of the recording marks in the radial direction at this range, it becomes difficult to observe the recording marks with a SEM (scanning electron microscope) and it becomes possible to read out the wobbling with stability.

Furthermore, it is preferable that the period of displacement of the recording marks (wobbling period) is in a band higher than the band that the tracking servo tracks. This is because, if the tracking servo tracks it, it becomes impossible to detect the wobble. For instance, in the case of 16 T wobble, a band of 3.75 MHz or higher is preferable.

In addition, it is preferable that wobbles of an integral number are present in each frame. This configuration allows the pit shift in wobble detection to be corrected, so that the wobble in synchronization with main information can be formed.

On the other hand, in a region such as the synchronous code portion 101 that is an important region for reproducing main information, the above-described displacement of the recording marks in the radial direction is not conducted, and therefore an influence on the accuracy of reading out main information can be minimized even when sub-information is recorded.

In addition, in the DVD, an ID that is important for reproducing main information is recorded in the $1^{st}$ frame in a sector.

In the DVD according to this embodiment, displacement in the radial direction is not conducted in important frames including a frame to which an ID is assigned (e.g., a frame 105 shown in FIG. 15). That is to say, whether or not to conduct the displacement in the radial direction is controlled in units of a frame.

In addition, in the DVD according to this embodiment, the sub-information is recorded by displacing recording marks slightly in the radial direction. Therefore, a recording mark displaced in the radial direction and a recording mark on an adjacent track might be influenced by each other (crosstalk) during the reproduction, which degrades the reproduction quality. To cope with this, in the DVD according to this embodiment, a track pitch $Tp_A$ in a region for recording the sub-information, i.e., in a region where recording marks are displaced slightly in the radial direction, is set not less than a track pitch $Tp_B$ in a recording region not for recording the sub-information, i.e., in a region where recording marks are not displaced in the radial direction, so as to solve the crosstalk problem. However, if the displacement amount of recording marks in the radial direction is so small that the cross-talk problem would not be generated, the track pitch in a region for recording the sub-information may be equal to the track pitch in a region not for recording the sub-information.

Furthermore, in the DVD according to this embodiment, the displacement amount of the recording marks in the radial direction may be set so as not to exceed a radial displacement amount that is permissible in a normal optical disc for which the displacement in the radial direction is not conducted. With this configuration, it becomes difficult to confirm the presence or absence of the sub-information from the shape of the recording marks, so that more confidential information can be recorded as the sub-information.

Figure 16:
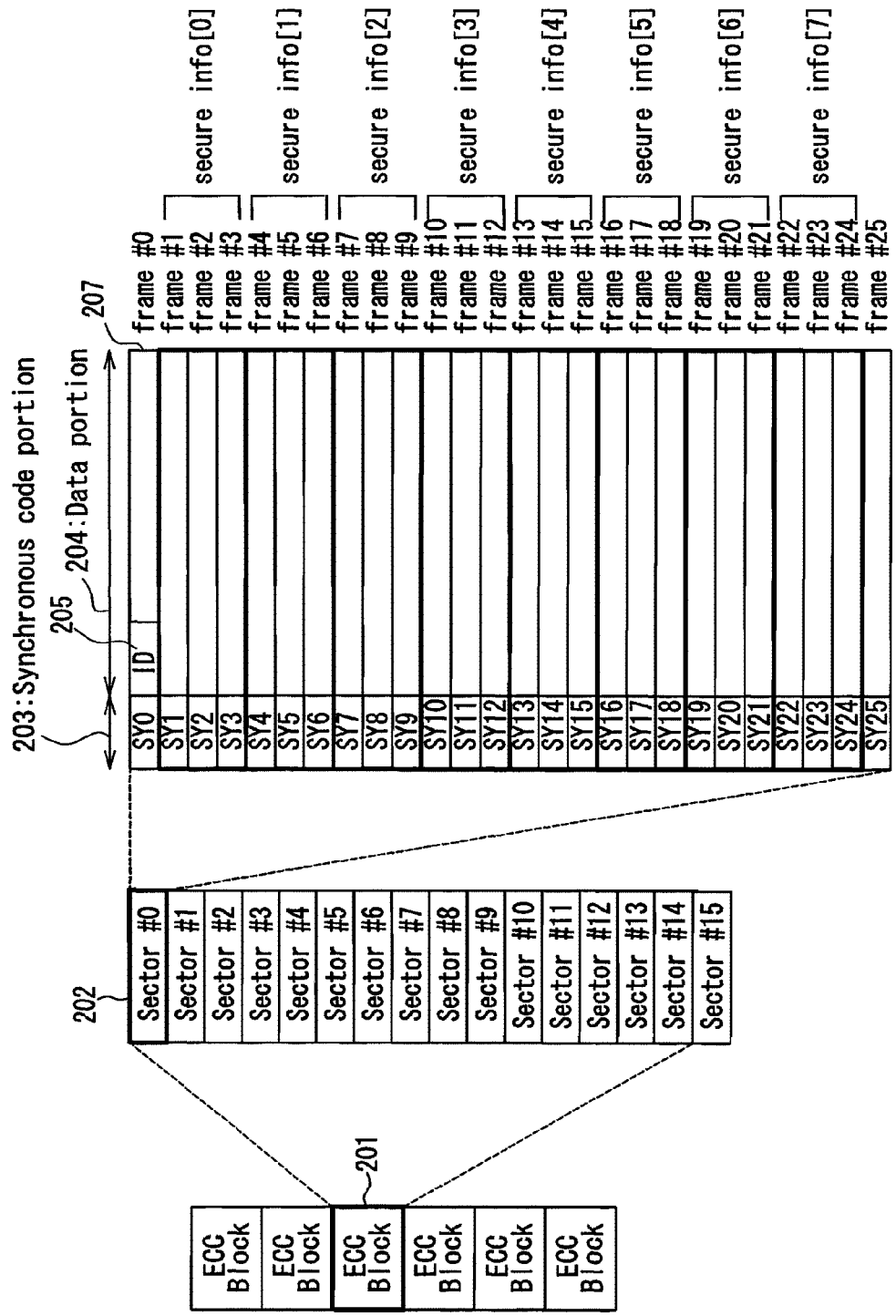
FIG. 16 is a conceptual diagram showing a recording format of sub-information according to Embodiment 8.

Next, a format for recording the sub-information with the slight displacement of recording marks in the radial direction will be described with reference to FIG. 16.

The DVD has sixteen sectors 202 in an ECC block 201 that is a logical unit for reading-out. In the sector 202, there are twenty six frames 207, each including a synchronous code portion 203 and a data portion 204. In the $1^{st}$ frame (#0) of the sector 202, an ID 205 is assigned at the data portion 204.

Embodiment 8 describes, as one example, that 1-bit of sub information is recorded by displacing recording marks in three frames slightly in the radial direction.

That is to say, in the example shown in FIG. 16, 1-bit security information (secure info[0]) is recorded as sub-information in the three frames of the $2^{nd}$ to the $4^{th}$ frames (#1 to #3), and in the following frames, 1-bit sub-information is recorded similarly in every three frames, which ends with secure info[7] in the $23^{rd}$ to the $25^{th}$ frames (#22 to #24). Note here that although security information is indicated as an example of the sub-information, a type and an intended purpose of the sub-information is not limited only to the security information.

A synchronous code recorded in the synchronous code portion 203 is assigned for the purpose of detecting a frame shift during the reproduction by judging the number of a frame in the sector by comparing with synchronous codes before and after the present synchronous code and for the purpose of detecting and correcting a bit shift and a byte shift of reproduced information at the same time. For that reason, if an accuracy for detecting the synchronous code deteriorates, the shifts in reproduction as described above would not be detected, so that it becomes difficult to correct abnormal reproduction to be a normal state. In the optical disc according to this embodiment, in order to record the sub-information without the degradation of the reproduction quality as stated above, slight displacement of recording marks in the radial direction is not conducted in the synchronous code portion 203. That is to say, the slight displacement of recording marks in the radial direction is conducted not in the synchronous code portion 203 that is important for reproducing the main information, but only in the data portion 204 in a frame.

Furthermore, in the $1^{st}$ frame in the sector of the DVD, the ID 205 as a sector identifier is assigned. The ID 205 is used as positional information in the optical disc used by a reproducing apparatus that reproduces the optical disc. For that reason, the degradation in accuracy of reading out the ID 205 exerts a significant influence on the reproduction accuracy as in the case of the degradation in reading out of the synchronous codes. Therefore, in the optical disc according to this embodiment, recording marks in the $1^{st}$ frame containing the ID 205 in the sector and in a frame prior to the frame to which the ID 205 is assigned (the $26^{th}$ frame in the previous sector (frame#25)) are not displaced in the radial direction.

As stated above, in the DVD according to this embodiment, in twenty four frames other than the $1^{st}$ frame and the $26^{th}$ frame out of the twenty six frames in total in a sector as the unit to which an ID is assigned, 1-bit sub-information is recorded in units of a plurality of frames (every three frames in Embodiment 8). In other words, 8-bit sub-information is recorded in one sector and 128-bit sub-information is recorded in one ECC block.

Figure 17:
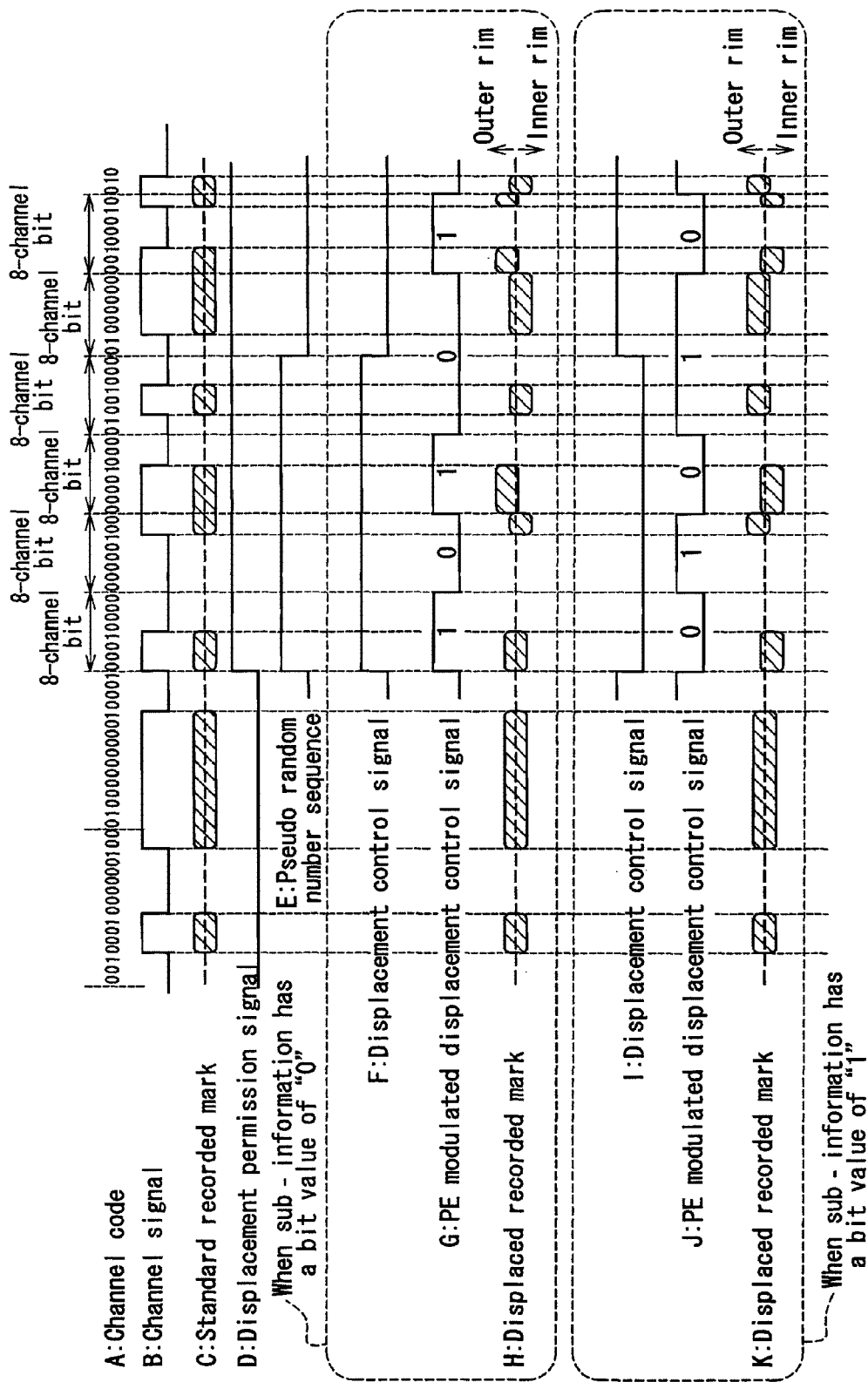
FIG. 17 is a conceptual diagram showing recording marks according to Embodiment 8, where sub-information bit "0" and sub-information bit "1" are recorded.

Next, the following describes a method for recording the sub-information by displacing recording marks slightly in the radial direction in the DVD according to this embodiment, with reference to FIG. 17.

In the DVD, while modulating every 8-bit of main information to be recorded to 16-bit information (8-16 modulation), a synchronous code is inserted at predetermined intervals so as to generate a channel code (A of FIG. 17). In a normal DVD, the channel code is subjected to NRZI conversion to generate a channel signal (B of FIG. 17), and a recording laser power is changed in accordance with this channel signal, so that recording marks (C of FIG. 17) are generated on the optical disc.

In the DVD according to this embodiment, a pseudo random number sequence (E of FIG. 17) is generated during a period when a displacement permission signal (D of FIG. 17) is "H". This pseudo random number sequence makes recording marks displace slightly toward an inner rim side or to an outer rim side, whereby the sub-information is recorded. The displacement permission signal is "L" during a period when a synchronous code is inserted in each frame and periods in the $1^{st}$ and $26^{th}$ frames in each sector. During the period when the displacement permission signal is "L", recording marks are not displaced in the radial direction.

When "0" is recorded as a sub-information bit value, an exclusive OR operation is performed between the above-stated pseudo random number sequence (E of FIG. 17) and the sub-information "0", so as to generate a displacement control signal (F of FIG. 17). Then, in accordance with a PE modulated displacement control signal (G of FIG. 17) that is obtained by applying PE modulation to the thus generated displacement control signal, recording marks are displaced slightly in the radial direction. In Embodiment 8, recording marks in a section where the PE modulated displacement control signal is "H" are displaced toward the outer rim side of the optical disc, whereas recording marks in a section where the PE modulated displacement control signal is "L" are displaced toward the inner rim side of the optical disc. In this way, displaced recording marks (H of FIG. 17) to which the sub-information "0" is superimposed are formed on the optical disc.

Likewise, when "1" is recorded as a sub-information bit value, an exclusive OR operation is performed between the above-stated pseudo random number sequence (E of FIG. 17) and the sub-information "1", so as to generate a displacement control signal (I of FIG. 17). Then, in accordance with a PE modulated displacement control signal (J of FIG. 17) that is obtained by applying PE modulation to the thus generated displacement control signal, recording marks are displaced slightly in the radial direction. In Embodiment 8, recording marks in a section where the PE modulated displacement control signal is "H" are displaced toward the outer rim side of the optical disc, whereas recording marks in a section where the PE modulated displacement control signal is "L" are displaced toward the inner rim side of the optical disc. In this way, displaced recording marks (K of FIG. 17) to which the sub-information "1" is superimposed are formed on the optical disc.

As stated above, in the DVD according to this embodiment, in a section where a bit value "0" is recorded as the sub-information, the recording marks except for recording marks generating synchronous codes and constituting the $1^{st}$ and the $26^{th}$ frames are displaced slightly in the radial direction in accordance with the PE modulated displacement control signal obtained by applying PE modulation to the pseudo random number sequence that is based on the insertion positions of the synchronous codes. Conversely, in a section where a bit value "1" is recorded as the sub-information, recording marks are displaced slightly in the radial direction in accordance with the PE modulated displacement control signal obtained by applying PE modulation to the reversed pseudo random number sequence that is based on the insertion positions of the synchronous codes.

Next, an information recording apparatus according to this embodiment will be described below. Note here that although the following also deals with an example where a DVD is used as an optical disc, the present invention is not limited to this.

Figure 18:
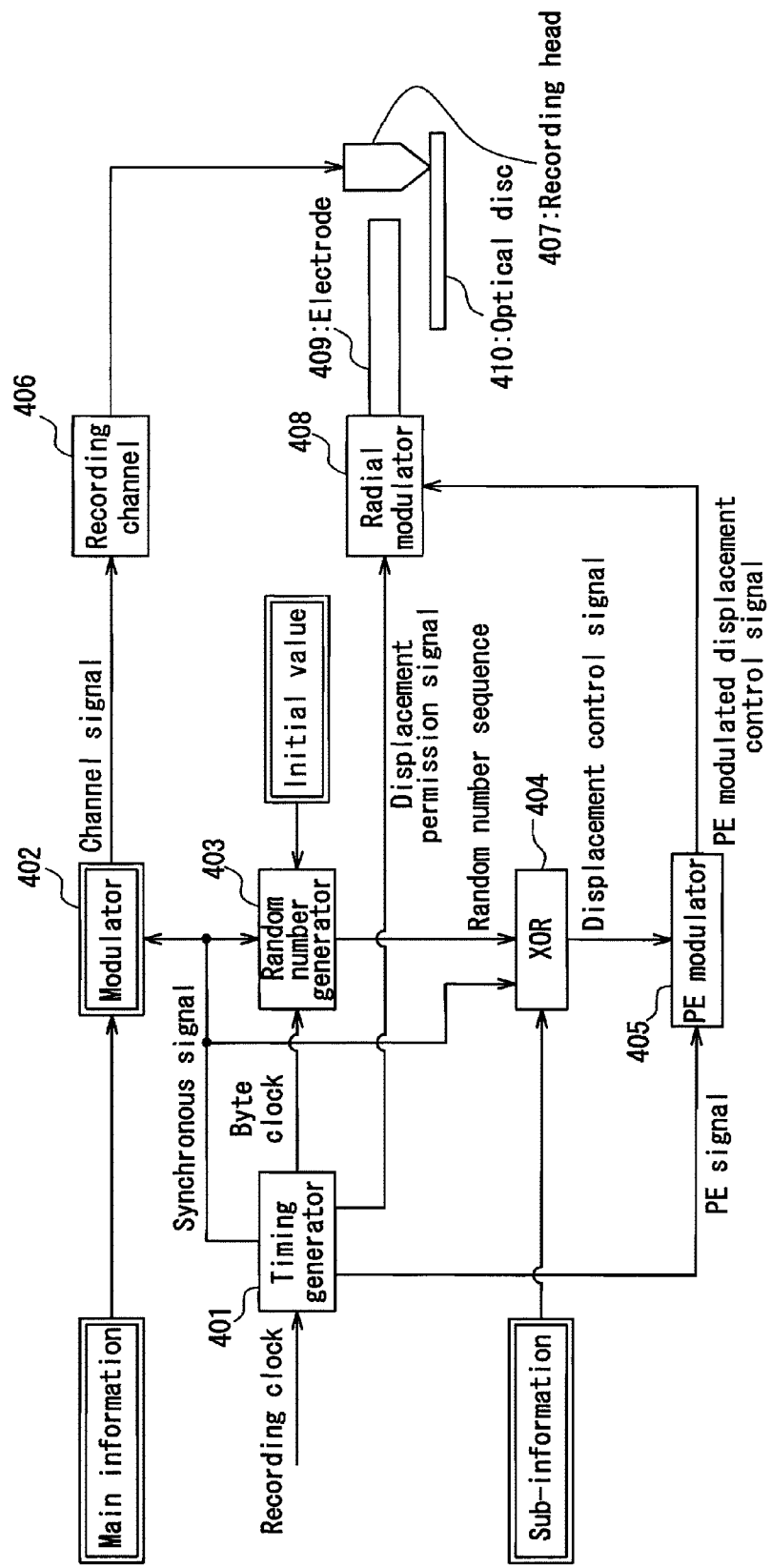
FIG. 18 is a schematic block diagram of an information recording apparatus according to Embodiment 8.

FIG. 18 is a block diagram showing a main configuration of a DVD recording apparatus according to this embodiment. The DVD recording apparatus of Embodiment 8 records optically readable recording marks in a spiral fashion on an optical disc (DVD) so as to record main information, and also records sub-information by displacing the above recording marks slightly in the radial direction in accordance with a displacement control signal that is generated based on a timing of the insertion of synchronous codes for the unit of a frame of the main information. This DVD recording apparatus includes a timing generator 401, a modulator 402, a random number generator 403, an XOR 404, a PE modulator 405, a recording channel 406, a radial modulator 408 and a recording head 407.

The timing generator 401 generates a synchronous signal, a byte clock, a displacement permission signal and a PE signal. The synchronous signal indicates a timing for assigning a synchronous code from a recording clock that is a reference clock signal for recording main information. The byte clock is a signal in synchronization with a byte unit, and in the case of DVDs, the byte clock is obtained by 16-frequency-division of a clock. The displacement permission signal is, as previously described, a signal that is "L" only at the timing in the $1^{st}$ and the $26^{th}$ frames and at the timing for assigning the synchronous codes. The PE signal is a signal that repeats 8-clock of "L" after 8-clock of "H". The timing generator 401 outputs the generated synchronous signal to the modulator 402, the random number generator 403 and the XOR 404, outputs the byte clock to the random number generator 403, outputs a displacement permission signal to the radial modulator 408 and outputs the PE signal to the PE modulator 405.

The synchronous signal is a signal indicating a timing for inserting a synchronous code at fixed intervals to a result of modulation of main information by the modulator 402, and in the case of DVDs, the synchronous signal is a signal indicating 32-clock sections from the beginning of a frame to be recorded.

The byte clock is a clock signal in synchronization with a byte unit (corresponding to 16 recording clocks) of main information to be recorded, and in the case of DVDs, the byte clock is obtained by 16-frequency-division of a recording clock.

In DVDs, the displacement permission signal is "Low" at a timing for inserting a synchronous code by the modulator 402 and in the sections of the $1^{st}$ and the $26^{th}$ frames in a sector to be recorded, and is "High" in the sections other than them.

The PE signal is a signal whose first 8-bit of a byte unit (16 recording clocks) of the main information to be recorded is "High" and the second 8-bit is "Low".

The modulator 402 converts a byte unit (8-bit) of main information to be recorded into 16-bit information (8-16 modulation) and inserts a synchronous code in the section where the synchronous signal from the timing generator 401 is "High", so as to generate a channel code. Then, the channel code is subjected to the NRZI conversion so as to generate a channel signal, which is output to the recording channel 406.

Figure 19:
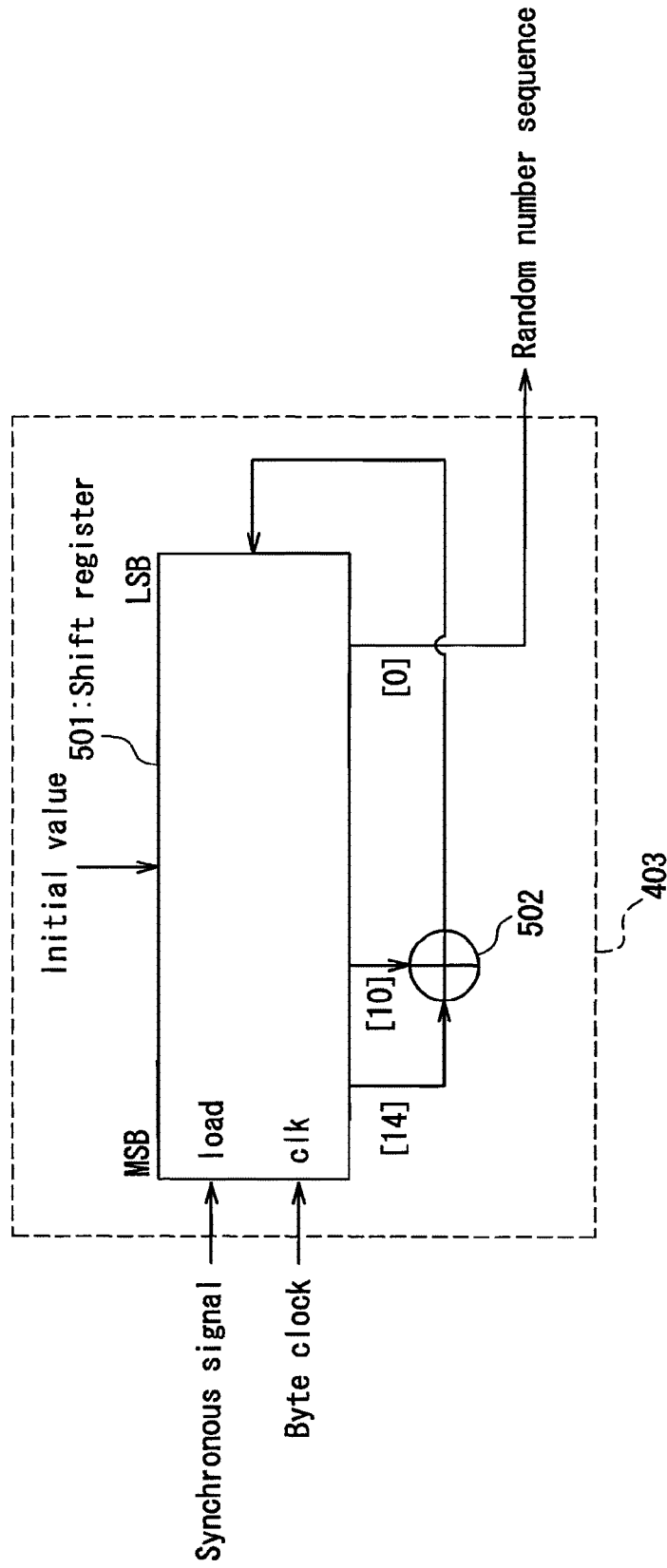
FIG. 19 shows the details of a random number generator of an information recording apparatus and an information reproducing apparatus of the present invention.

The random number generator 403 generates a pseudo random number sequence from the synchronous signal and the byte clock from the timing generator 401. FIG. 19 is a block diagram showing the details of random number generator 403.

The random number generator 403 of this embodiment is configured with a shift register 501 and an XOR 502. In the section where the synchronous signal is "High", the random number generator 403 presets an initial value that is stored in secret inside of this information recording apparatus. On the other hand, in the section where the synchronous signal is "Low", the random number generator 403 outputs a LSB of the shift register as 1-bit pseudo random number sequence at a timing of the byte clock from the timing generator 401, which is in synchronization with the byte unit of the main information. At the same time, the random number generator 403 makes the shift register 501 shift by 1 bit from the LSB to a MSB and supplies feedback of an exclusive OR of a shift register [10] and a shift register [14] to a shift register [0]. In this way, the random number generator 403 generates the random number sequence that is updated by 1 bit for every byte unit of the main information and outputs the same to the XOR 404.

Figure 20:
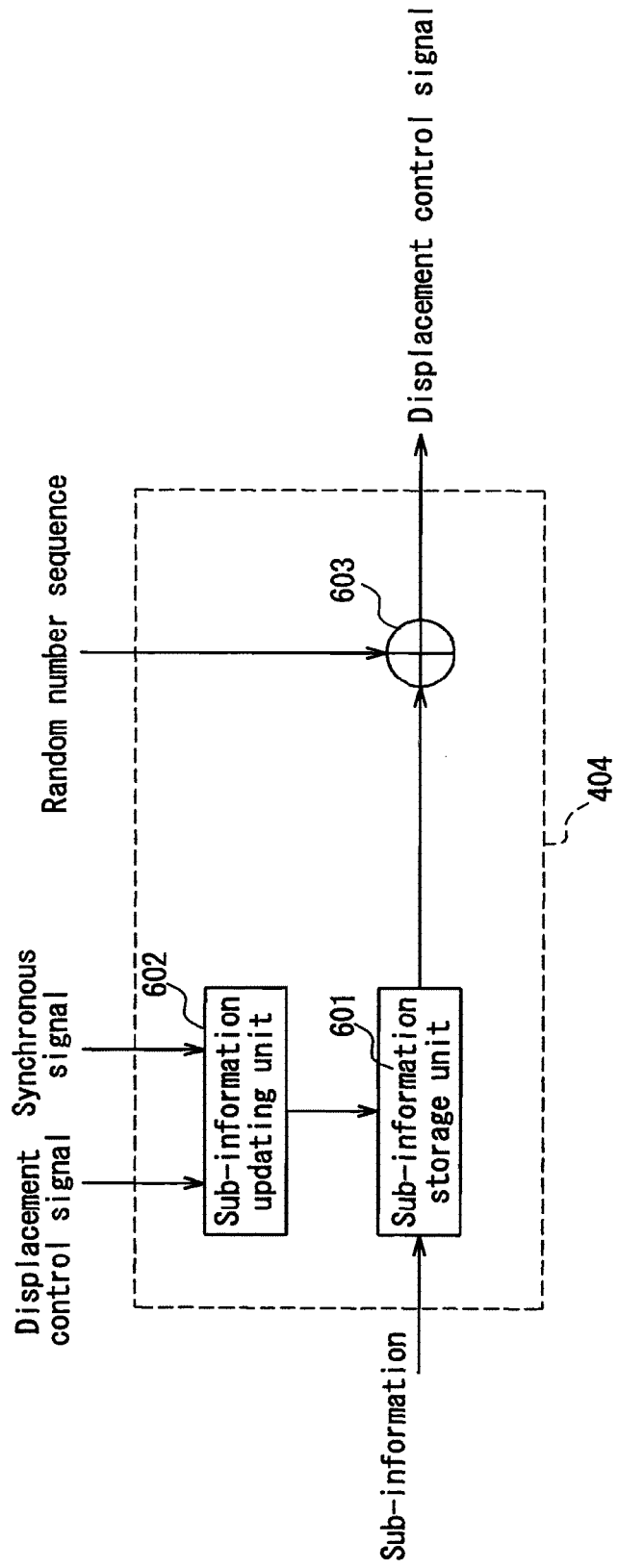
FIG. 20 is a block diagram showing the details of an XOR according to Embodiment 8.

The XOR 404 is a portion for calculating an exclusive OR of the random number sequence and the sub-information to be recorded, and as shown in FIG. 20, is configured mainly with a sub-information storage unit 601, a sub-information updating unit 602 and an exclusive OR calculation unit 603.

The sub-information storage unit 601 is a portion for storing sub-information to be recorded for each ECC block that is a logical information unit of the main information (128 bits in Embodiment 8 of the present invention).

From the synchronous signal from the timing generator 401, the sub-information updating unit 602 calculates a sector position and a frame position where the recording is to be conducted. Then, for each region for recording 1-bit sub-information (in this embodiment, 1-bit is recorded in three frames as shown in FIG. 16), 1-bit sub-information that corresponds to the present sector position and the frame position is extracted from the sub-information storage unit 601 so as to output the same to the exclusive OR calculation unit 603.

As stated above, the sub-information updating unit 602 fetches 1-bit sub-information for each three frames in twenty four frames in total except for the $1^{st}$ and the $26^{th}$ frames in a sector. As a result, 8-bit sub-information for one sector and 128-bit sub-information for one ECC block are fetched sequentially.

The PE modulator 405 generates a PE modulated displacement control signal from the displacement control signal output from the XOR 404 and the PE signal output from the timing generator 401, and outputs the same to the radial modulator 408. The PE modulator 405 of this embodiment is configured with an exclusive OR gate.

The recording channel 406 generates a control signal by which a recording beam applied to the optical disc (DVD) 410 is turned "ON" and "OFF" in accordance with a channel signal "1" and "0" from the modulator 402, and outputs the same to the recording head 407.

The recording head 407 irradiates the optical disc 410 with a recording beam based on the "ON" and "OFF" signals from the recording channel so as to form a recording mark, whereby main information is recorded.

Figure 21:
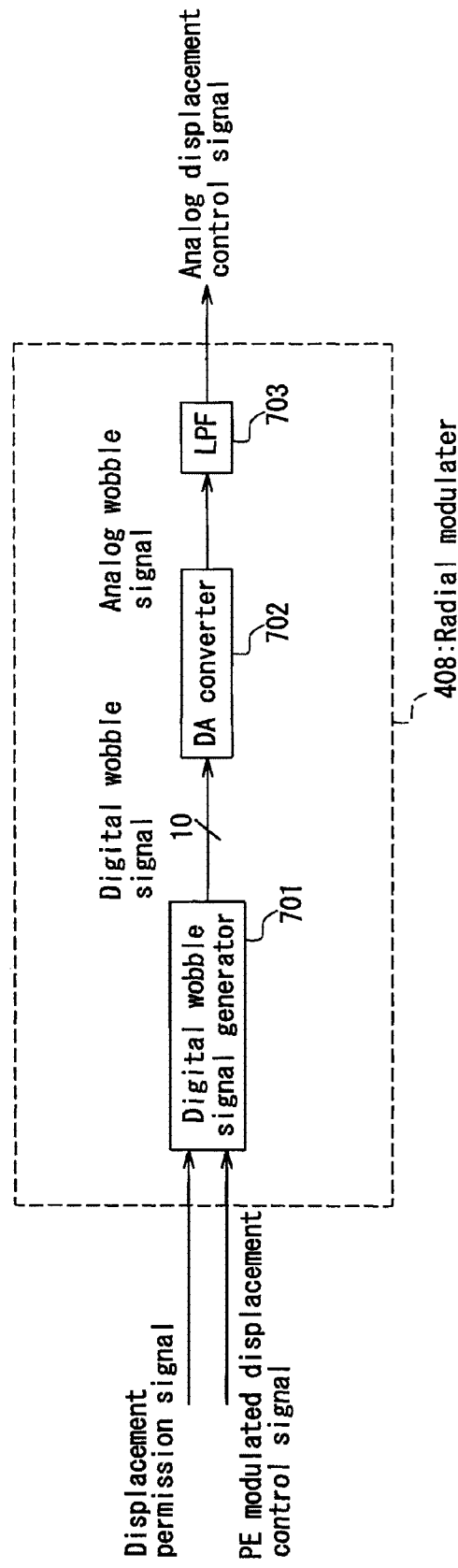
FIG. 21 is a block diagram showing the details of a radial modulator according to Embodiments 8 and 9.

The radial modulator 408 deflects a recording beam applied from the recording head 407 to the optical disc 410 by controlling a voltage applied to an electrode 409 that is provided in the vicinity of the recording head 407. Thereby, a recording mark can be recorded so as to be displaced slightly in the radial direction. The radial modulator 408 is, as shown in FIG. 21, configured with a digital wobble signal generator 701, a DA converter 702 and an LPF 703.

The digital wobble signal generator 701 receives the displacement permission signal from the timing generator 401 and the PE modulated displacement control signal from the PE modulator 405. Then, the digital wobble signal generator 701 generates three levels of digital wobble signals, where a "0" level is generated when the displacement permission signal is "Low"; a "+" level is generated when the displacement permission signal is "High" and the PE modulated displacement control signal is "High"; and a "−" level is generated when the displacement permission signal is "High" and the PE modulated displacement control signal is "Low", and outputs the same to the DA converter 702. For example, when the digital wobble signal consists of 10 bits, the digital wobble signal generator 701 generates "3FF" in hexadecimal as the "+" level, "200" in hexadecimal as the "0" level and "001" in hexadecimal as the "−" level.

The DA converter 702 performs digital-analog conversion (DA conversion) of the three-level digital wobble signals output from the digital wobble signal generator 701. The DA converter 702 generates analog wobble signals that are converted to +V, −V, and ground levels from the "+" level, "−" level and "0" level of input digital wobble signals, respectively, and outputs the same to the LPF 703. The LPF 703 filters out high frequency components as noise components from the analog wobble signals to generate an analog displacement control signal and outputs the same to the electrode 409.

As previously described, the recording beam is deflected in the radial direction in accordance with a voltage level applied to the electrode 409. Therefore, recording marks are formed on the optical disc 410 so that, with reference to the GND level, for example, +V voltage applied to the electrode displaces a recording mark slightly toward the outer rim side, whereas −V voltage applied to the electrode displaces a recording mark slightly toward the inner rim side.

Figure 22:
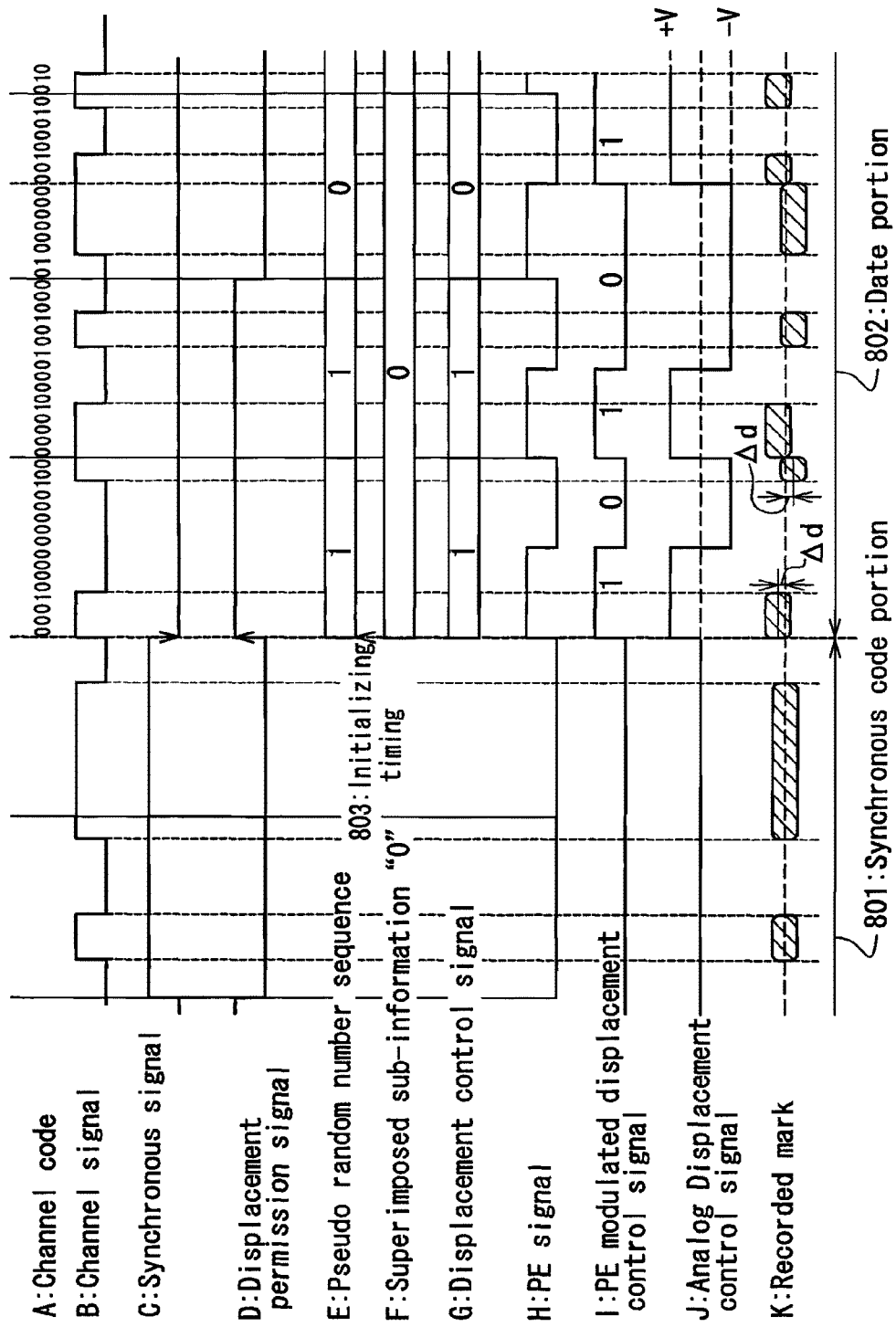
FIG. 22 is a timing chart when sub-information bit "0" is recorded by the information recording apparatus according to Embodiment 8.

Next, referring to FIGS. 22 and 23, an operation for recording main information and sub-information by this information recording apparatus will be described below. FIG. 22 is a timing chart showing an operation for recording a sub-information bit value of "0", and FIG. 23 is a timing chart showing an operation for recording a sub-information bit value of "1".

Figure 23:
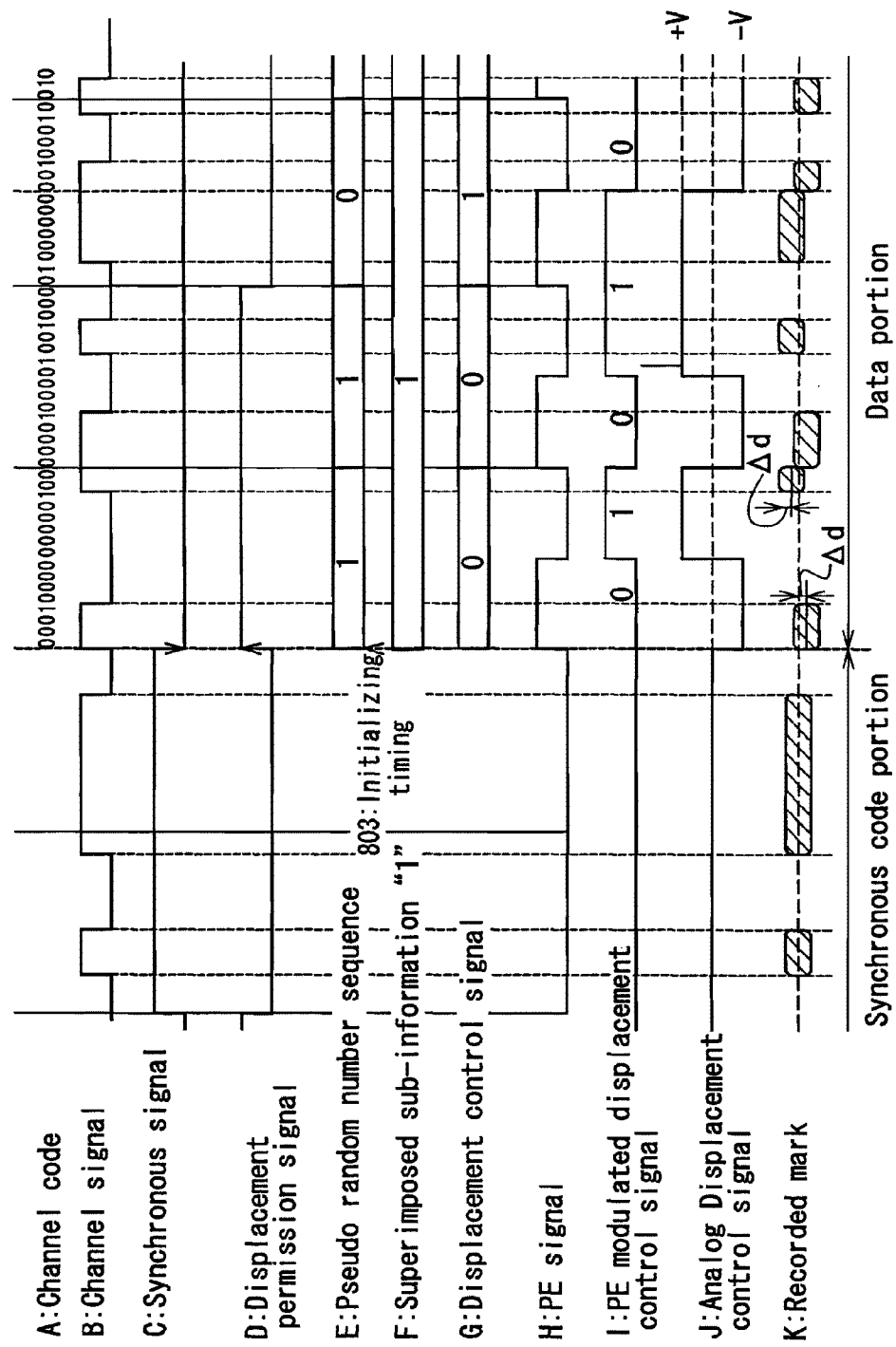
FIG. 23 is a timing chart when sub-information bit "1" is recorded by the information recording apparatus according to Embodiment 8.

According to this information recording apparatus, the modulator 402 converts a byte unit of main information to be recorded to 16-bit information (8-16 modulation) so as to generate a channel code (A of FIG. 22, and A of FIG. 23). In addition, after a synchronous code is inserted to the channel code in the section where a synchronous signal (C of FIG. 22 and C of FIG. 23) from the timing generator 401 indicating a timing for inserting the synchronous code is "High", NRZI conversion is conducted thereto so as to generate a channel signal (B of FIG. 22 and B of FIG. 23), which is output to the recording channel 406.

The timing generator 401 generates a displacement permission signal (D of FIG. 22 and D of FIG. 23) so as to be "High" in the sections except for a synchronous code portion 801 in each frame and the 1$^{st}$ and the 26$^{th}$ frames, and outputs the same to the radial modulator 408.

Figure 24:
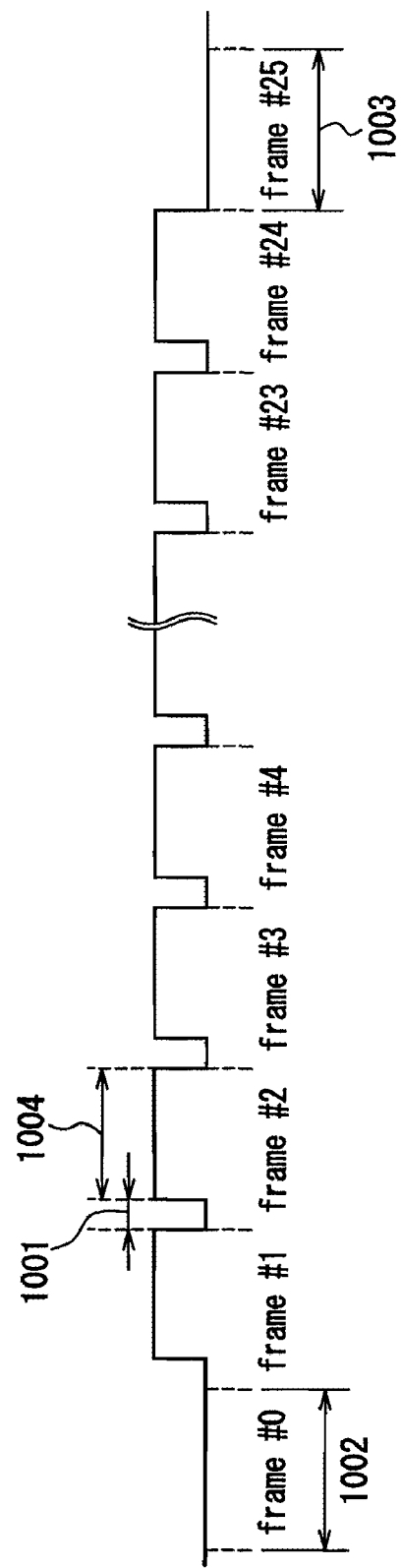
FIG. 24 is a timing chart of a displacement permission signal of the information recording apparatus and a correlation detection permission signal of the information reproducing apparatus according to the present invention.

FIG. 24 is a timing chart showing a change of the above-stated displacement permission signal in a sector. The displacement permission signal is a signal that is "Low" in a synchronous code section 1001 for recording the synchronous code portion 801 in each of twenty six frames in total of a sector, in a section 1002 for recording the 1$^{st}$ frame and in a section 1003 for recording the 26$^{th}$ frame, and is "High" in a section 1004 for recording a data region 802.

The random number generator 403 presets the initial value that is stored in secret inside of the apparatus, where an initializing timing 803 is set at a timing of a falling edge of the synchronous signal (C of FIG. 22 and C of FIG. 23) from the timing generator 401, generates a 1-bit random number sequence (E of FIG. 22 and E of FIG. 23) in accordance with the byte clock from the timing generator 401 and outputs the same to the XOR 404. Embodiment 8 describes an example applied to the DVD, and therefore a 1-bit random number sequence is generated for a 16-bit channel signal unit that corresponds to 1-byte main information.

The XOR 404 stores 128-bit sub information in advance for each ECC unit to be recorded. Then, the XOR 404 judges the sector number and the frame number currently being recorded by counting the synchronous signal from the timing generator 401, so as to fetch 1-bit of corresponding sub-information from the sub-information stored in advance. A displacement control signal (G of FIG. 22 and G of FIG. 23) is generated by calculating an exclusive OR of the thus fetched 1-bit sub-information (F of FIG. 22 and F of FIG. 23) with the random number sequence from the random number generator 403.

Therefore, in the case where the bit of the sub-information to be recorded is "0", the displacement control signal generated by the XOR 404 is the same signal (G of FIG. 22) as the random number sequence generated by the random number generator 403. On the other hand, in the case where the bit of the sub-information to be recorded is "1", the displacement control signal is a signal corresponding to the inversion (G of FIG. 23) of the random number sequence generated by the random number generator 403.

Thereafter, PE modulation is applied to the displacement control signal (G of FIG. 22 and G of FIG. 23) generated by the XOR 404 using a PE signal (H of FIG. 22 and H of FIG. 23) generated by the timing generator 401, whose value is inverted between "1" and "0" at every 8 bits of a channel signal. As a result, a PE modulated displacement control signal (I of FIG. 22 and I of FIG. 23) is obtained and is output to the radial modulator 408.

From the displacement permission signal (D of FIG. 22 and D of FIG. 23) from the timing generator 401 and the PE modulated displacement control signal (I of FIG. 22 and I of FIG. 23) from the PE modulator 405, the radial modulator 408 generates an analog displacement control signal (J of FIG. 22 and J of FIG. 23) having three levels (GND level, +V level and −V level). The analog displacement control signal is at +V level when the PE modulation displacement control signal is "1" and is at −V level when the PE modulation displacement control signal is "0". This analog displacement control signal is output to the electrode 409, whereby, with reference to an optical spot position formed by a recording beam from the recording head 407 when a voltage at GND level is applied to the electrode, an optical beam is deflected so as to form an optical spot displaced by Δd to the outer rim side of the optical disc when the analog displacement control signal at +V level is applied to the electrode and so as to form an optical spot displaced by Δd to the inner rim side of the optical disc when the analog displacement control signal at −V level is applied thereto. Thereby, with respect to recording marks except for the synchronous codes, the 1$^{st}$ frame and the 26$^{th}$ frame, the recording marks (K of FIG. 22 and K of FIG. 23) displaced slightly in the radial direction by Δd to the outer rim side or by Δd to the inner rim side can be formed on the optical disc.

Thus, in the information recording apparatus according to this embodiment, if channel signals for recording the sub-information "0" and the sub-information "1" are the same, a recording mark for recording the sub-information "0" and a recording mark for recording the sub-information "1" will be formed on the optical disk so that they are flipped with each other relative to a center line of the recording marks.

Next, an apparatus for reproducing a DVD on which recording marks are formed in a spiral fashion on the disc will be described below as a specific example of an information reproducing apparatus according to the present invention for reproducing main information and sub-information at the same time from the optical storage medium. Note here that the reproducing apparatus according to the present invention is not limited to the following example.

Figure 25:
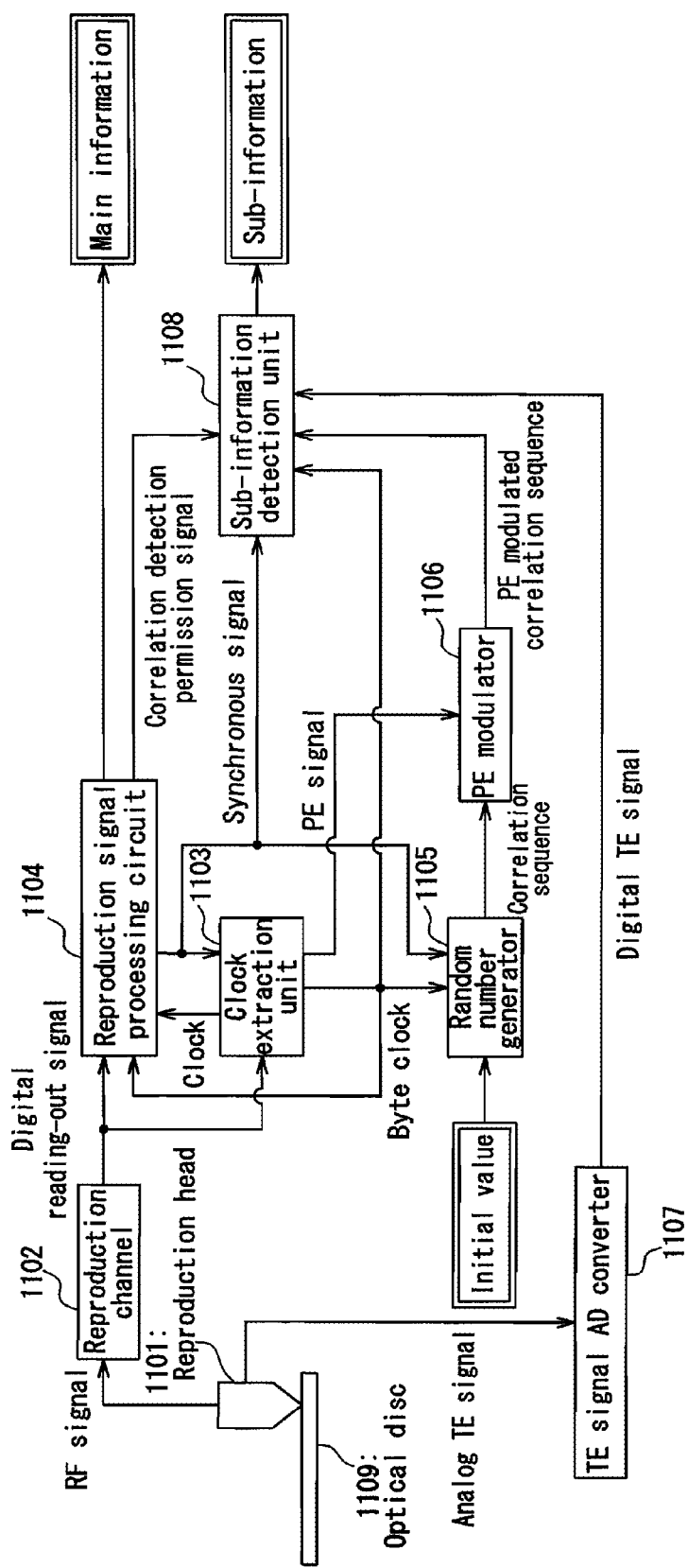
FIG. 25 is a schematic block diagram of an information reproducing apparatus according to Embodiment 8.

FIG. 25 is a block diagram showing a main configuration of the information reproducing apparatus of this embodiment. The information reproducing apparatus of this embodiment includes: a reproduction head 1101, a reproduction channel 1102, a clock extraction unit 1103, a reproduction signal processing circuit 1104, a random number generator 1105, a PE modulator 1106, a TE signal AD converter 1107 and a sub-information detection unit 1108.

The reproduction head 1101 focuses an optical beam onto a recording mark on an optical disc 1109 so as to irradiate the recording mark with the optical beam. Then, the reproduction head 1101 converts light reflected from there into an electric signal with a photodetector so as to generate an RF signal that is a reproduced signal of the information recorded with the recording mark, and outputs the RF signal to the reproduction channel 1102. Concurrently, the reproduction head 1101 generates an analog TE signal indicating a phase error of the recording mark in the radial direction, the signal obtained from a result of the tracking of a center position of the recording marks recorded in a spiral fashion on the optical disc 1109 with a center position of the optical beam, and outputs the analog TE signal to the TE signal AD converter 1107.

Figure 26:
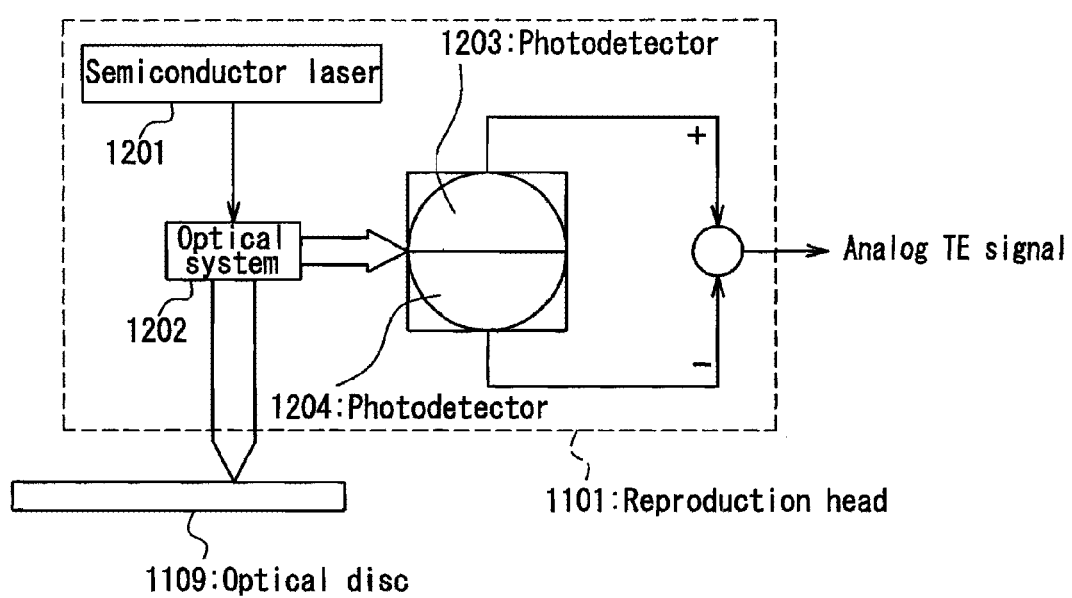
FIG. 26 is a block diagram showing the details of a reproduction head of the information reproducing apparatus according to Embodiment 8.

FIG. 26 is a conceptual diagram showing a main configuration for generating a TE signal that indicates the displacement of a recording mark in the radial direction.

The reproduction head 1101 focuses light emitted from a semiconductor laser 1201 onto a recording mark on the optical disc 1109 so as to achieve a focus by means of an optical system 1202. In addition, the optical system 1202 separates a laser beam to be applied to the optical disc 1109 and the reflected light from the optical disc 1109 and converts the reflected light into an electric signal using photodetectors 1203 and 1204. The photodetectors 1203 and 1204 are provided on an outer rim side and on an inner rim side symmetrically with respect to a center line of the recording mark. The photodetectors 1203 and 1204 determine electrically the brightness of the reflected light on the outer rim side and the on the inner side, respectively, and therefore displacement of the recording mark in the radial direction can be extracted by a difference between the signal levels of the photodetector 1203 and the photodetector 1204.

Normally, the tracking servo functions so as to track a center position of a recording mark with a center of a laser beam. However, for example, when a recording mark is displaced toward the outer rim direction, the reflected light sensed by the photodetector 1203 is stronger than that by the photodetector 1204, so that a "+" potential is output as a TE signal. On the other hand, when a center position of a recording mark is displaced toward the inner rim direction, the reflected light sensed by the photodetector 1203 is weaker than that by the photodetector 1204, so that a "−" potential is output as a TE signal. Such a TE signal is output in the same frequency band as for the RF signal that is an analog reading-out signal.

The reproduction channel 1102 converts the RF signal from the reproduction head into a digital reading-out signal by conducting equalizing and shaping of the waveform of the signal, and outputs the digital reading-out signal to the clock extraction unit 1103 and the reproduction signal processing circuit 1104.

The clock extraction unit 1103 is provided with a PLL (Phase Locked Loop) circuit that is built therein. The PLL circuit functions so as to extract, from the digital reading-out signal digitized by the reproduction channel 1102, a clock signal in synchronization with the digital reading-out signal. In addition, the clock extraction unit 1103 generates a byte clock and a PE signal at a timing of a synchronous signal from the reproduction signal processing circuit 1104, which will be described later. The byte clock is generated by 16-frequency-division of a clock signal extracted from the PLL circuit so as to be in synchronization with a 16-bit unit of the digital reading-out signal, and the PE signal is generated with the first 8-bit of "High" and the second 8-bit of "Low" for a 16-bit unit of the digital reading-out signal. The clock extraction unit 1103 outputs the byte clock to the reproduction signal processing circuit 1104, the random number generator 1105 and the sub-information detection unit 1108 and outputs the PE signal to the PE modulator 1106.

The reproduction signal processing circuit 1104 generates a synchronous signal indicating that a synchronous code is detected, from the digital reading-out signal from the reproduction channel and the clock from the clock extraction unit 1103. Then, the reproduction signal processing circuit 1104 demodulates a 16-bit unit of digital reading-out signal to 1 byte (8 bits) main information with reference to a detected position of the above synchronous code so as to reproduce the main information. In addition, the reproduction signal processing circuit 1104 outputs the synchronous signal, which is generated as a consequence of the detection of the synchronous code from the digital reading-out signal, to the clock extraction unit 1103, the random number generator 1105 and the sub-information detection unit 1108.

The random number generator 1105 has the same function as that of the random number generator 403 of the information recording apparatus in Embodiment 8, and presets an initial value that is stored in secret inside the apparatus at a timing of the synchronous signal from the reproduction signal processing circuit 1104 being "High" and generates 1-bit random number sequence (correlation sequence) at a timing of the byte clock from the clock extraction unit 1103 to output the same to the PE modulator 1106. In addition, the reproduction signal processing circuit 1104 judges the frame number of the sector that is currently being reproduced from the synchronous code and generates a correlation detection permission signal that is "Low" in the $1^{st}$ and the $26^{th}$ frames in the sector and in the section for detecting a synchronous code and is "High" in the data portion except for these sections, and outputs the same to the sub-information detection unit 1108.

The PE modulator 1106 has the same function as that of the PE modulator 405 of the information recording apparatus of Embodiment 8, and is configured with an exclusive OR gate. The PE modulator 1106 calculates an exclusive OR of the random number sequence (correlation sequence) from the random number generator 1105 and the PE signal from the clock extraction unit 1103 so as to generate a PE modulated correlation sequence and outputs the same to the sub-information detection unit 1108.

The TE signal AD converter 1107 samples the TE signal from the reproduction head 1101 at a timing of the clock from the clock extraction unit 1103 and converts the same to a digital signal. The AD converted digital TE signal is output to the sub-information detection unit 1108.

Figure 27:
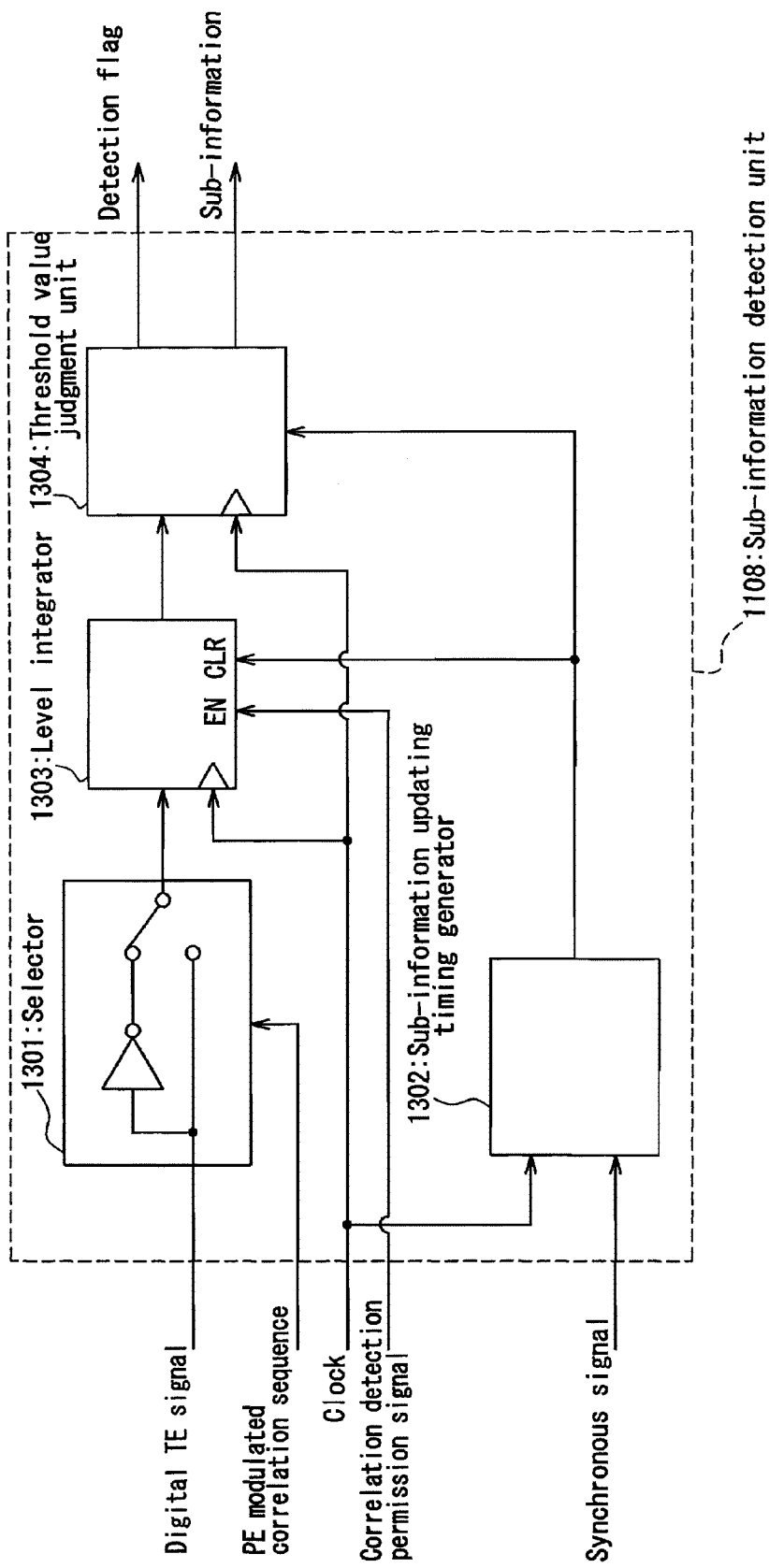
FIG. 27 is a block diagram showing the details of a sub-information detection unit of the information reproducing apparatus according to Embodiment 8.

The sub-information detection unit 1108 detects sub-information based on the byte clock from the clock extraction unit 1103, the synchronous signal and the correlation detection permission signal from the reproduction signal processing circuit 1104, the PE modulated correlation sequence from the PE modulator 1106 and the digital TE signal from the TE signal AD converter 1107. As shown in FIG. 27, the sub-information detection unit 1108 includes: a selector 1301, a sub-information updating timing generator 1302, a level integrator 1303 and a threshold value judgment unit 1304.

The selector 1301 conducts level-conversion with respect to the digital TE signal output from the TE signal AD converter 1107 in accordance with the PE modulated correlation sequence from the PE modulator 1106, and outputs the same to the level integrator 1303. In Embodiment 8, the digital TE signal is set at 0 level when a recording mark is located at a center position. When the recording mark is displaced to the outer rim side, the digital TE signal is at a "+" level and when the recording mark is displaced to the inner rim side, the digital TE signal is at a "−" level, and the digital TE signal are in the complement notation. When the PE modulated correlation sequence from the PE modulator 1106 is "1", the selector 1301 outputs these levels to the level integrator 1303 as they are, i.e., outputs the "+" level as the "+" level and "−" level as the "−" level. Conversely, when the PE modulated correlation sequence is "0", the selector 1301 outputs these levels to the level integrator 1303 as they are inverted, i.e., outputs the "+" level as the "−" level and the "−" level as the "+" level.

The sub-information updating timing generator 1302 counts the clock from the clock extraction unit 1103 and the synchronous signal from the reproduction signal processing circuit 1104 so as to calculate the frame number of the sector that is currently being reproduced. Then, the sub-information updating timing generator 1302 generates a timing signal for updating the sub-information every three frame unit in twenty four frames in total except for the $1^{st}$ and the $26^{th}$ frames in the sector and outputs the same to the level integrator 1303 and the threshold value judgment unit 1304.

The level integrator 1303 is a portion for calculating an integral value of digital TE signals in the complement notation of 2, which are inverted partially, where the digital TE signals are output from the selector 1301 in the section where the correlation detection permission signal from the reproduction signal processing circuit 1104 is "High".

Also, the level integrator 1303 outputs a result of the integration to the threshold value judgment unit 1304 at a timing of the sub-information updating timing signal that is output from the sub-information updating timing generator 1302 once for three frames, and also clears the integral value inside the level integrator 1303 (i.e., clears the value to 0).

Therefore, in this level integrator 1303, when the PE modulated correlation sequence is "1" and the digital TE signal at a "+" level only is detected or when the PE modulated correlation sequence is "0" and the digital TE signal at a "−" level only is detected, the integral value continues to increase toward a positive direction. On the contrary, when the PE modulated correlation sequence is "1" and the digital TE signal detected is at a "−" level only or when the PE modulated correlation sequence is "0" and the digital TE signal detected is at a "+" level only, the integral value continues to decrease toward a negative direction.

The threshold value judgment unit 1304 stores a positive threshold value and a negative threshold value therein, and makes a threshold value judgment of an integral value output every three frames from the level integrator 1303 with the above positive and negative threshold values. Then, if a detection flag indicating the presence or not of sub-information and the sub-information are present, the threshold value judgment unit 1304 outputs the sub-information.

If an integral value output from the level integrator 1303 is the positive threshold value or more, the threshold value judgment procedure by this threshold value judgment unit 1304 outputs a bit value of "0" as the sub-information and also outputs "High" as a detection flag. Alternatively, if the integral value is the negative threshold value or less, the procedure outputs a bit value "1" as the sub-information and also outputs "High" as a detection flag. On the other hand, if the integral value is less than the positive threshold value and is larger than the negative threshold value (i.e., the integral value is closer to zero relative to the positive and the negative threshold values), the sub-information is regarded as not being detected and "Low" is output as a detection flag.

Next, an operation for reproducing main information and sub-information by this information reproducing apparatus will be described below.

Figure 28:
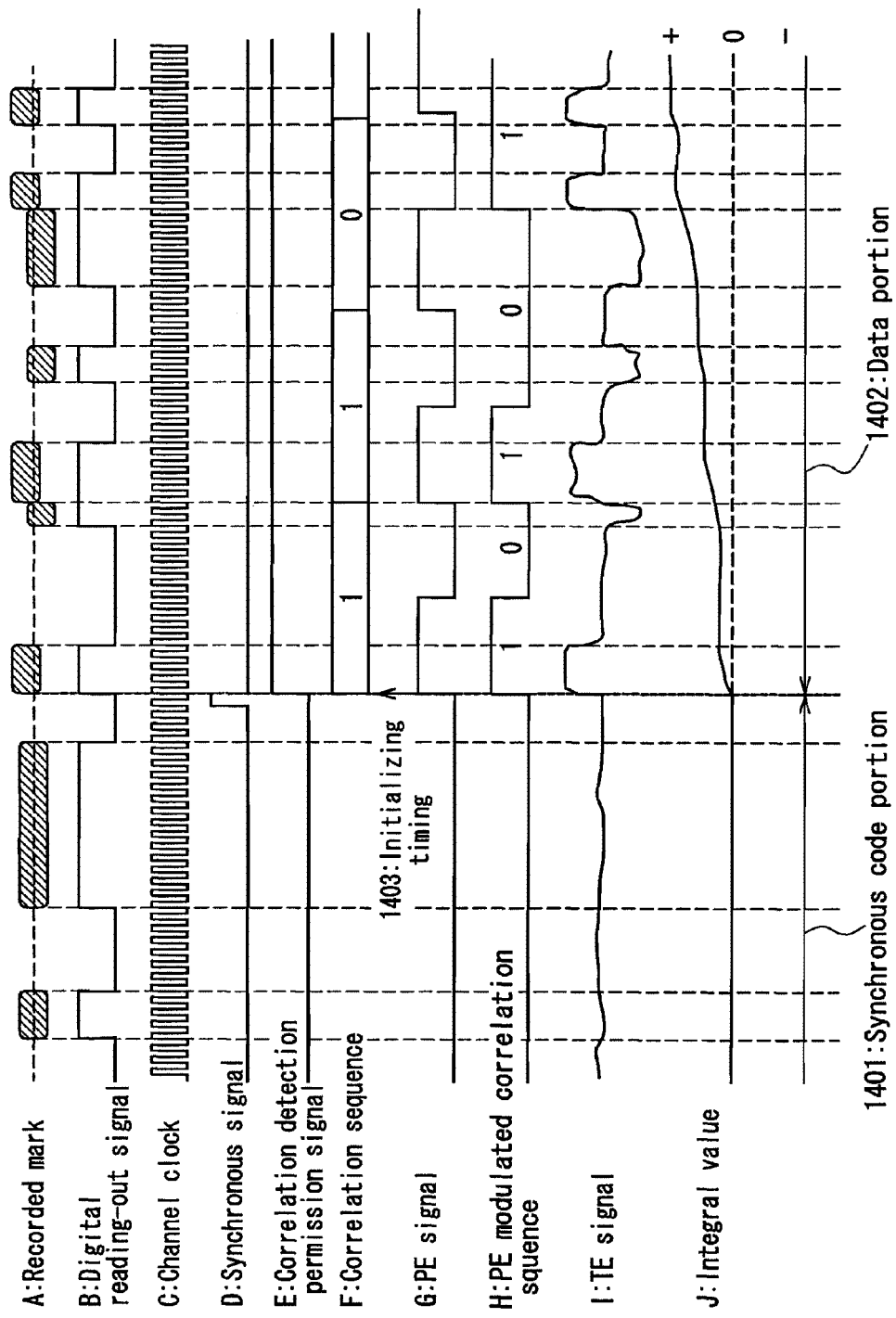
FIG. 28 is a timing chart when sub-information bit "0" is detected by the information reproducing apparatus according to Embodiment 8.
Figure 29:
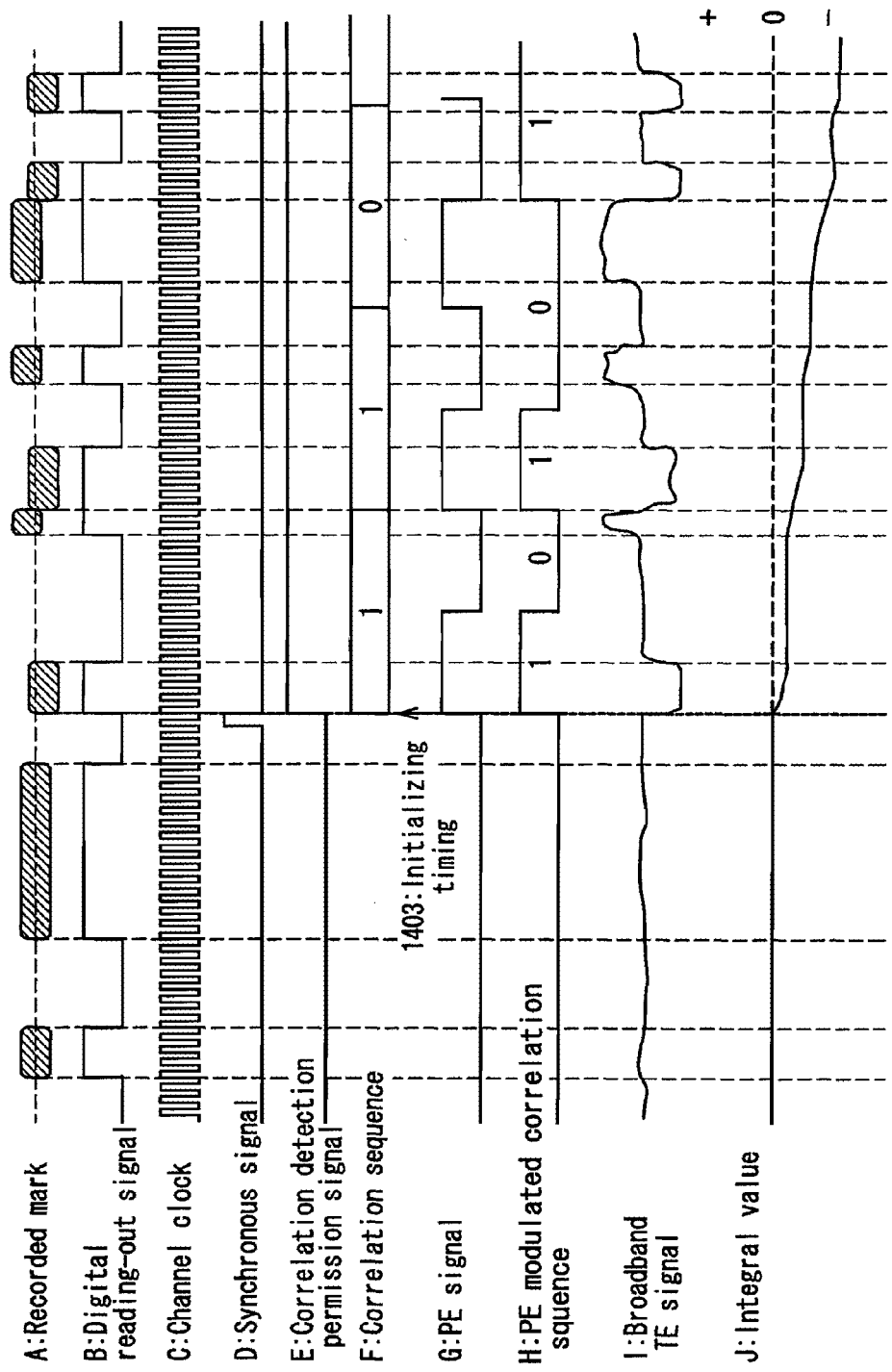
FIG. 29 is a timing chart when sub-information bit "1" is detected by the information reproducing apparatus according to Embodiment 8.

FIG. 28 and FIG. 29 are timing charts when main information and sub-information are reproduced by this information reproducing apparatus. FIG. 28 shows a case for detecting the bit value "0" as the sub-information, and FIG. 29 shows a case for detecting the bit value "1" as the sub-information.

According to this information reproducing apparatus, a recording mark (A of FIG. 28 and A of FIG. 29) formed on an optical disc is irradiated with an optical beam, reflected light therefrom is converted to an electric signal by a photodetector, and then the electric signal is digitized by the reproduction channel 1102 so as to generate a digital reading-out signal (B of FIG. 28 and B of FIG. 29).

In addition, on the basis of the above digital reading-out signal, the clock extraction unit 1103 generates a clock (C of FIG. 28 and C of FIG. 29) that is in synchronization with the above digital reading-out signal.

Furthermore, the reproduction signal processing circuit 1104 detects a synchronous code from the above digital reading-out signal so as to detect a synchronous code portion 1401, whereby a synchronous signal (D of FIG. 28 and D of FIG. 29) is generated.

Moreover, the reproduction signal processing circuit 1104 judges the position of the frame that is currently being reproduced by counting a synchronous signal in the sector and generates a correlation detection permission signal (E of FIG. 28 and E of FIG. 29) that is "High" in the sections except for the synchronous code portion 1401 in each frame where the synchronous code is recorded and except for the $1^{st}$ frame and the $26^{th}$ frame.

Therefore, as shown in FIG. 24, a signal that is "High" in the sections except for the section for reproducing the synchronous code portion 1401 in each frame (See the section 1001 in FIG. 24) and except for the sections for reproducing the $1^{st}$ frame and the $26^{th}$ frame (See the sections 1002 and 1003 in FIG. 24) can be generated as the correlation detection permission signal in the sector.

The random number generator 1105 presets an initial value that is stored in secret inside the apparatus at a timing when the synchronous signal is detected (an initializing timing 1403) and generates 1-bit correlation sequence (F of FIG. 28 and F of FIG. 29) in accordance with the byte clock (the clock obtained by 16-frequency-division of a clock with reference to the synchronous signal) from the clock extraction unit 1103.

The PE modulator 1106 applies PE modulation to the correlation sequence from the random number generator 1105 using the PE signal (G of FIG. 28 and G of FIG. 29) that repeatedly turns "High" and "Low" every 8 bits in accordance with the above synchronous signal output from the clock extraction unit 1103. The thus obtained PE modulated correlation signal (H of FIG. 28 and H of FIG. 29) is output to the sub-information detection unit 1108.

The sub-information detection unit 1108 integrates the digital TE signal that is obtained by digitizing the TE signal (I of FIG. 28 and I of FIG. 29) generated by the reproduction head 1101, where if the PE modulated correlation sequence (H of FIG. 28 and H of FIG. 29) from the PE modulator 1106 is "High", a level of the digital TE signal is integrated as it is, whereas if the PE modulated correlation sequence (H of FIG. 28 and H of FIG. 29) is "Low", a level of the digital TE signal is inverted and then is integrated.

The sub-information detection unit 1108 judges the presence or not of sub-information by comparing the integral value (J of FIG. 28 and J of FIG. 29) of the internal level integrator 1303 with the positive and the negative threshold values. Then, if sub-information is present, the sub-information detection unit 1108 detects the sub-information.

FIG. 28 shows a procedure for detecting the sub-information bit value of "0". The integral value (J of FIG. 28) continues to increase toward the positive direction. Meanwhile, FIG. 29 shows a procedure for detecting the sub-information bit value of "1". The integral value (J of FIG. 29) continues to decrease toward the negative direction.

Figure 30:
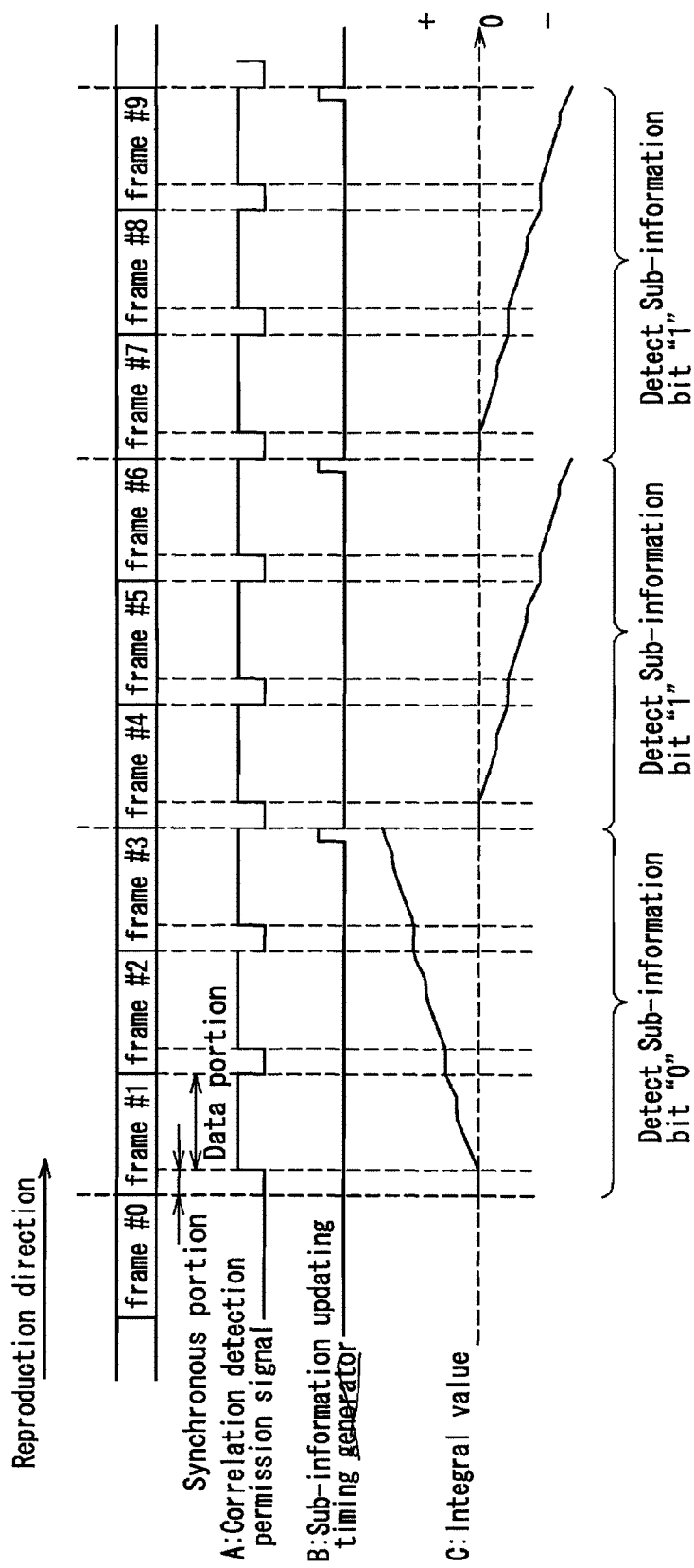
FIG. 30 is a timing chart showing an integral value of a level integrator in the sub-information detection unit of the information reproducing apparatus according to Embodiment 8.

In Embodiment 8, 1-bit sub-information is detected for each three frames in twenty four frames in total except for the $1^{st}$ frame and the $26^{th}$ frame in a sector. FIG. 30 shows a relationship between the generated frames and the integral values in Embodiment 8.

In the sector, main information is reproduced by reading out recording marks continuously from the $1^{st}$ frame to the $26^{th}$ frame, and a sub-information updating timing signal (B of FIG. 30) is generated every three frames by the sub-information updating timing generator 1302 in the twenty four frames except for the $1^{st}$ frame and the $26^{th}$ frame.

The level integrator 1303 integrates a level of the digital TE signal in the section before the sub-information updating timing signal is output, so as to calculate an integral value (C of FIG. 30). Then, at the timing when the sub-information updating timing signal is output, the level integrator 1303 outputs the integral value of the three frames to the threshold value judgment unit 1304, and also clears the integral value in the level integrator 1303. If the correlation detection permission signal (A of FIG. 30) is "Low", the integral value in the level integrator 1303 is held as it is.

As stated above, according to Embodiment 8, on an optical disc on which main information is recorded with optically readable recording marks, sub-information can be recorded with displacement of the recording marks in the radial direction. Since it is difficult to duplicate such information that is recorded with displacement in the radial direction onto another medium, this information can be used for, for example, recording an encryption key for digital works to be recorded in the optical disc.

In addition, according to Embodiment 8 of the present invention, in the synchronous code portion that is required for correcting a bit shift, a byte shift and a frame shift and in the $1^{st}$ frame and the like in a sector to which an ID of the sector is recorded in DVDs, recording marks are not displaced in the radial direction. Thereby, sub-information can be recorded so as to minimize a decrease in reliability of the main information.

Furthermore, with slight displacement of recording marks in the radial direction so as to be in synchronization with a synchronous code of the main information, sub-information can be recorded so as to comply with the recording format of the main information. Therefore, the reproduction of the main information can lead to the reproduction of the sub-information.

Moreover, in Embodiment 8, the amount of displacement in the radial direction is set so as not to exceed the amount that is permissible for the medium without the sub-information recorded therein. Thereby, it becomes difficult to judge whether the sub-information is recorded or not, so that higher confidential information can be recorded.

Additionally, when the sub-information is used for the purpose of the copyright protection and the like as previously described, the amount of displacement in the radial direction preferably is set in such a degree that is detected within a range of noise of the TE signal. This is because, if the amount of displacement is so large as to be output clearly to the TE signal, the displacement of recording marks in the radial direction can be cracked easily. Therefore, the amount of displacement of recording marks in the radial direction preferably is set at an amount of displacement that might be generated for recording marks in a normal recording method in which the displacement in the radial direction is not conducted.

Embodiment 9

The following describes Embodiment 9 of the present invention in detail, with reference to the drawings.

Figure 31:
FIG. 31 is a conceptual diagram showing a recording format of sub-information in an optical disc according to Embodiment 9.

FIG. 31 shows a sector format of a DVD of this embodiment, in which main information is recorded with recording marks and sub-information is recorded by displacing the recording marks slightly in the radial direction.

In the optical disc according to Embodiment 9 of the present invention also, 8-bit sub-information is recorded in twenty four frames in total in a sector except for the $1^{st}$ frame and the $26^{th}$ frame, as in the case of the optical disc described in Embodiment 8. However, this embodiment is different from Embodiment 8 having continuous three frames that hold 1-bit sub-information in that sub-information is recorded separately in discontinuous three frames, where the discontinuity follows a certain regulation.

In this embodiment, as shown in FIG. 31, 8-bit sub-information is recorded in a sector in the following format:

| | |
|---|---|
| (the $2^{nd}$ frame, the $10^{th}$ frame, the $18^{th}$ frame) | 1-bit sub-information |
| (the $3^{rd}$ frame, the $11^{th}$ frame, the $19^{th}$ frame) | 1-bit sub-information |
| (the $4^{th}$ frame, the $12^{th}$ frame, the $20^{th}$ frame) | 1-bit sub-information |
| (the $5^{th}$ frame, the $13^{th}$ frame, the $21^{st}$ frame) | 1-bit sub-information |
| (the $6^{th}$ frame, the $14^{th}$ frame, the $22^{nd}$ frame) | 1-bit sub-information |
| (the $7^{th}$ frame, the $15^{th}$ frame, the $23^{rd}$ frame) | 1-bit sub-information |
| (the $8^{th}$ frame, the $16^{th}$ frame, the $24^{th}$ frame) | 1-bit sub-information |
| (the $9^{th}$ frame, the $17^{th}$ frame, the $25^{th}$ frame) | 1-bit sub-information |

Figure 32:
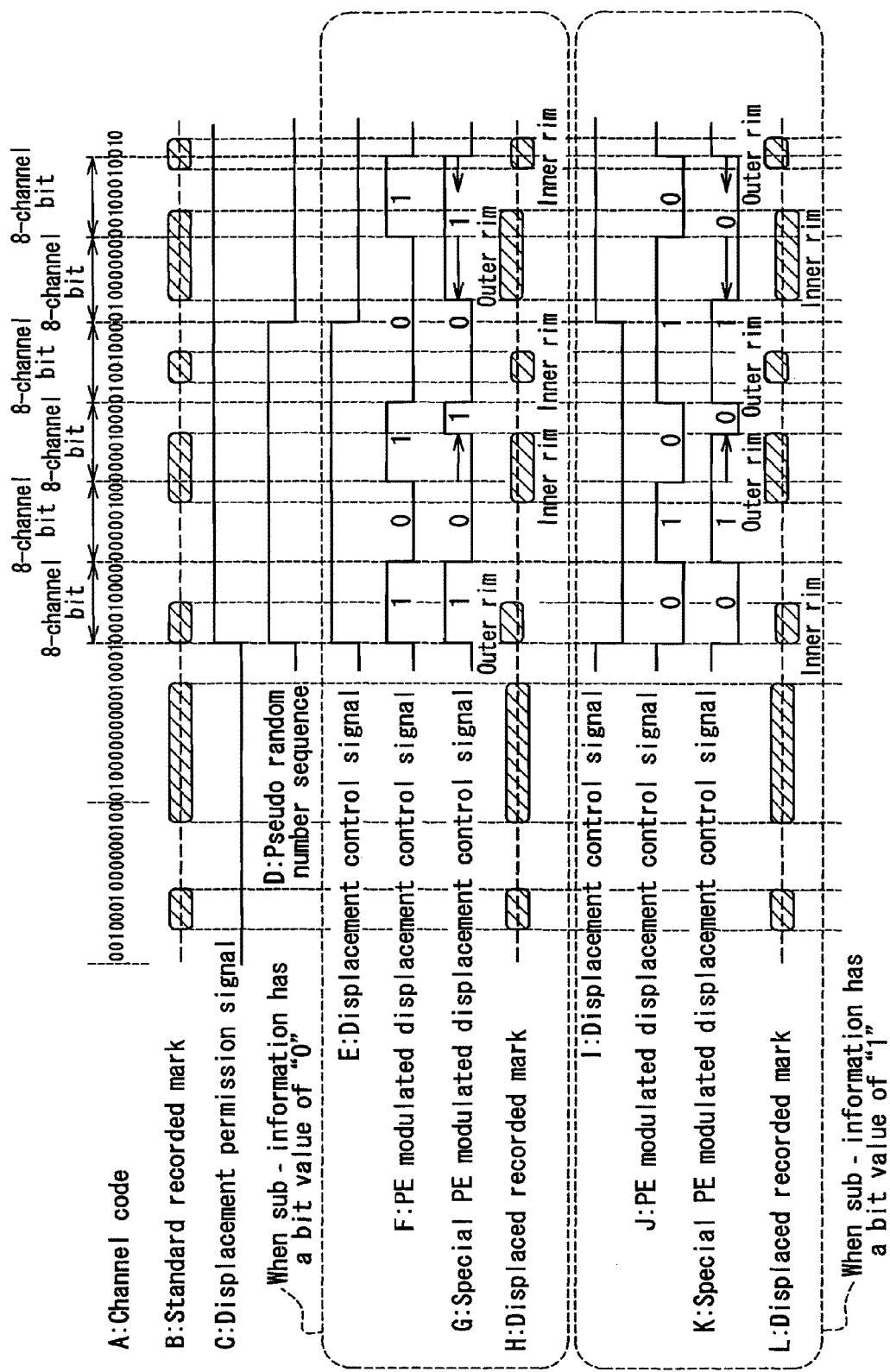
FIG. 32 is a conceptual diagram showing recording marks according to Embodiment 9, where sub-information bit "0" and sub-information bit "1" are recorded.

FIG. 32 is a conceptual diagram showing the formation of recording marks in the optical disc of Embodiment 9 of the present invention.

In the optical disc according to Embodiment 9 of the present invention, main information is recorded by forming recording marks (B of FIG. 32) on the optical disc in a spiral fashion, where the recording marks are formed by the irradiation with a recording beam in accordance with a signal obtained by applying NRZI conversion to a channel signal (A of FIG. 32) that is generated by modulating the main information to be recorded and then inserting a synchronous code for each frame unit.

B of FIG. 32 indicates standard recording marks that are not displaced in the radial direction (i.e., sub-information is not recorded).

When sub-information is recorded with slight displacement of the recording marks in the radial direction, in accordance with a displacement permission signal (C of FIG. 32) indicating a region except for the 1$^{st}$ frame and the 26$^{th}$ frame in a sector and except for a region where a synchronous code is to be inserted in each frame, a pseudo random number sequence (D of FIG. 32) that is initialized at a timing for inserting the synchronous code is generated.

Recording marks to which sub-information is to be assigned are recorded so as to be displaced slightly toward an inner rim side or toward an outer rim side in accordance with a special PE modulated displacement control signal (G and K of FIG. 32). The special modulated displacement control signal is obtained by applying special PE modulation to a displacement control signal (E and I of FIG. 32) that is calculated by an exclusive OR of a sub-information bit to be recorded and the pseudo random number sequence (D of FIG. 32) that is initialized at a timing for inserting the synchronous code.

E and F of FIG. 32 are shown for the purpose of the comparison between the PE modulated displacement control signal according to Embodiment 8 to which normal PE modulation is applied and the special PE modulated displacement control signal of this embodiment.

As is evident from the comparison between F and J of FIG. 32 as well as displaced recording marks (H and L of FIG. 32), the special PE modulated displacement control signal (G and K of FIG. 32) of this embodiment is controlled so as not to have a changing point for slight displacement in the radial direction part way through the formation of a recording mark.

Next, an information recording apparatus according to this embodiment will be described below, with reference to the following not-limiting example as a DVD recording apparatus.

Figure 33:
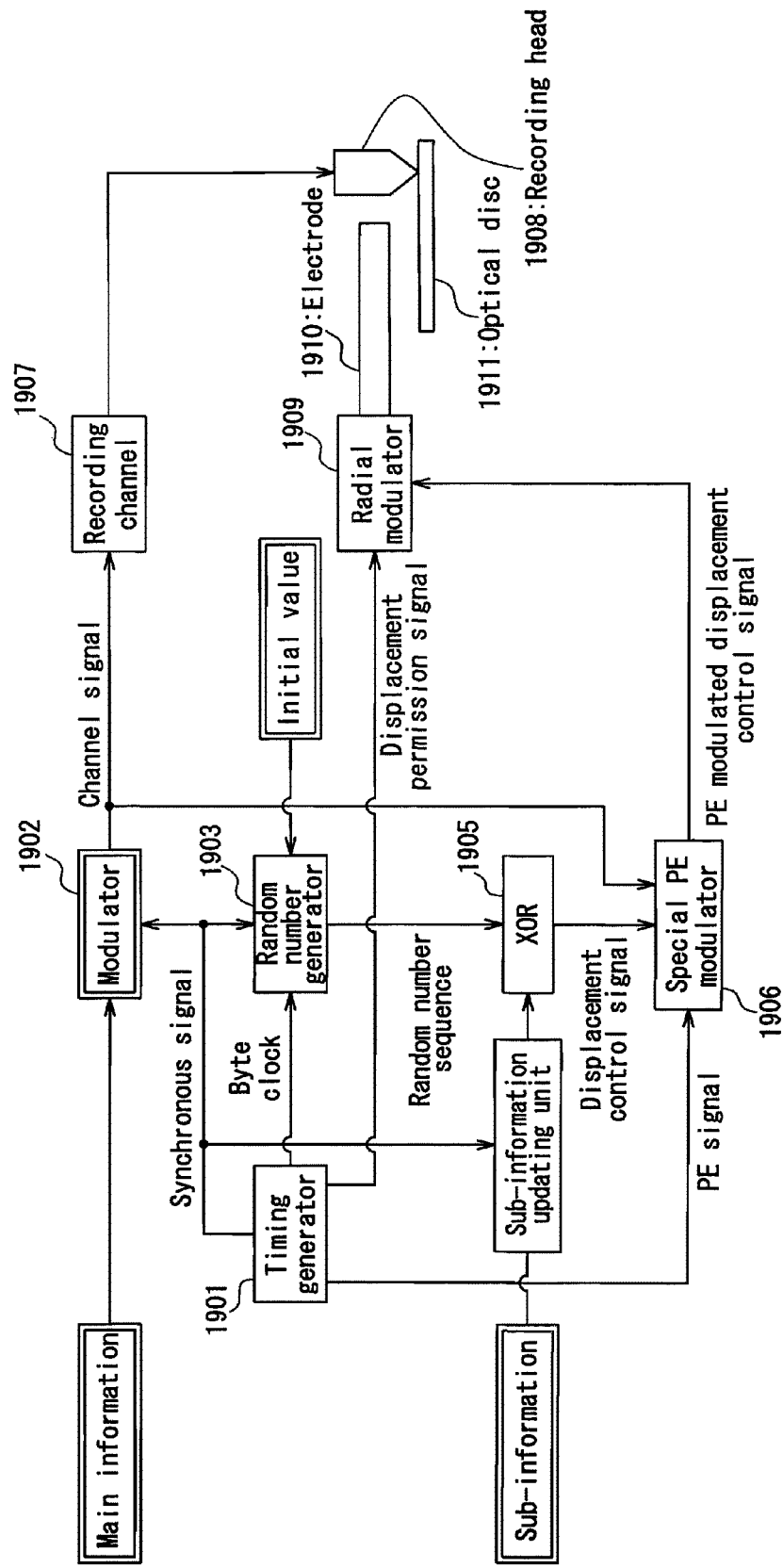
FIG. 33 is a schematic block diagram of an information recording apparatus according to Embodiment 9.

FIG. 33 is a block diagram showing a main configuration of the information recording apparatus according to this embodiment. In this information recording apparatus, main information is recorded with recording marks and sub-information is recorded so that displacement is conducted so as not to have a changing point for slight displacement in the radial direction within a recording mark. This information recording apparatus includes a timing generator 1901, a modulator 1902, a random number generator 1903, a sub-information updating unit 1904, an XOR 1905, a special PE modulator 1906, a recording channel 1907, a recording head 1908 and a radial modulator 1909.

The timing generator 1901 outputs a synchronous signal indicating a timing for inserting a synchronous code at each timing for recording a frame to the modulator 1902, the random number generator 1903 and the sub-information updating unit 1904. The timing generator 1901 also generates a byte clock that is in synchronization with 1-byte of the main information and outputs the same to the random number generator 1903 and generates a PE signal in which the first 8-bit and the second 8-bit of 1-byte main information (16-channel bit) are "High" and "Low", respectively, and outputs the same to the special PE modulator 1906.

The modulator 1902 modulates each byte of main information to 16-channel bit information (8-16 modulation) and also generates a channel signal by inserting a synchronous code at a timing of the synchronous signal from the timing generator 1901 and outputs the same to the recording channel 1907.

The random number generator 1903 is a block having the same function as that of the random number generator 403 of the information recording apparatus of Embodiment 8. The random number generator 1903 conducts initialization at a timing of a falling edge of the synchronous signal from the timing generator 1101, generates 1-bit random number sequence in synchronization with the byte clock from the timing generator and outputs the same to the XOR 1905.

The sub-information updating unit 1904 stores beforehand all sub-information bits (8 bits) in units of a sector that are to be recorded and superimposed to the main information. The sub-information updating unit 1904 generates a frame number in the sector that is currently being recorded by counting the synchronous signal from the timing generator 1901 and outputs sub-information bit-by-bit to the XOR 1905 as follows:

| | |
|---|---|
| (the 2$^{nd}$ frame, the 10$^{th}$ frame, the 18$^{th}$ frame) | 1-bit 1$^{st}$ sub-information |
| (the 3$^{rd}$ frame, the 11$^{th}$ frame, the 19$^{th}$ frame) | 1-bit 2$^{nd}$ sub-information |
| (the 4$^{th}$ frame, the 12$^{th}$ frame, the 20$^{th}$ frame) | 1-bit 3$^{rd}$ sub-information |
| (the 5$^{th}$ frame, the 13$^{th}$ frame, the 21$^{st}$ frame) | 1-bit 4$^{th}$ sub-information |
| (the 6$^{th}$ frame, the 14$^{th}$ frame, the 22$^{nd}$ frame) | 1-bit 5$^{th}$ sub-information |
| (the 7$^{th}$ frame, the 15$^{th}$ frame, the 23$^{rd}$ frame) | 1-bit 6$^{th}$ sub-information |
| (the 8$^{th}$ frame, the 16$^{th}$ frame, the 24$^{th}$ frame) | 1-bit 7$^{th}$ sub-information |
| (the 9$^{th}$ frame, the 17$^{th}$ frame, the 25$^{th}$ frame) | 1-bit 8$^{th}$ sub-information |

The XOR 1905 is configured with an exclusive OR gate, and generates a displacement control signal by calculating an exclusive OR of the random number sequence from the random number generator 1903 and 1-bit sub-information from the sub-information updating unit 1904 and outputs the same to the special PE modulator 1906.

Figure 34:
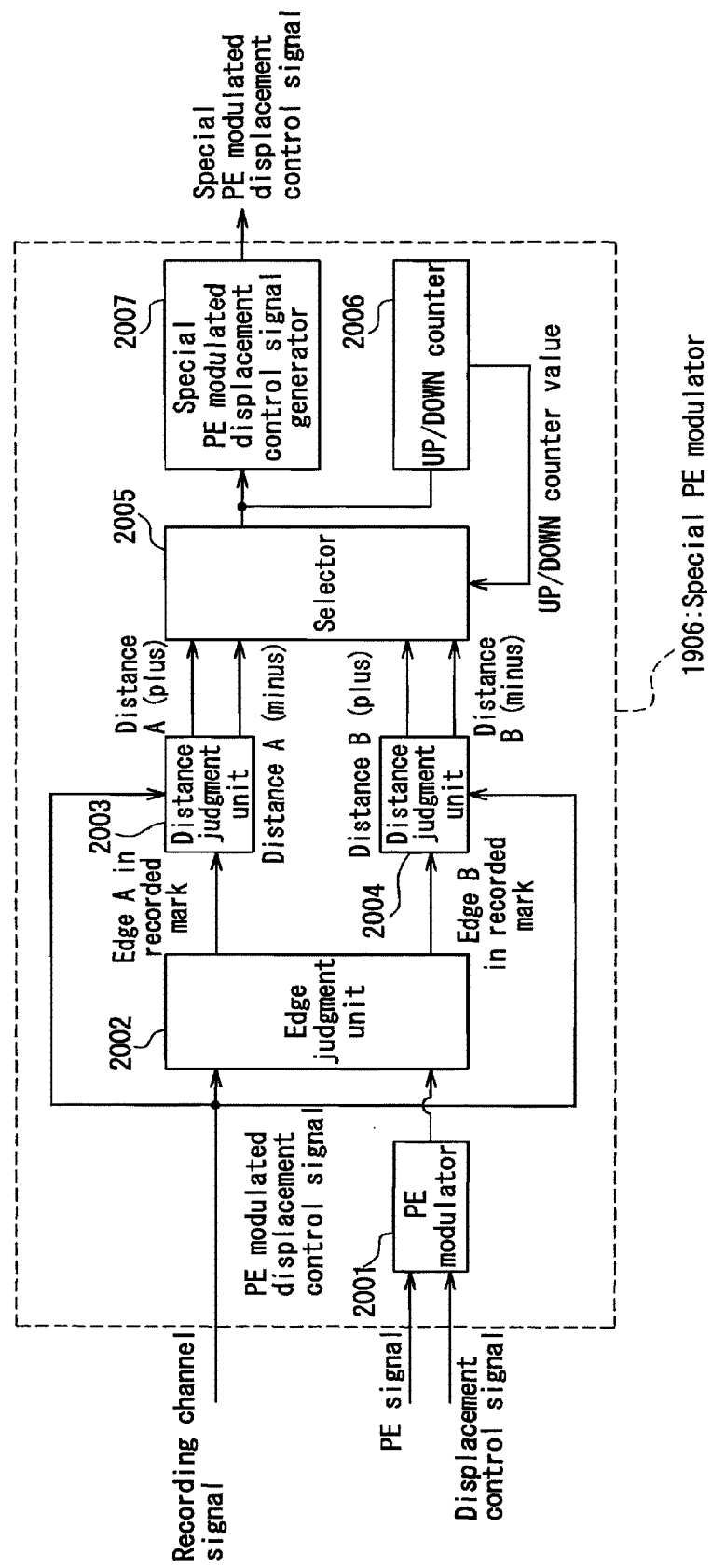
FIG. 34 is a block diagram showing the details of a special PE modulator of an information recording apparatus and an information reproducing apparatus according to Embodiment 9.

The special PE modulator 1906 is a block for applying the special PE modulation with respect to the displacement control signal from the XOR 1905 based on the PE signal from the timing generator 1901 and the channel signal from the modulator 1902. FIG. 34 shows a detailed block configuration of the same.

This special PE modulator 1906 includes a PE modulator 2001, an edge judgment unit 2002, a distance judgment unit 2003, a distance judgment unit 2004, a selector 2005, an UP/DOWN counter 2006 and a special PE modulated displacement control signal generator 2007.

The PE modulator 2001 is a block having the same function as that of the PE modulator 405 of the information recording apparatus of Embodiment 8. The PE modulator 2001 is configured with an exclusive OR gate and generates a PE modulated displacement control signal by calculating an exclusive OR of the PE signal from the timing generator 1901 and the displacement control signal from the XOR 1905 and outputs the same to the edge judgment unit 2002.

The edge judgment unit 2002 generates an intra-recording mark PE modulated displacement control signal edge A and an intra-recording mark PE modulated displacement control signal edge B from the recording channel signal from the modulator 1902 and the PE modulated displacement control signal from the PE modulator 2001 and outputs the same to the distance judgment unit 2003 and the distance judgment unit 2004, respectively. Note here that the intra-recording mark PE modulated displacement control signal edge A indicates a rising edge position of the PE modulated displacement control signal in a section where the recording channel signal is "High", showing a portion where a recording mark is to be generated on the optical disc. The intra-recording mark PE modulated displacement control signal edge B indicates a falling edge position of the PE modulated displacement control signal in a section where the recording channel signal is "High".

From the recording channel signal from the modulator 1902 and the intra-recording mark PE modulated displacement control signal edge A from the edge judgment unit 2002, the distance judgment unit 2003 calculates a distance A (plus) from the intra-recording mark PE modulated displacement control signal edge A to a rising edge of the recording channel signal and a distance A (minus) from the intra-recording mark PE modulated displacement control signal edge A to a falling edge of the recording channel signal and outputs the same to the selector 2005.

From the recording channel signal from the modulator 1902 and the intra-recording mark PE modulated displacement control signal edge B from the edge judgment unit 2002, the distance judgment unit 2004 calculates a distance B (minus) from the intra-recording mark PE modulated displacement control signal edge B to a rising edge of the recording channel signal and a distance B (plus) from the intra-recording mark PE modulated displacement control signal edge B to a falling edge of the recording channel signal and outputs the same to the selector 2005.

Based on a value of the UP/DOWN counter 2006, which will be described later, when the value of the UP/DOWN counter is "positive", the selector 2005 outputs the distance A (minus) or the distance B (minus) to the UP/DOWN counter 2006 and the special PE modulated displacement control signal generator 2007. When the UP/DOWN counter value is "negative", the selector 2005 outputs the distance A (plus) and the distance B (plus) to the UP/DOWN counter 2006 and the special PE modulated displacement control signal generator 2007.

The UP/DOWN counter 2006 is configured with a counter with an initial counter value of 0, which counts up the distance A (plus) and the distance B (plus) and counts down the distance A (minus) and the distance B (minus).

In accordance with the distance selected by the selector 2005, when the selector 2005 selects the distance A (plus), the special PE modulated displacement control signal generator 2007 advances a rising edge position of the PE modulated displacement control signal by the distance A (plus). When the distance A (minus) is selected, the special PE modulated displacement control signal generator 2007 delays a rising edge position of the PE modulated displacement control signal by the distance A (minus). Alternatively, when the distance B (plus) is selected, a falling edge position of the PE modulated displacement control signal is delayed by the distance B (plus). When the distance B (minus) is selected, a falling edge position of the PE modulated displacement control signal is advanced by the distance B (minus).

Therefore, this special PE modulator 1906 PE-modulates a displacement control signal from the XOR 1905 and also generates a special PE modulated displacement control signal that does not have a changing point in a recording mark and whose "High" and "Low" sections are approximately the same in length, and outputs the same to the radial modulator 1907.

Figure 35:
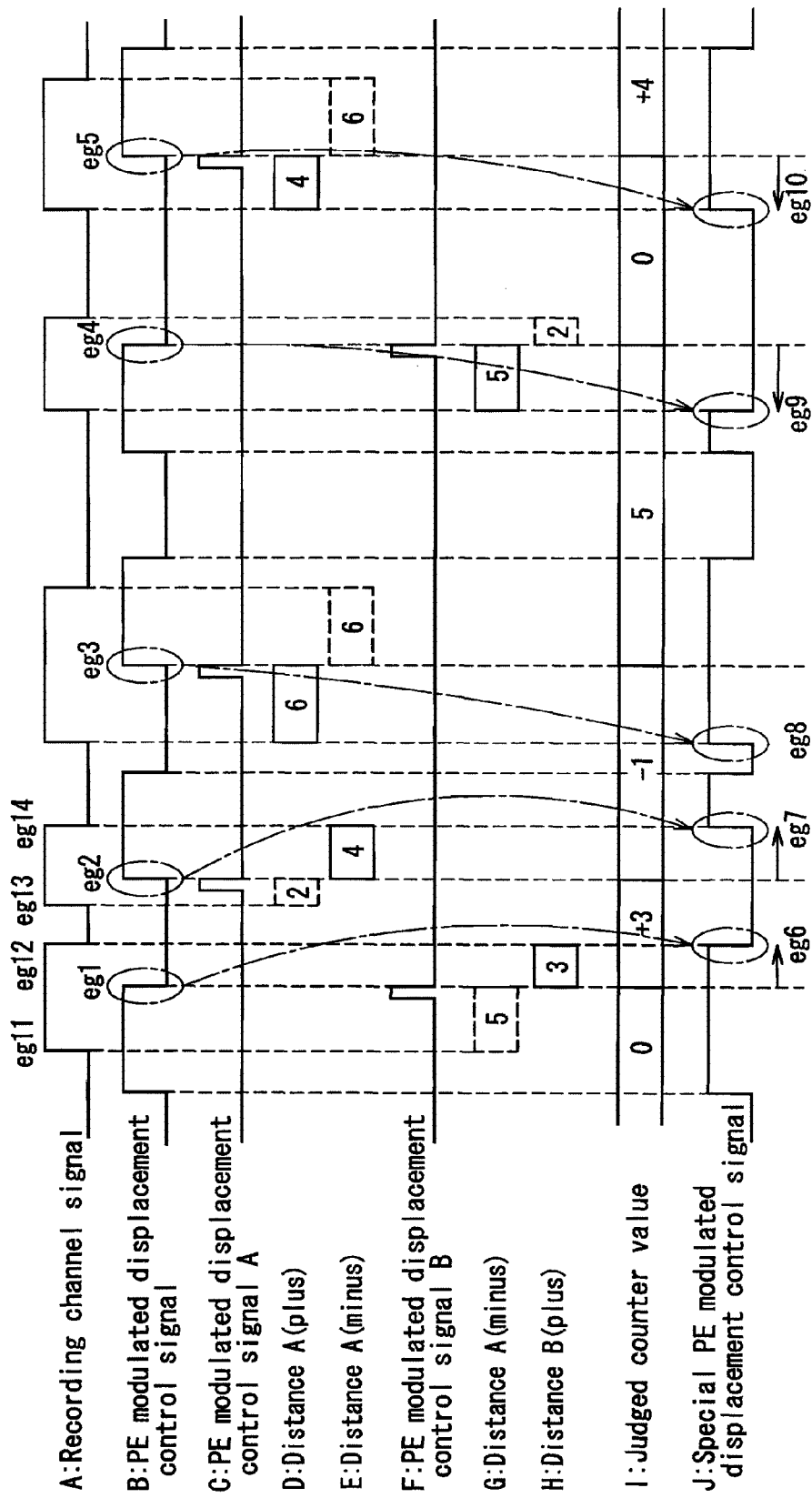
FIG. 35 is a timing chart showing an operation of the special PE modulator of the information recording apparatus and the information reproducing apparatus according to Embodiment 9.

FIG. 35 is a timing chart showing an operation by the special PE modulator 1906.

Note here that a recording channel signal (A of FIG. 35) and a PE modulated control signal (B of FIG. 35) shown in FIG. 35 become capable of being controlled according to this timing chart by delaying beforehand these signals by a sufficient time while storing the same in a shift register and the like.

The special PE modulator 1906 generates a PE modulated displacement control signal (B of FIG. 35) obtained by applying PE modulation to a displacement control signal and also generates an intra-recording mark edge A using the edge judgment unit 2002 (C of FIG. 35) indicating a rising edge of the PE modulated displacement control signal (B of FIG. 35) in a section where the recording change signal (A of FIG. 35) is "High", which shows a section where a recording mark is to be generated on the optical disc. In addition, the special PE modulator 1906 generates an intra-recording mark edge B (F of FIG. 35) indicating a falling edge of the PE modulated displacement control signal (B of FIG. 35) in a section where the recording change signal (A of FIG. 35) is "High".

The distance judgment unit 2003 extracts a distance (time) from a position indicated by the intra-recording mark edge A (C of FIG. 35) to the rising edge of the recording channel signal as a distance A (plus) (D of FIG. 35), and extracts a distance (timing) from the position indicated by the intra-recording mark edge A (C of FIG. 35) to the falling edge of the recording channel signal as a distance A (minus) (E of FIG. 35).

Similarly, the distance judgment unit 2004 extracts a distance (time) from a position indicated by the intra-recording mark edge B (F of FIG. 35) to the rising edge of the recording channel signal as a distance B (minus) (G of FIG. 35), and extracts a distance (timing) from the position indicated by the intra-recording mark edge B (F of FIG. 35) to the falling edge of the recording channel signal as a distance B (plus) (H of FIG. 35).

I of FIG. 35 indicates a counter value of the UP/DOWN counter 2006 of the special PE modulator 1906, and J of FIG. 35 indicates a special PE modulated displacement control signal that is an output from the special PE modulator 1906.

When a changing potion of the PE modulated displacement control signal is present in a section where the recording channel is "High" (i.e., present in a recording mark), this special PE modulator 1906 advances or delays the changing point to the outside of the recording mark so as to generate a special PE modulated displacement control signal that does not have a changing point in a recording mark.

As one example, a case where an edge eg1 of the PE modulated displacement control signal (B) is displaced to eg6 of the special PE modulated displacement control signal (J) will be described in detail.

Here, it is assumed that the falling edge eg1 of the PE modulated displacement control signal is present in a section of the recording mark that corresponds to 8 clocks of a recording reference clock in the recording channel signal (A of FIG. 35). Therefore, the intra-recording mark edge B indicates a position of the eg1.

When the falling edge eg1 is detected in the recording mark by the intra-recording mark edge B, "5" is generated as the distance B (minus) that indicates 5 clocks of time from the eg1 to a rising edge eg11 of the recording channel signal and "3" is generated as the distance B (plus) that indicates 3 clocks of time from the eg1 to a falling edge eg12 of the recording channel signal.

The UP/DOWN counter value (judged counter value) (I of FIG. 35) indicates "0" at the time of detecting eg1. That is to say, since the judged counter value is judged as "0", a smaller distance between the distance B (minus) and the distance B (plus), i.e., the distance B (plus) in this case, is adopted, and the eg1 is displaced to the eg6 by delaying the eg1 by 3 clocks and the distance B (plus) is added to the UP/DOWN counter value.

Next, displacement from eg2 to eg7 will be described below.

Here, it is assumed that the rising edge eg2 of the PE modulated displacement control signal is present in a recording mark that corresponds to 6 clocks. Therefore, the intra-recording mark edge A indicates a position of the eg2.

When the presence of the edge of the PE modulated control signal in the recording mark is indicated by the intra-recording mark edge A, "2" is extracted as the distance A (plus) that indicates 2 clocks of distance from the eg2 to a rising edge eg13 of the recording channel signal and "4" is extracted as the distance A (minus) that indicates 4 clocks of distance from the eg2 to a falling edge eg14 of the recording channel signal.

The UP/DOWN counter value at the timing of detecting the eg2 indicates "3", which shows to delay the eg1 by 3 clocks, that is to say, indicates a "positive" value. Therefore, the distance A (minus) is adopted, and the eg2 is displaced to the eg7 by delaying the eg2 by distance A (minus) and the UP/DOWN counter value is updated by subtracting the distance A (minus) therefrom.

Similarly, when eg3 is detected as a changing point in a recording mark, a distance A (plus)="6" from the eg3 to a rising edge of the recording channel signal is detected and a distance A (minus)="6" from the eg3 to a falling edge of the recording channel signal is detected.

Since the judged counter value indicates "−1" at the timing of detecting the eg3, the eg3 is displaced to a position eg8 by advancing the eg3 by 6 clocks, and the counter value is added by "6" so as to be updated as "5".

As stated above, in the case of DVDs having a maximum recording mark width of 11T, a value of the UP/DOWN counter 2006 of the special PE modulator is controlled within ±11, and a special PE modulated displacement control signal that does not have a changing point in a recording mark can be generated.

Based on the channel signal from the modulator 1902, the recording channel 1907 of this information recording apparatus generates a control signal for a recording beam for adjusting the strength of the recording beam and an interval of the recording beam so as to form recording marks on the optical disc, and outputs the same to the recording head 1908.

The recording head 1908 irradiates the optical disc 1911 with a recording beam based on the recording beam control signal from the recording channel 1907 so as to form recording marks, whereby main information is recorded.

The radial modulator 1909 is provided with an electrode 1910 that is charged "positively" or "negatively" in accordance with the PE modulated displacement control signal from the special PE modulator 1906 in a section where the displacement permission signal from the timing generator 1901 is "High". With this configuration, a recording beam applied from the recording head 1908 is displaced to the inner rim side or the outer rim side of the optical disc. As a result, recording marks on the optical disc are recorded so as to be displaced to the inner rim side or the outer rim side, whereby sub-information is recorded. Note here that the basic configuration concerning this portion is the same as that of the radial modulator 408 of the information recording apparatus of Embodiment 8.

Figure 36:
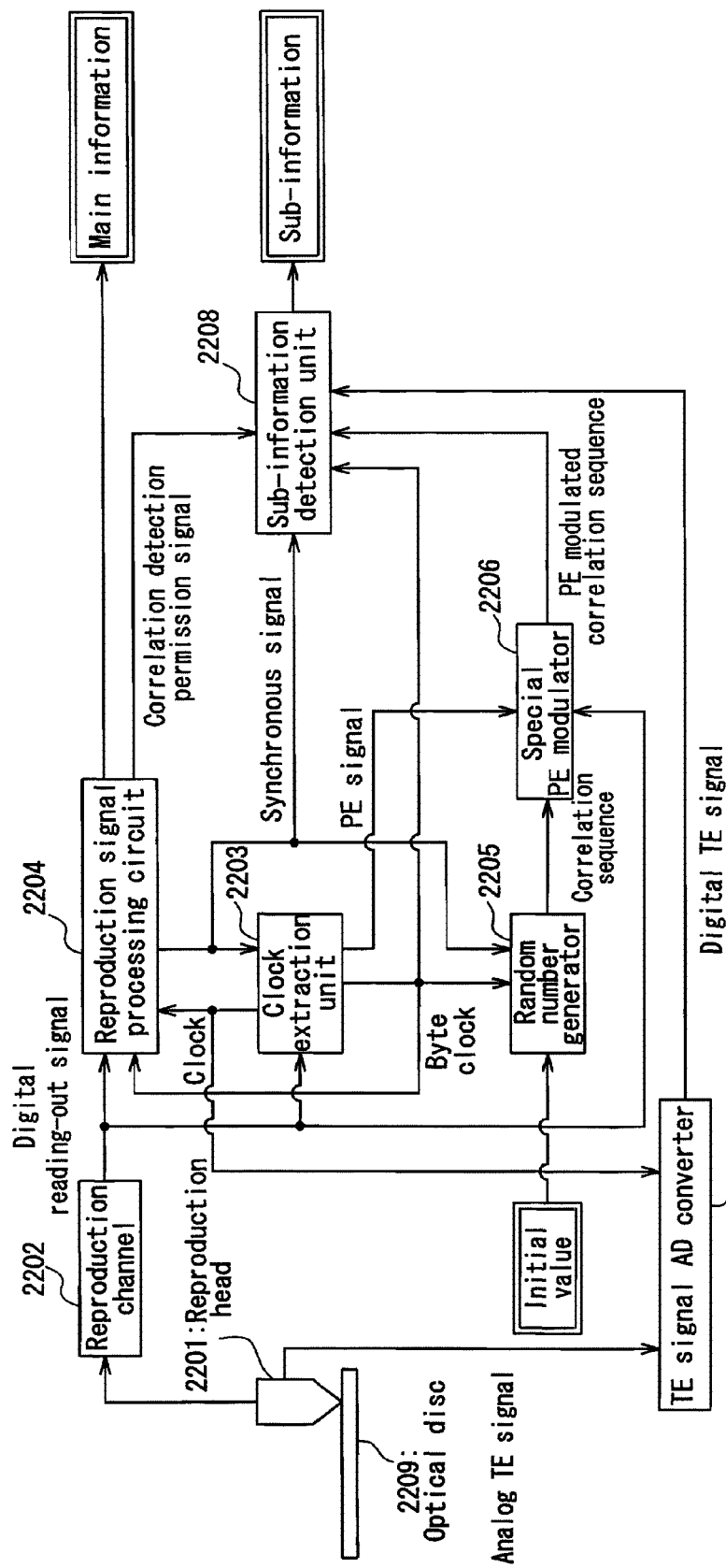
FIG. 36 is a schematic block diagram of an information reproducing apparatus according to Embodiment 9.

Next, an information reproducing apparatus according to Embodiment 9 will be described below. FIG. 36 is a block diagram showing a main configuration of the information reproducing apparatus according to this embodiment. The information reproducing apparatus according to this embodiment includes a reproduction head 2201, a reproduction channel 2202, a clock extraction unit 2203, a reproduction signal processing circuit 2204, a random number generator 2205, a special PE modulator 2206, a TE signal AD converter 2207 and a sub-information detection unit 2208.

The reproduction head 2201 irradiates an optical disc 2209 with an optical beam and generates an analog reading-out signal from the light reflected from the optical disc to output the same to the reproduction channel 2202. In addition, the reproduction head 2201 generates an analog TE signal that indicates a phase error of a recording mark to the inner rim direction or to the outer rim direction relative to the track center position and outputs the same to the TE signal AD converter 2207.

The reproduction channel 2202 amplifies the analog reading-out signal read out from the reproduction head 2201 and equalizes the waveform of the signal to generate a digital reading-out signal and outputs the digital reading-out signal to the clock extraction unit 2003 and the reproduction signal processing circuit 2204.

From the digital reading-out signal from the reproduction channel 2202, the clock extraction unit 2203 generates a clock that is in synchronization with the digital reading-out signal, and outputs the same to the reproduction signal processing circuit 2204. Also, the clock extraction unit 2203 generates a byte clock that is in synchronization with a byte unit of the above-stated digital reading-out signal and outputs the same to the reproduction signal processing circuit 2204, the random number generator 2205 and the sub-information detection unit 2208.

The reproduction signal processing circuit 2204 detects a synchronous code portion from the digital reading-out signal from the reproduction head 2202 and converts 16-bit information to 8-bit information (in the case of DVDs as in this embodiment, 8-16 modulation) in accordance with the clock and the byte clock from the clock extraction unit 2003, whereby main-information is extracted.

The random number generator 2205 is a portion having the same function as that of the random number generator 1905 of the information recording apparatus according to this embodiment, and presets an initial value that is stored in secret inside the apparatus at a timing of the synchronous signal from the reproduction signal processing circuit 2204, and generates 1-bit random number sequence at a timing of the byte clock from the clock extraction unit 2203 to output the same to the special PE modulator 2206.

The special PE modulator 2206 is a portion having the same function as that of the special PE modulator 1906 of the information recording apparatus according to this embodiment. The special PE modulator 2206 generates a special PE modulated correlation sequence that does not have a changing point from "High" to "Low" or from "Low" to "High" in a section where a recording mark is reproduced from the correlation sequence from the random number generator 2205 based on the PE signal from the clock extraction unit 2203 and the digital reading-out signal from the reproduction channel 2202, and outputs the same to the sub-information detection unit 2208.

The TE signal AD converter 2207 performs AD conversion of the analog TE signal from the reproduction head 2201 in accordance with the clock from the clock extraction unit 2203 and outputs the thus digitized digital TE signal to the sub-information detection unit 2208.

Figure 37:
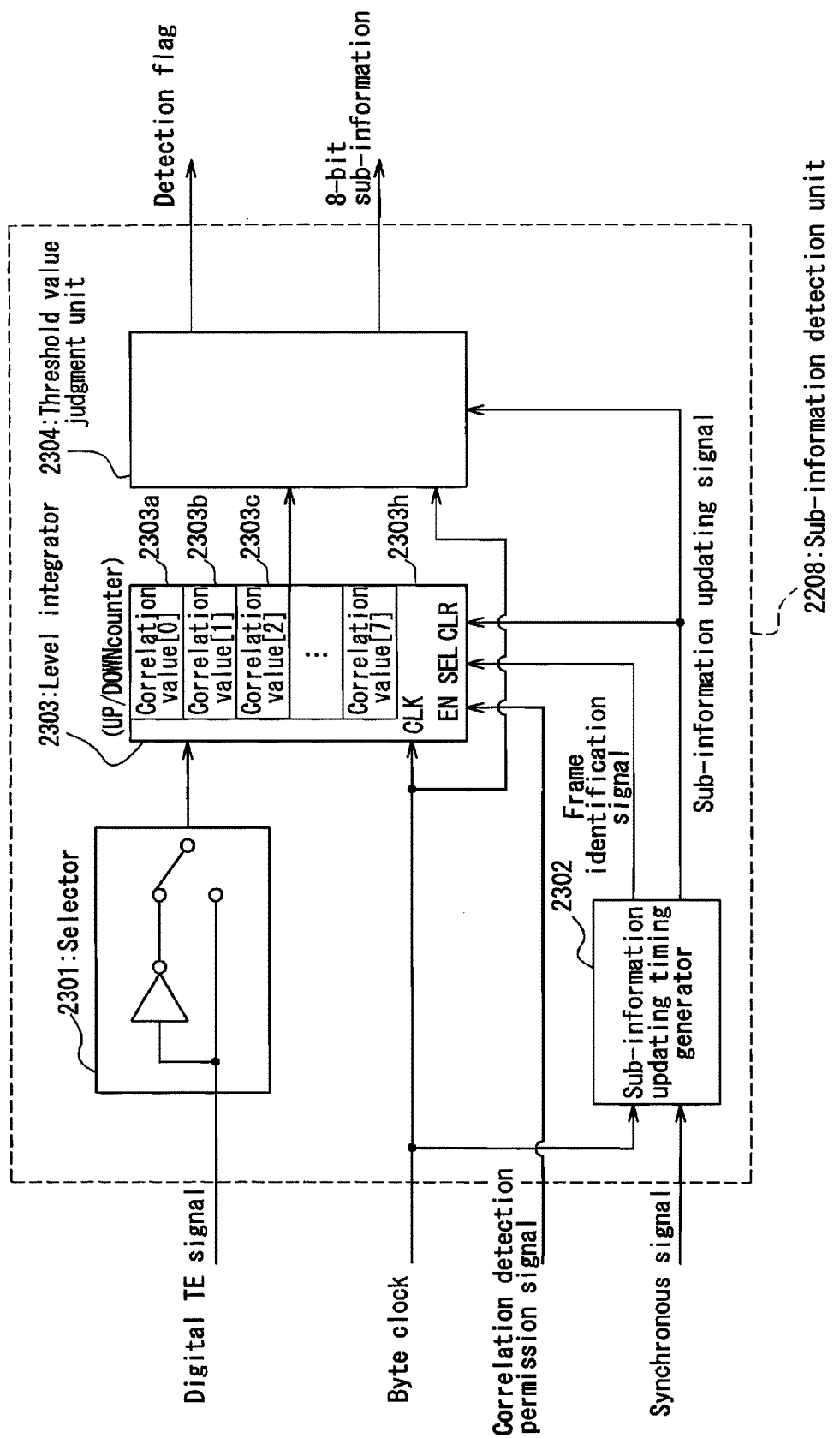
FIG. 37 is a block diagram showing the details of a sub-information detection unit of the information reproducing apparatus according to Embodiment 9.

The sub-information detection unit 2208 detects sub-information from the synchronous signal from the reproduction signal processing circuit 2204, the special PE modulated correlation sequence from the special PE modulator 2206 and the digital TE signal from the TE signal AD converter 2207 in accordance with the byte clock from the clock extraction unit 2203. The sub-information detection unit 2208, as shown in FIG. 37, mainly is configured with a selector 2301, a sub-information updating timing generator 2302, a level integrator 2303 and a threshold value judgment unit 2304.

When the special PE modulated correlation sequence from the special PE modulator 2206 is "High", the selector 2301 outputs the digital TE signal as it is to the level integrator 2303. Whereas, when the special PE modulated correlation sequence is "Low", the selector 2301 inverts the polarity of the digital integral value and outputs the same to the level integrator 2303.

The sub-information updating timing generator 2302 extracts positional information on a frame that is being reproduced, from the synchronous signal from the reproduction signal processing circuit 2204 and the byte clock from the clock extraction unit 2203 and outputs the same as a frame identification signal to the level integrator 2303.

The level integrator 2303 has eight storage units 2303[0] to 2303[7] within it, and integrates the inverted or not-inverted digital TE signal levels that are output from the selector 2301 based on the frame identification signal from the sub-information updating timing generator 2302, where the integration is performed so as to have the following correspondence. The digital TE signal levels that are integrated by the storage units 2303[0] to 2303[7] are output to the threshold value judgment unit 2304 as a correlation value [0] to a correlation value [7].

| | |
|---|---|
| (the 2$^{nd}$ frame, the 10$^{th}$ frame, the 18$^{th}$ frame) | storage unit 2303[0] |
| (the 3$^{rd}$ frame, the 11$^{th}$ frame, the 19$^{th}$ frame) | storage unit 2303[1] |
| (the 4$^{th}$ frame, the 12$^{th}$ frame, the 20$^{th}$ frame) | storage unit 2303[2] |
| (the 5$^{th}$ frame, the 13$^{th}$ frame, the 21$^{st}$ frame) | storage unit 2303[3] |
| (the 6$^{th}$ frame, the 14$^{th}$ frame, the 22$^{nd}$ frame) | storage unit 2303[4] |
| (the 7$^{th}$ frame, the 15$^{th}$ frame, the 23$^{rd}$ frame) | storage unit 2303[5] |
| (the 8$^{th}$ frame, the 16$^{th}$ frame, the 24$^{th}$ frame) | storage unit 2303[6] |
| (the 9$^{th}$ frame, the 17$^{th}$ frame, the 25$^{th}$ frame) | storage unit 2303[7] |

In addition, this integrator 2303 outputs a level integral value (correlation value [0] to correlation value [7]) of each of the TE signals that are stored in the storage units 2303[0] to 2303[7] to the threshold value judgment unit 2304 in accordance with a sub-information updating timing signal output from the sub-information updating timing generator 2302 for each sector, and then clears the value (clears the value to 0).

The threshold value judgment unit 2304 compares eight integral values (correlation values) output from the level integrator 2303 with a positive threshold value and a negative threshold value that are stored beforehand inside of the unit at the sub-information updating timing so as to extract 8-bit sub-information for one sector.

In the optical disc of Embodiment 9 of the present invention, 8-bit sub-information for one sector is stored as follows by means of displacement of recording marks in the radial direction in the format shown in FIG. 31:

| | |
|---|---|
| (the 2$^{nd}$ frame, the 10$^{th}$ frame, the 18$^{th}$ frame) | sub-information [0] |
| (the 3$^{rd}$ frame, the 11$^{th}$ frame, the 19$^{th}$ frame) | sub-information [1] |
| (the 4$^{th}$ frame, the 12$^{th}$ frame, the 20$^{th}$ frame) | sub-information [2] |
| (the 5$^{th}$ frame, the 13$^{th}$ frame, the 21$^{st}$ frame) | sub-information [3] |
| (the 6$^{th}$ frame, the 14$^{th}$ frame, the 22$^{nd}$ frame) | sub-information [4] |
| (the 7$^{th}$ frame, the 15$^{th}$ frame, the 23$^{rd}$ frame) | sub-information [5] |
| (the 8$^{th}$ frame, the 16$^{th}$ frame, the 24$^{th}$ frame) | sub-information [6] |
| (the 9$^{th}$ frame, the 17$^{th}$ frame, the 25$^{th}$ frame) | sub-information [7] |

Figure 38:
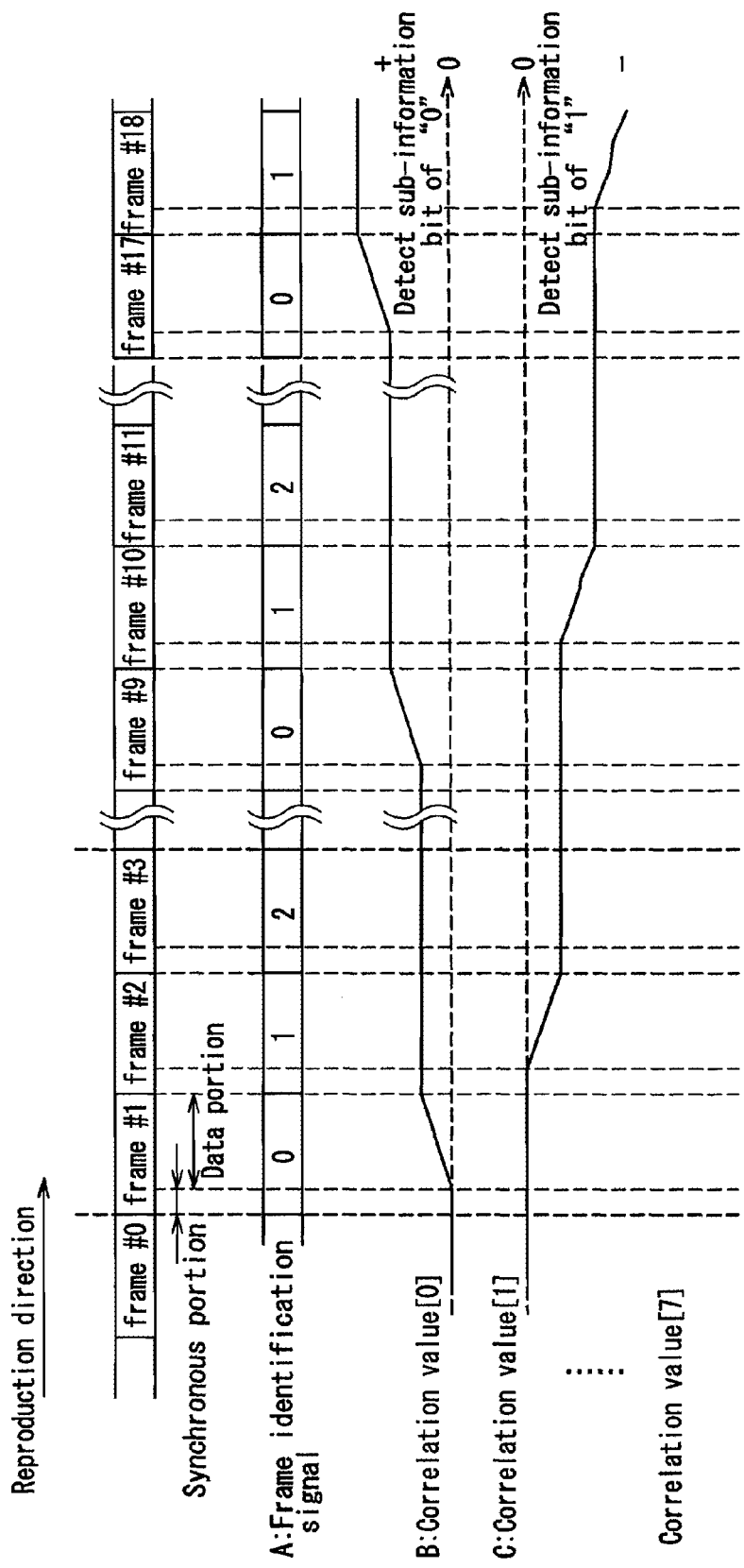
FIG. 38 is a timing chart showing the transition of an integral value of a level integrator in the sub-information detection unit of the information reproducing apparatus according to Embodiment 9.

FIG. 38 is a conceptual diagram showing correlation values calculated in this sub-information detection unit 2208.

Normally, a reproducing apparatus of optical discs reproduces a sector having a plurality of frames that are recorded in a spiral fashion from the inner rim side to the outer rim side.

This information reproducing apparatus identifies a frame number of twenty six frames in total of one sector by a synchronous code assigned to each frame, and extracts a correlation value using a storage unit in the level integrator 2303 that corresponds to each frame number.

A of FIG. 38 indicates the above-stated frame identification signal, and the following identification signals for twenty four frames except for the 1$^{st}$ frame and the final frame of a sector are output to the level integrator 2303:

| | |
|---|---|
| (the 2$^{nd}$ frame, the 10$^{th}$ frame, the 18$^{th}$ frame) | identifier [0] |
| (the 3$^{rd}$ frame, the 11$^{th}$ frame, the 19$^{th}$ frame) | identifier [1] |
| (the 4$^{th}$ frame, the 12$^{th}$ frame, the 20$^{th}$ frame) | identifier [2] |
| (the 5$^{th}$ frame, the 13$^{th}$ frame, the 21$^{st}$ frame) | identifier [3] |
| (the 6$^{th}$ frame, the 14$^{th}$ frame, the 22$^{nd}$ frame) | identifier [4] |
| (the 7$^{th}$ frame, the 15$^{th}$ frame, the 23$^{rd}$ frame) | identifier [5] |
| (the 8$^{th}$ frame, the 16$^{th}$ frame, the 24$^{th}$ frame) | identifier [6] |
| (the 9$^{th}$ frame, the 17$^{th}$ frame, the 25$^{th}$ frame) | identifier [7] |

The level integrator 2303 has eight storage units 2303[0] to 2303[7] within it, and the storage units that correspond to the identifiers integrate the inverted or not-inverted digital TE signal levels that are output from the selector 2301.

B of FIG. 38 shows a case where sub-information bit "0" is recorded by slightly displacing recording marks in the 2$^{nd}$ frame, the 10$^{th}$ frame and the 18$^{th}$ frame in the radial direction and where the special PE modulated correlation sequence is "High" and the generated digital TE signal is "positive" only or the special PE modulated correlation sequence is "Low" and the generated digital TE signal is "negative" only. In this case, in sections of the 2$^{nd}$ frame, the 10$^{th}$ frame and the 18$^{th}$ frame, the correlation value [0] of the storage unit 2303[0] increases simply toward the positive direction.

C of FIG. 38 shows a case where sub-information bit "1" is recorded by slightly displacing recording marks in the 3$^{rd}$ frame, the 11$^{th}$ frame and the 19$^{th}$ frame in the radial direction and where the special PE modulated correlation sequence is "High" and the generated digital TE signal is "negative" only or the special PE modulated correlation sequence is "Low" and the generated digital TE signal is "positive" only. In this case, in sections of the 3$^{rd}$ frame, the 11$^{th}$ frame and the 19$^{th}$ frame, the correlation value [1] of the storage unit 2303[1] decreases simply toward the negative direction.

As stated above, in the optical disc according to Embodiment 9 of the present invention, main information is recorded in units of a frame involving a synchronous code, and 1-bit sub-information is recorded for each sector unit made up of a plurality of frames by intentionally displacing recording marks in three frames that are discontinuous on the disc. Thereby, even if a burst error is present across a plurality of frames, the risk of all of the three frames in which the sub-information is recorded becoming disabled can be reduced.

In addition, the information recording apparatus according to Embodiment 9 of the present invention conducts the special PE modulation with respect to the internally generated random number sequence so that there are no changing points in recording marks. Thereby, even in the optical disc in which sub-information is recorded by slight displacement in the radial direction, displacement in the radial direction is not conducted within recording marks, which makes it difficult to find the displacement in the radial direction.

Moreover, according to the information reproducing apparatus of Embodiment 9 of the present invention, main information and sub-information can be reproduced with stability from the optical disc in which 1-bit sub-information is recorded in discontinuous three frames and there are no displacement in the radial direction within recording marks.

As stated above, in the optical disc according to this embodiment, sub-information is recorded by slightly displacing recording marks in the radial direction. Therefore, it is difficult to duplicate it onto a normal rewritable optical disc. Thus, for example, a decoding key for decoding contents to be recorded in the optical disc can be recorded as the sub-information. Moreover, a disc identifier, which is recorded in conventional DVDs by a special recording method using an expensive and high power initializer, can be recorded as this sub-information, thus reducing the manufacturing cost.

In the case of optical discs exclusively used for reproduction, exemplified by a DVD-ROM, an identifier for a stamper used for generating discs can be recorded as the sub-information.

Furthermore, in the above Embodiments 8 and 9, the initial values of the random number sequences from the random number sequence generators of the information recording apparatus and the reproducing apparatus are stored in secret in the apparatuses. Instead of this, a disc identifier that is recorded by a special recording method using an expensive and high power initializer may be set as the initial values, which can eliminate pirated edition makers who do not have this initializer.

Moreover, in the above Embodiments 8 and 9, the initial values of the random number sequences from the random number sequence generators of the information recording apparatus and the reproducing apparatus can be initialized using a sector address that is assigned for each sector unit. In this case, different initial values can be set for each sector unit, which can enhance the confidentiality of the sub-information.

In addition, the above Embodiments 8 and 9 describe the examples where the sub-information is recorded in continuous three frames or discontinuous three frames. However, the present invention is not limited to these examples. For example, optical discs in which 1-bit sub-information is recorded across a plurality of frames and recording apparatuses and reproducing apparatuses for the same are all within the technical scope of the present invention. For example, one frame may be divided into a plurality of sections (0 to N) and correlations among each of the sections 0 to N may be calculated across the plurality of frames, whereby the sub-information may be reproduced.

Furthermore, the above Embodiments 8 and 9 describe the examples where the initial value of the random number sequence generator is stored in secret inside the block. However, the present invention is not limited to these examples. For example, an identifier specific to each optical disc may be used as the initial value of the random number sequence, whereby recording marks can be recorded by displacement in the radiation direction that is specific to each optical disc medium.

Moreover, as the initial value of the random number sequence, for example, key information that is output as a result of the apparatus nullifying procedure can be used. In this case, an apparatus for recording or reproducing the sub-information also can be nullified.

In addition, address information recorded in the optical disc and an encrypted contents key can be used as the initial value of the random number sequence.

Furthermore, since the initial value of the random number sequence is the most important information for protecting the sub-information from improper action, it can be considered that the initial value is generated in secret inside the apparatus.

Embodiment 10

The following describes Embodiment 10 of the present invention in detail, with reference to the drawings.

An optical disc according to Embodiment 10 is the same as the above-described Embodiments 8 and 9 in that main information is recorded with recording marks and sub-information is recorded by slightly displacing (wobbling) the recording marks in the radial direction. However, the optical disc according to this embodiment is different from Embodiments 8 and 9 in that a data portion of each frame in which recording marks are to be wobbled is divided into a plurality of blocks having a random length in the track direction and a wobbling period is different for each of the blocks.

When a wobbling period of recording marks is constant, the wobbling period might be detected relatively easily by observing a tracking error signal with a spectrum analyzer and the like. If the wobbling period is detected, there is a risk of the sub-information being decoded from the tracking error signal using a bandpass filter.

On the other hand, in the optical disc of this embodiment, the wobbling period is different for each block in a frame as stated above. Therefore, even when the observation is attempted with a spectrum analyzer, it becomes difficult to detect the wobbling period. This configuration can prevent a person who attempts improper duplication from decoding the sub-information.

Here, there is not need to make the wobbling periods for every blocks different from one another. As long as the irregularity such that improper detection of the wobbling period is made difficult can be kept, the wobbling periods may be common to a part of the blocks.

Figure 39:
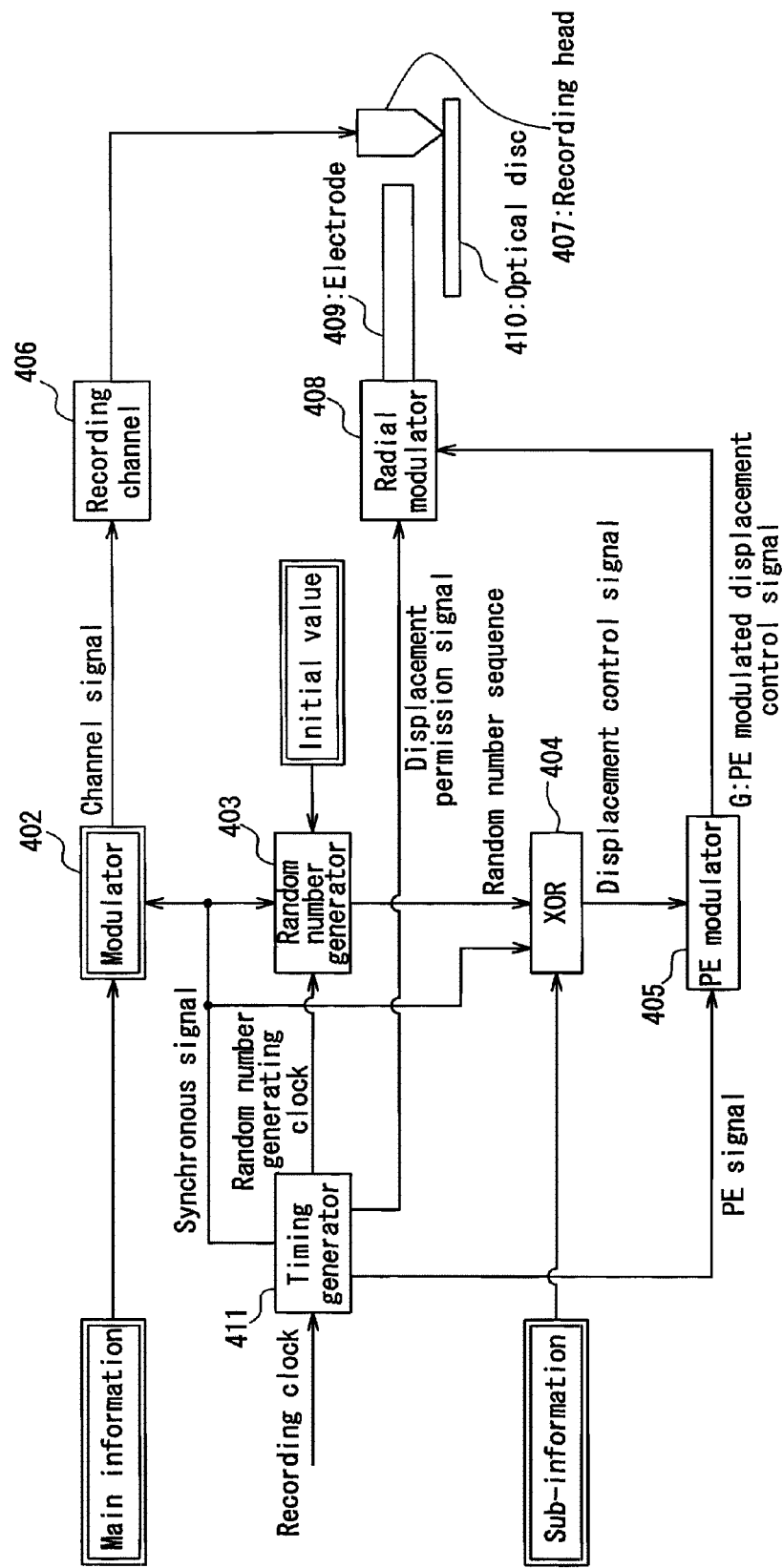
FIG. 39 is a schematic block diagram of an information recording apparatus according to Embodiment 10.

Now, referring to FIGS. 39 to 41, a configuration and an operation of an information recording apparatus according to this embodiment will be described below. As shown in FIG. 39, the information recording apparatus according to this embodiment has the same configuration as that of the information recording apparatus according to Embodiment 8 with an exception that a timing generator 411 is provided so as to output a random number generating clock, instead of the timing generator 401 that generates a byte clock. Note here that blocks having the same functions as those of the blocks described referring to Embodiment 8 are given the same reference numerals and the detailed explanation for the configuration, functions and operations will be omitted. The same applies to Embodiments 11 and 12, which will be described later.

Figure 40:
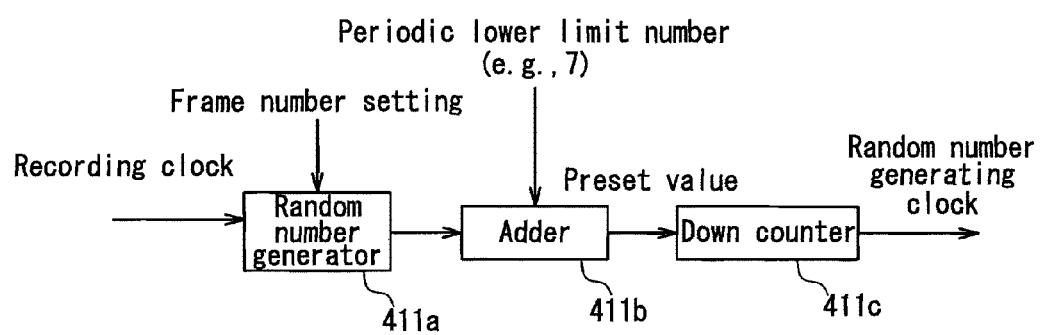
FIG. 40 is a block diagram showing a timing generator according to Embodiment 10.
Figure 41:
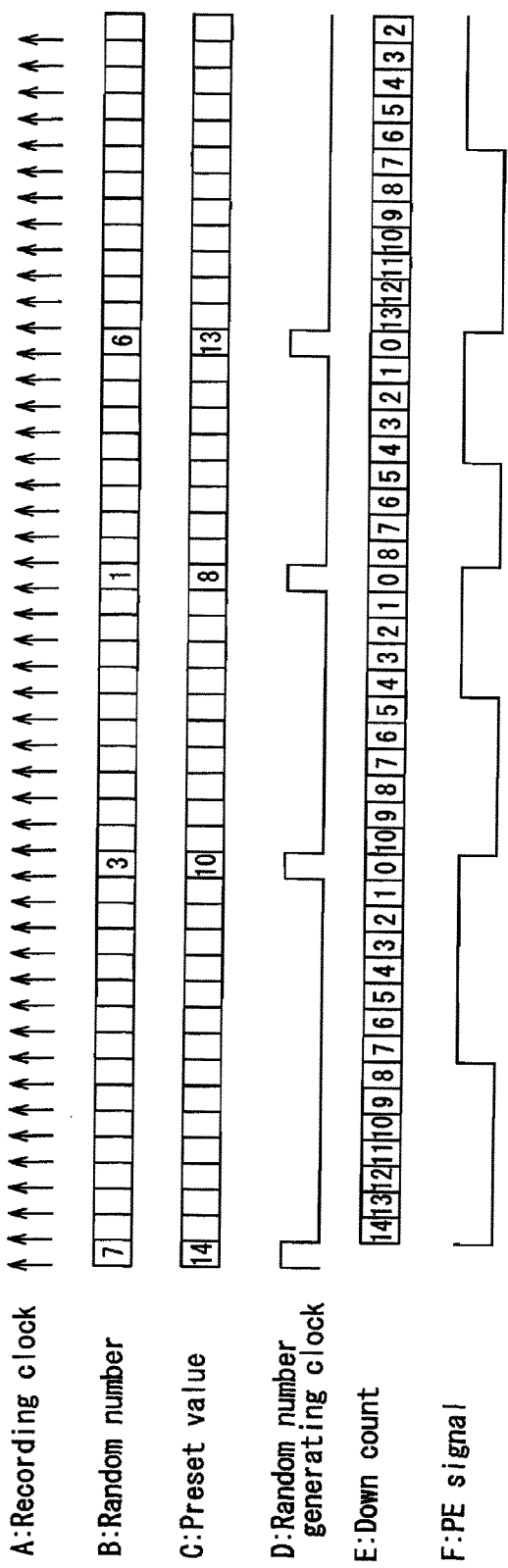
FIG. 41 is a timing chart of the information recording apparatus according to Embodiment 10.

The timing generator 411, as shown in FIG. 40, includes a random number generator 411a, an adder 411b and a down counter 411c. For the random number generator 411a, a frame number is set as an initial value of a random number sequence. The adder 411b adds a random number (B of FIG. 41) output from the random number generator 411a and a predetermined periodic lower limit number, and outputs the result to the down counter 411c as a preset value (C of FIG. 41). In the example of FIG. 41, the periodic lower limit number is set at "7". When the counter value becomes "0", the down counter 411c outputs a random number generating clock (D of FIG. 41) to the random number generator 403 and also newly sets a preset value output from the adder 411b so as to start the down count (E of FIG. 41).

Note here that a PE signal (F of FIG. 41) output from the timing generator 411 according to this embodiment is kept "Low" in the first half of a section from a position where the down counter 411c is preset to a position the counter value becomes "0" and is kept "High" in the latter half of the section. When the clock number of the section from a position where the down counter 411c is preset to a position where the counter value becomes "0" is an odd number, one of the "Low" and "High" is alternatively lengthened compared to the other by one clock. For example, in the example shown in FIG. 41, in the first section corresponding to 15 clocks, "Low" has 7 clocks and "High" has 8 clocks, and in the next section corresponding to 11 clocks, "Low" has 6 clocks and "High" has 5 clocks. Alternatively, for example, when "Low" has one more clock in the immediately previous odd-number frame, then the present odd-number frame may have "High" having one more clock.

In this way, in this embodiment, a frame whose recording marks are to be wobbled is divided into a plurality of blocks having random lengths. Then, a PE signal is generated so that sections of "Low" and "High" have approximately the same length in each block having nonuniform lengths and a PE modulated displacement control signal is generated based on the thus generated PE signal. Thereby, a wobbling period in a frame becomes random, and therefore even when the observation is attempted with a spectrum analyzer, it is difficult to detect the wobbling period. Therefore, an optical disc that makes the decoding of sub-information therein and improper duplication thereof difficult can be realized.

Next, an information reproducing apparatus according to Embodiment 10 will be described below. FIG. 51 is a block diagram showing a main configuration of the information reproducing apparatus according to this embodiment. In FIG. 51, blocks having the same functions as those of the blocks in the information reproducing apparatus according to Embodiment 8 (See FIG. 25) are given the same reference numerals as in Embodiment 8 and the detailed explanation for them will be omitted.

As shown in FIG. 51, the information reproducing apparatus according to this embodiment is different from the information reproducing apparatus according to Embodiment 8 in that the timing generator 1411 is provided instead of the random number generator 1105 and the PE modulator 1106 (See FIG. 25).

The internal configuration of the timing generator 1411 is almost the same as that of the timing generator 411 shown in FIGS. 39 and 40. However, unlike the timing generator 411, (1) an input clock is a clock reproduced by the clock extraction unit 1103 as shown in FIG. 51, and (2) a synchronous signal detected by the reproduction signal processing circuit 1104 also is input. The timing generator 1411 initializes a random number sequence in accordance with these inputs, and, as described in Embodiment 8, generates and outputs a random number generating clock.

In the information reproducing apparatus according to Embodiment 8, the PE modulated correlation sequence is input to the sub-information detection unit 1108. In the information reproducing apparatus according to this embodiment, however, a PE signal (F of FIG. 41) is input to the sub-information detection unit 1108. In the other respects, operations of the information reproducing apparatus according to this embodiment are the same as in the information reproducing apparatus of Embodiment 8.

Embodiment 11

The following describes Embodiment 11 of the present invention in detail, with reference to the drawings.

An optical disc according to this embodiment is the same as the above-described Embodiments 8 and 9 in that main information is recorded with recording marks and sub-information is recorded by slightly displacing (wobbling) the recording marks in the radial direction. However, the optical disc according to this embodiment is different from Embodiments 8 and 9 in that a frame in which recording marks are to be wobbled is divided into a plurality of blocks having a predetermined length and a period of wobbling the recording marks is different for each of the blocks.

Figure 42:
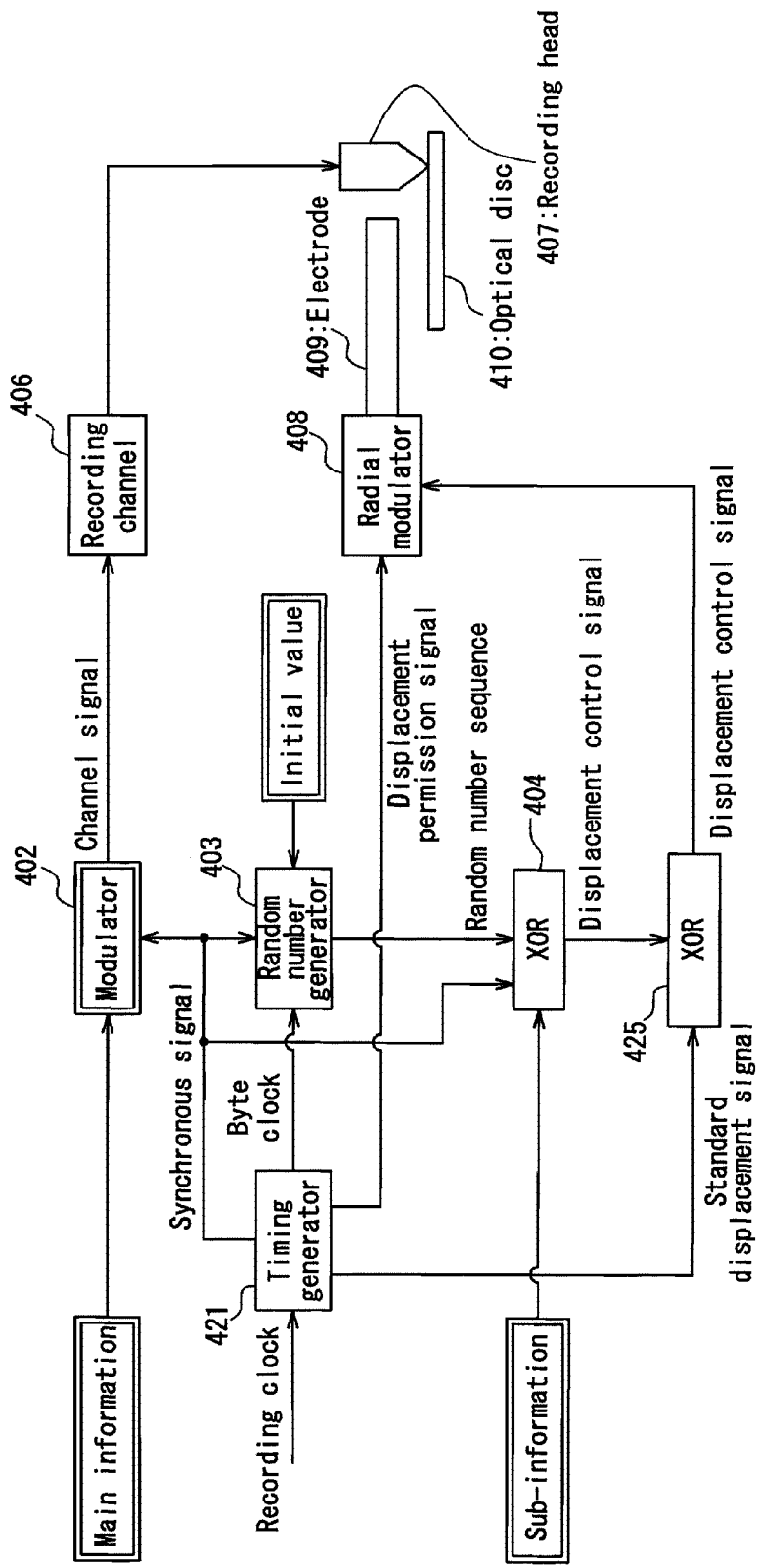
FIG. 42 is a schematic block diagram of an information recording apparatus according to Embodiment 11.

Now, referring to FIGS. 42 to 44, an information recording apparatus according to this embodiment will be described below. As shown in FIG. 42, the information recording apparatus according to this embodiment has the same configuration as that of the information recording apparatus according to Embodiment 8 with the exception that a timing generator 421 and an XOR 425 are provided instead of the timing generator 401 and the PE modulator 405.

The timing generator 421 does not generate a PE signal as in the timing generator 401 according to Embodiment 8, but generates a standard displacement signal. The XOR 425 performs an exclusive OR operation of a displacement control signal from the XOR 404 and the standard displacement signal from the timing generator 421, and outputs the result to the radial modulator 408 as a displacement control signal.

Figure 43:
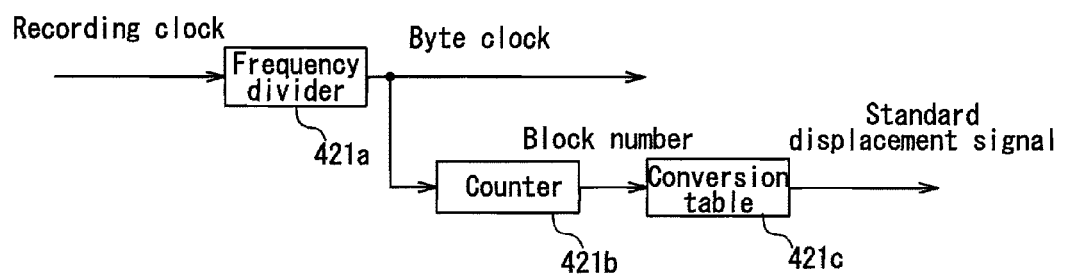
FIG. 43 is a block diagram showing a timing generator according to Embodiment 11.

The timing generator 421 of this embodiment, as shown in FIG. 43, includes a frequency divider 421a, a counter 421b and a conversion table 421c. The frequency divider 421a performs 16-frequency-division with respect to a recording clock (A of FIG. 44) to generate a byte clock (B of FIG. 44) and outputs the same to the random number generator 403 and the counter 421b. The counter 421b increments a value thereof from the initial value of "0" by one every time a byte clock is input, and outputs the same to the conversion table 421c. This counter value indicates a block number (D of FIG. 44). The conversion table 421c determines a period of a standard displacement control signal (E of FIG. 44) using the block number and the random number (C of FIG. 44). The random number C of FIG. 41 is the same as the random number sequence from the random number generator 403.

Figure 44:
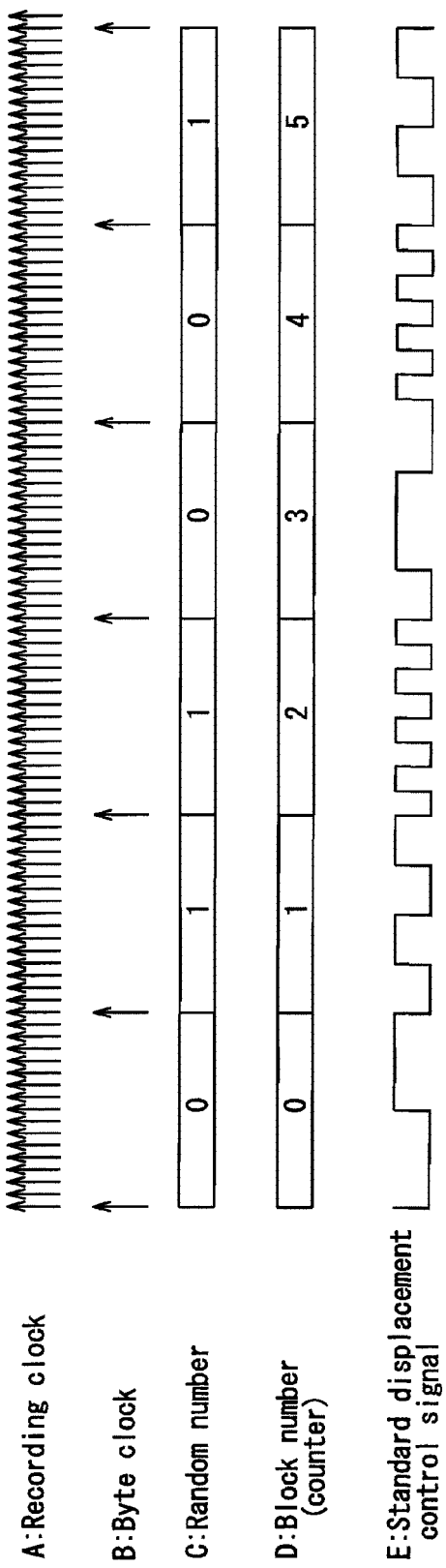
FIG. 44 is a timing chart of the information recording apparatus according to Embodiment 11.

For instance, in the example of FIG. 44, a period of the standard displacement control signal in the first block (block number: "0") is 16 T, a period of the standard displacement control signal in the second block (block number: "1") is 8 T, and a period of the standard displacement control signal in the third block (block number: "2") is 4 T. Here, in each block, a total sum of the lengths of sections where the standard displacement control signal is "Low" and a total sum of the lengths of sections of "High" are set equal to each other.

In this way, according to this embodiment, a frame in which recording marks are to be wobbled is divided into a plurality of blocks having a predetermined length, and a period of wobbling the recording marks is different for each of the blocks. With this configuration, even when the observation is attempted with a spectrum analyzer, it is difficult to detect the wobbling period. Therefore, an optical disc that makes the decoding of sub-information therein and improper duplication thereof difficult can be realized.

Figure 52:
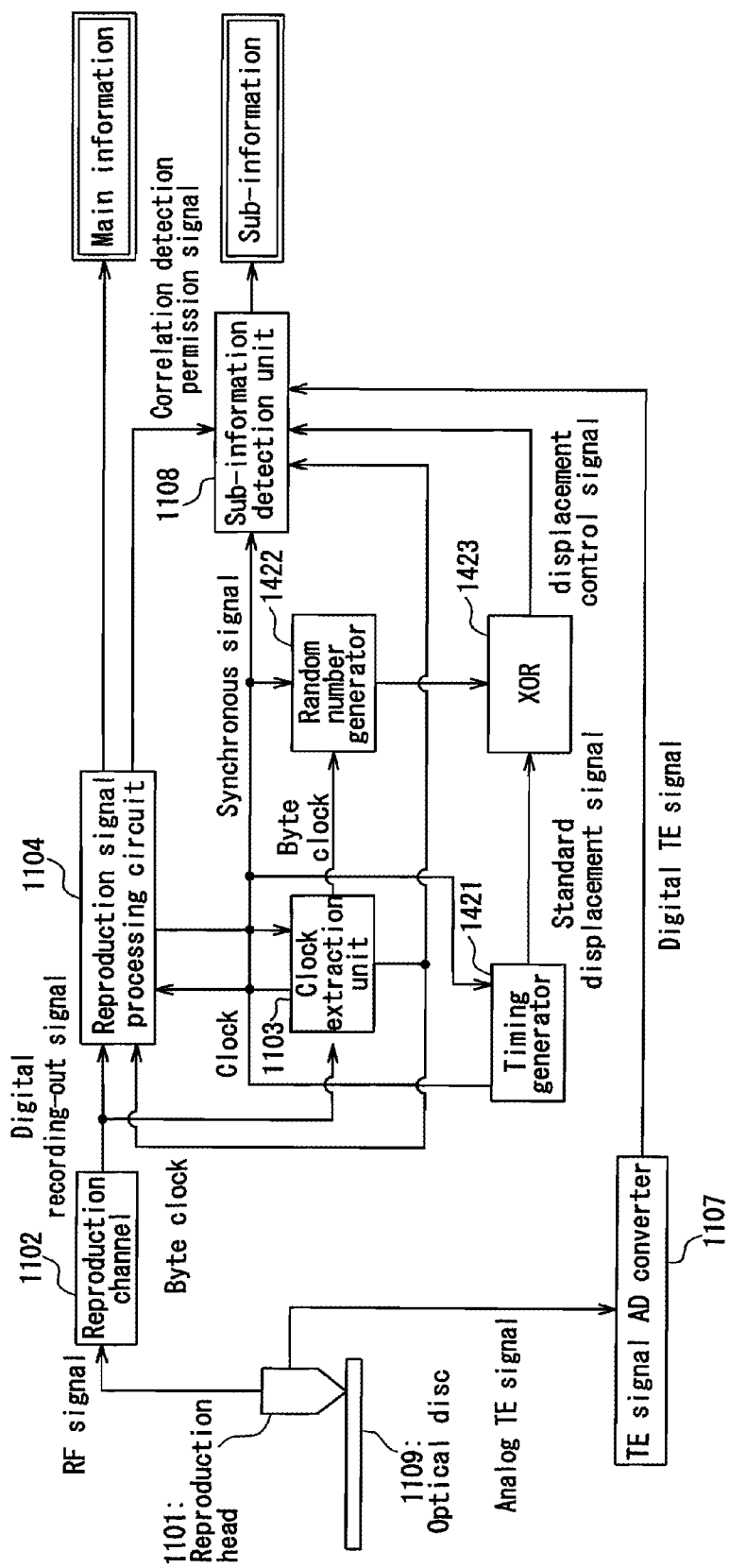
FIG. 52 is a schematic block diagram of an information recording apparatus according to Embodiment 11.
Figure 53:
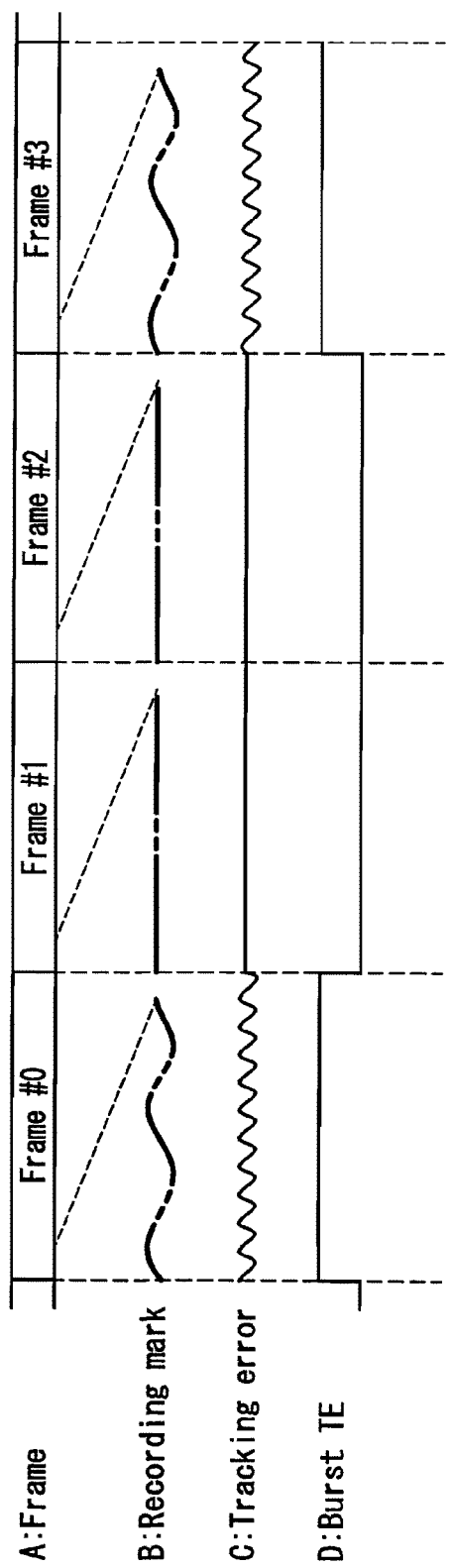
FIG. 53 is a conceptual diagram showing a state of recording marks in a conventional optical disc.

Next, an information reproducing apparatus according to Embodiment 11 will be described below. FIG. 52 is a block diagram showing a main configuration of the information reproducing apparatus according to this embodiment. In FIG. 52, blocks having the same functions as those of the blocks in the information reproducing apparatus according to Embodiment 10 (See FIG. 51) are given the same reference numerals as in Embodiment 10 and the detailed explanation for them will be omitted.

In FIG. 52, reference numeral 1421 denotes a timing generator, which has almost the same configuration as that of the timing generator 421 shown in FIGS. 42 and 43. However, unlike the timing generator 421, (1) an input clock is a clock reproduced by the clock extraction unit 1103 as shown in FIG. 52, and (2) a synchronous signal detected by the reproduction signal processing circuit 1104 also is input. The information reproducing apparatus according to this embodiment further includes a random number generator 1422 and an XOR 1423.

In the information reproducing apparatus according to Embodiment 10, a PE signal is input to the sub-information detection unit 1108. In the information reproducing apparatus according to this embodiment, however, a displacement control signal is input to the sub-information detection unit 1108, where the displacement control signal is obtained from a result of a calculation by the XOR 1423 of a random number sequence (output from the random number generator 1422) that is initialized with the synchronous signal and is updated with a byte clock and a standard displacement signal output from the timing generator 1421. In the other respects, operations of the information reproducing apparatus according to this embodiment are the same as in the information reproducing apparatus of Embodiment 10.

Embodiment 12

The following describes Embodiment 12 of the present invention in detail, with reference to the drawings.

An optical disc according to this embodiment is the same as the above-described Embodiments 8 and 9 in that main information is recorded with recording marks and sub-information is recorded by slightly displacing (wobbling) the recording marks in the radial direction. However, the optical disc according to this embodiment is different from Embodiments 8 and 9 in that a frame in which recording marks are to be wobbled is divided into n blocks having a predetermined length (n is a natural number not less than 4) and a period for wobbling the recording marks is different for every m blocks (m is a divisor of n except for 1).

Figure 45:
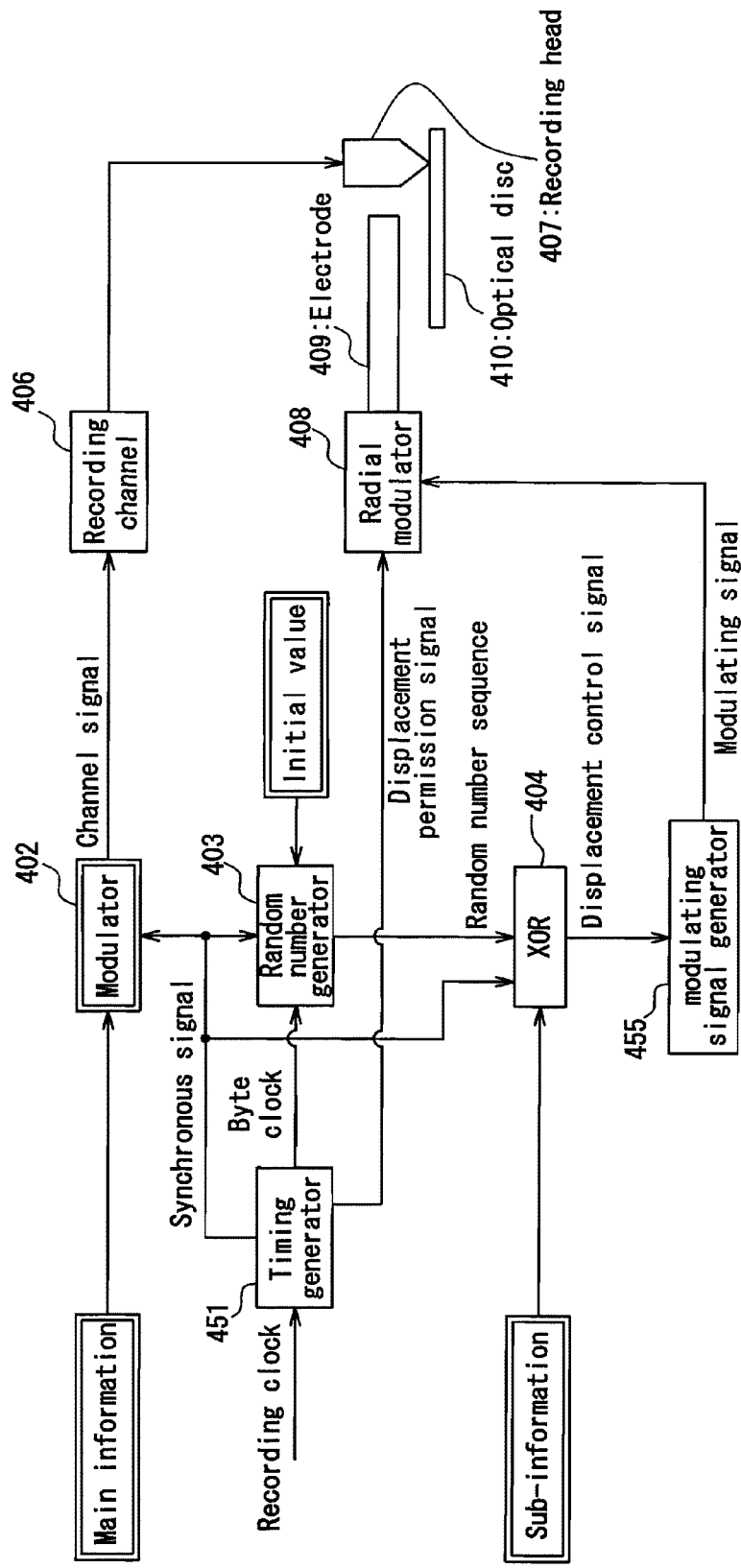
FIG. 45 is a schematic block diagram of an information recording apparatus according to Embodiment 12.
Figure 46:
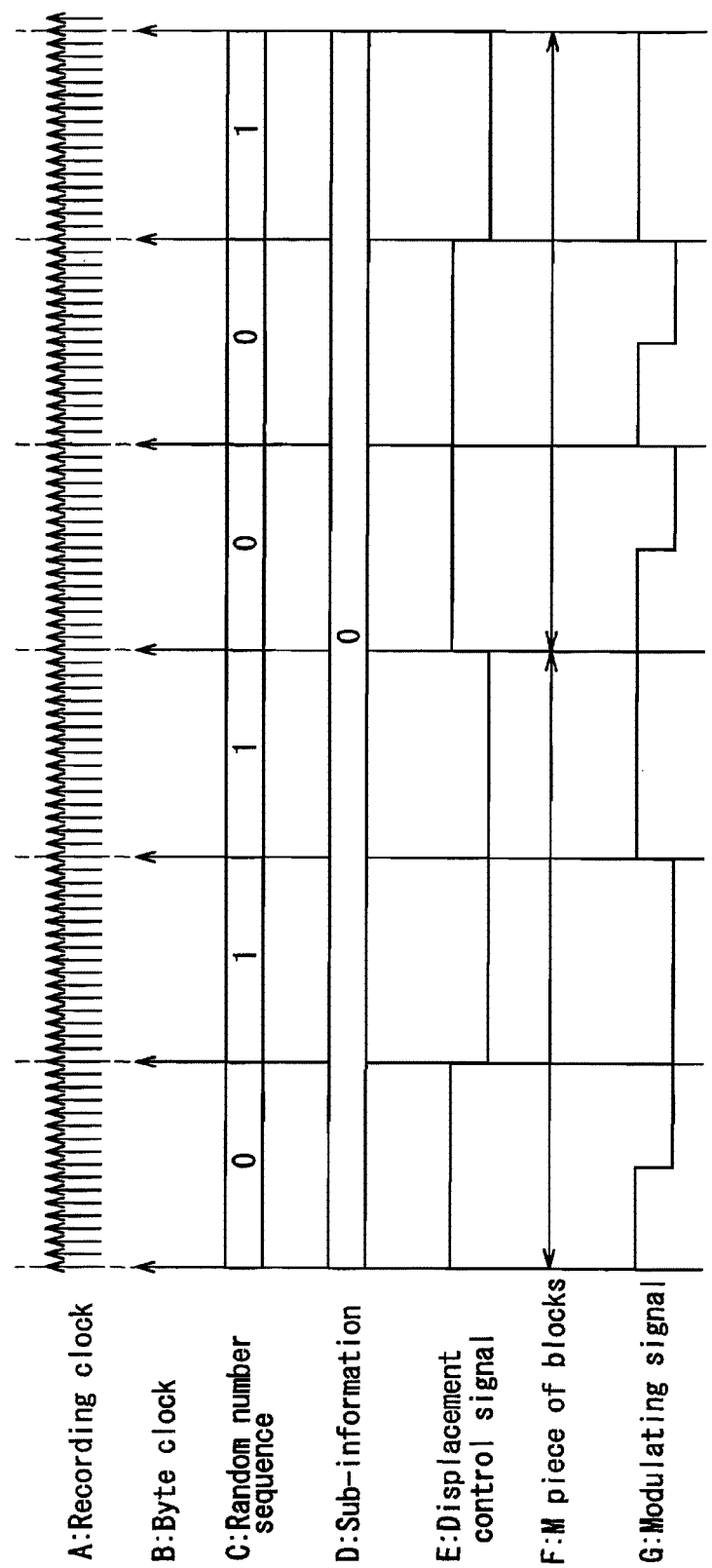
FIG. 46 is a timing chart of the information recording apparatus according to Embodiment 12.

Now, referring to FIGS. 45 to 47, an information recording apparatus according to this embodiment will be described below. As shown in FIG. 45, the information recording apparatus according to this embodiment has the same configuration as that of the information recording apparatus according to Embodiment 8 with an exception that a timing generator 451 and a modulating signal generator 455 are provided instead of the timing generator 401 and the PE modulator 405.

In the information recording apparatus of this embodiment, the timing generator 451 performs 16-frequency-division with respect to a recording cloak (A of FIG. 46) to generate a byte clock (B of FIG. 46) and outputs the same to the random number generator 403. The random number generator 403 outputs 1-bit random number sequence being "0" or "1" (C of FIG. 46) to the XOR 404. The XOR 404 calculates an exclusive OR of 1-bit sub-information that is to be recorded in the frame (D of FIG. 46) and the random number sequence from the random number generator 403 to generate a displacement control signal (E of FIG. 46) and outputs the same to the modulating signal generator 455.

The modulating signal generator 455 generates a modulating signal (G of FIG. 46) based on the displacement control signal so that a wobbling period is different for each time period including m blocks (F of FIG. 46) and a total sum of the lengths of sections where the displacement control signal is "Low" and a total sum of the lengths of sections of "High" are made equal in each time period. Here, in the example shown in FIG. 46, m equals 3 and n is a multiple of 3.

Figure 47:
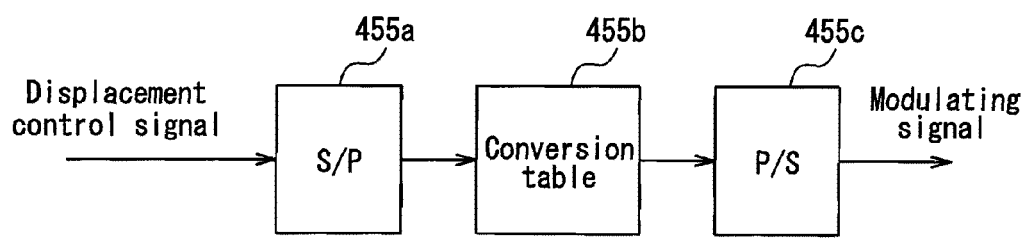
FIG. 47 is a block diagram showing a modulating signal generator according to Embodiment 12.

FIG. 47 shows one example of an internal configuration of the modulating signal generator 455. In FIG. 47, 455a denotes a serial-parallel converter, 455b denotes a conversion table and 455c denotes a parallel-serial converter.

In this way, according to this embodiment, a frame in which recording marks are to be wobbled is divided into n blocks having a predetermined length (n is a natural number not less than 4) and a period for wobbling the recording marks is different for every m blocks (m is a divisor of n except for 1). With this configuration, even when the observation is attempted with a spectrum analyzer, it is difficult to detect the wobbling period. Therefore, an optical disc that makes the decoding of sub-information therein and improper duplication thereof difficult can be realized.

Embodiment 13

Figure 48:
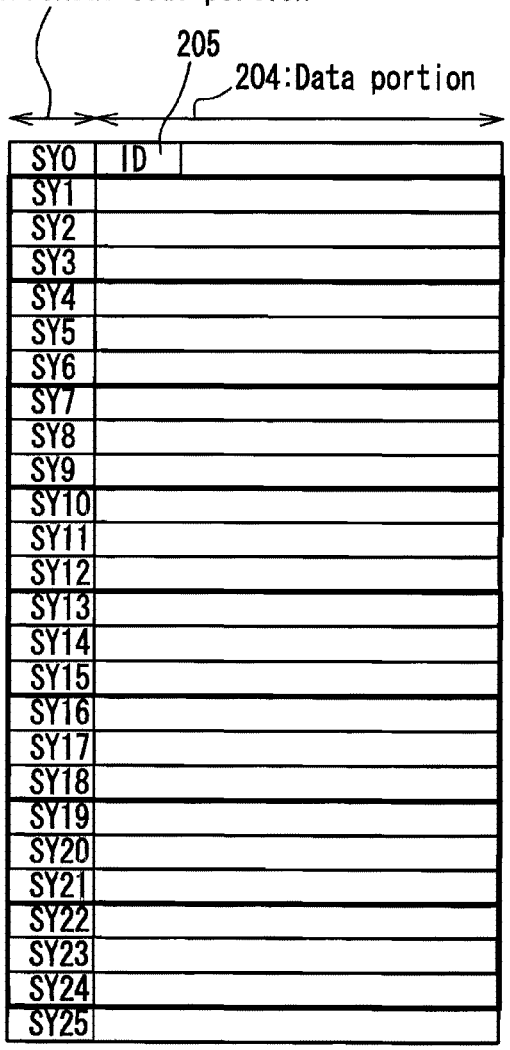
FIG. 48 is a conceptual diagram showing a recording format of sub-information according to Embodiment 13.

As shown in FIG. 48, an optical disc according to this embodiment is the same as the optical disc according to Embodiment 8 in that 1-bit sub-information is recorded by slightly displacing (wobbling) recording marks in the radial direction every three frames out of the $2^{nd}$ to the $25^{th}$ frame (#1 to #24). However, the optical disc according to this embodiment is different from Embodiment 8 in that information required for reproducing the sub-information is recorded in the $1^{st}$ frame (#0) and the $26^{th}$ frame (#25) in a period different from the wobbling period of recording marks in the $2^{nd}$ to the $25^{th}$ frames. Here, the information required for reproducing the sub-information may include CRC of the sub-information and the like, but the information is not limited to this.

As one example, when the wobbling period of recording marks in the $2^{nd}$ to the $25^{th}$ frames is set at 16 T, recording marks in the $1^{st}$ frame (#0) and the $26^{th}$ frame (#25) may be wobbled in a period of 8 T to record the CRC of the sub-information.

In this way, the information required for reproducing sub-information is recorded by wobbling recording marks in frames in which the sub-information is not recorded in a period different from the wobbling period for recording the sub-information. Thus, unless both of 16 T wobble and 8 T wobble having different frequencies are duplicated, the optical disc according to this embodiment cannot be duplicated. With this configuration, the optical disc can be protected more reliably from improper duplication.

Embodiment 14

Figure 49:
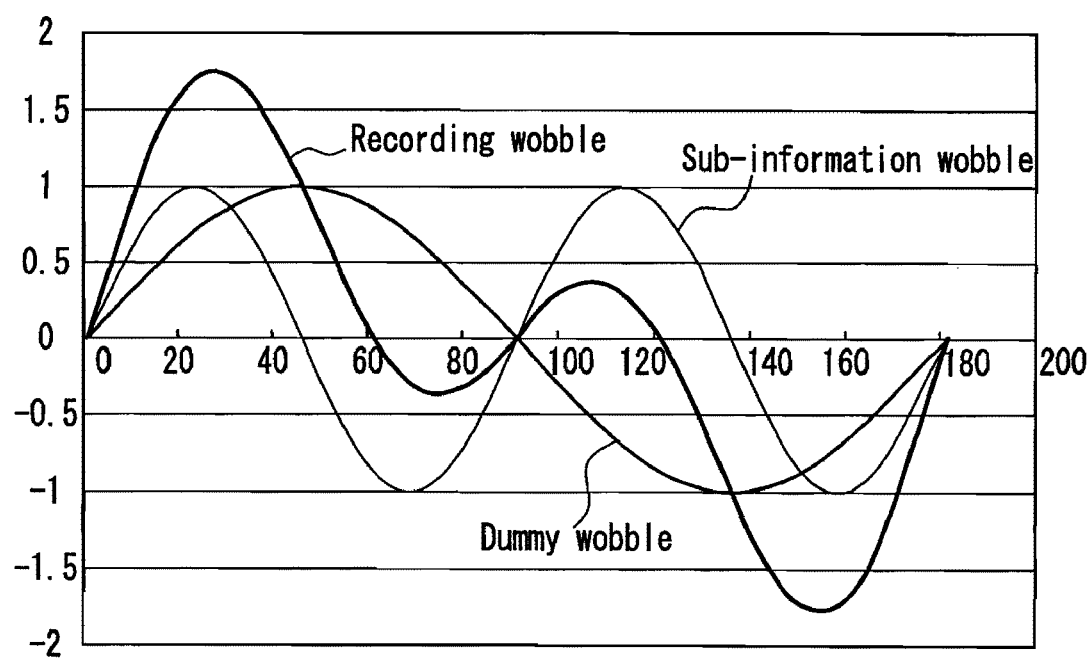
FIG. 49 explains the generation of recording wobble of sub-information according to Embodiment 14.

An optical disc according to this embodiment is the same as the optical disc according to Embodiment 8 in that sub-information is recorded by slightly displacing (wobbling) recording marks in the radial direction. However, the optical disc of this embodiment is different from Embodiment 8 in that, as shown in FIG. 49, the recording wobble is generated by superimposing a dummy wobble onto the sub-information wobble, where the dummy wobble has a phase different from the sub-information wobble.

In this way, the dummy wobble is superimposed, so that even when a tracking error signal is observed with a spectrum analyzer, it is extremely difficult to extract the wobble signal of the sub-information. Therefore, an optical disc that makes the decoding of sub-information therein and improper duplication thereof difficult can be realized.

Figure 50:
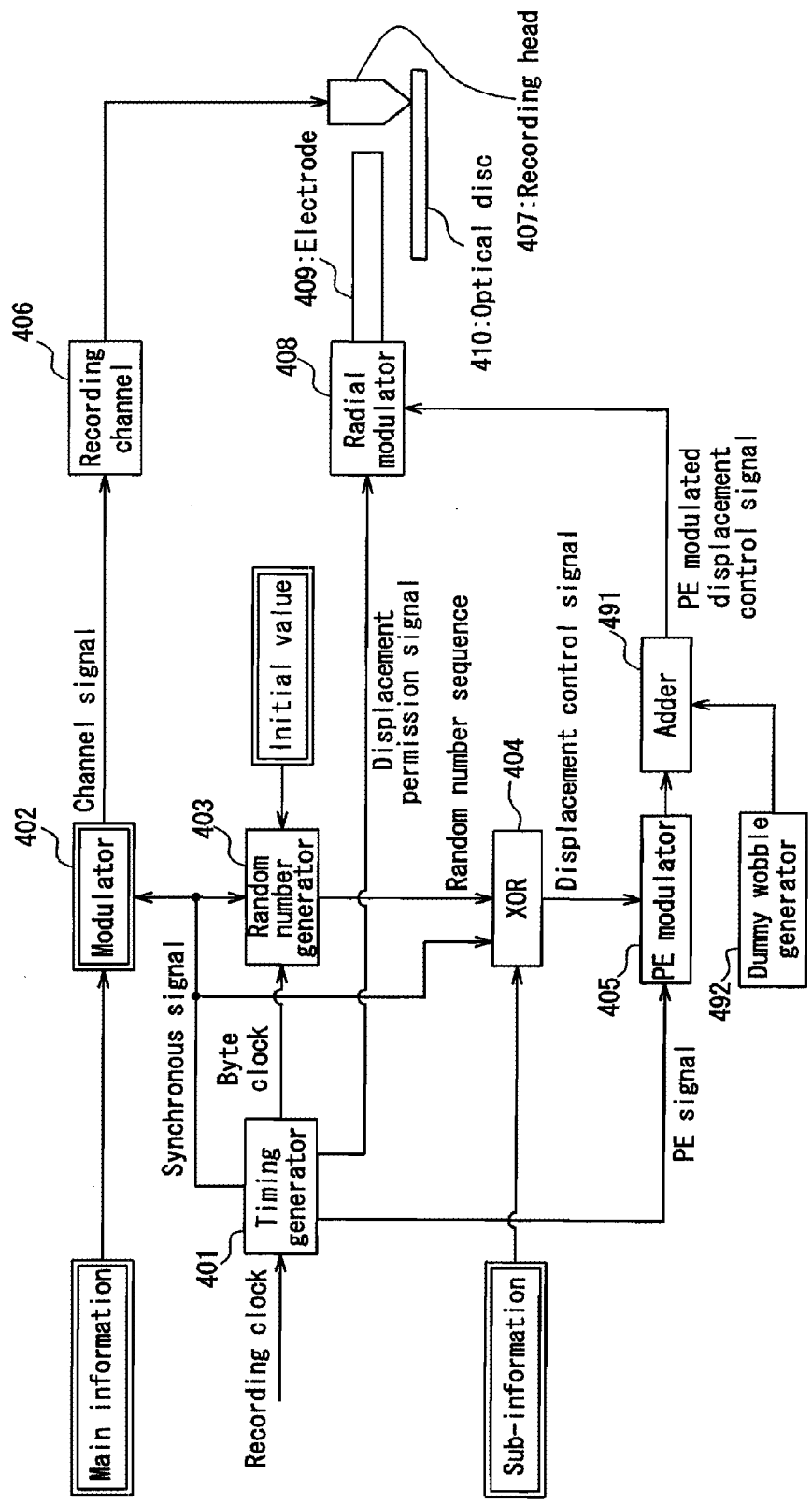
FIG. 50 is a schematic block diagram of an information recording apparatus according to Embodiment 14.

In order to generate such a recording wobble, as shown in FIG. 50, an adder 491 is provided in an information recording apparatus according to this embodiment between the PE modulator 405 and the radial modulator 408 in the information recording apparatus according to Embodiment 8 (See FIG. 18). This adder 491 can function so as to add an output from the PE modulator 405 and a dummy wobble signal from a dummy wobble generator 492 to generate the recording wobble as shown in FIG. 49.

A method for generating the dummy wobble by this dummy wobble generator 492 is disclosed only to an authorized maker of a drive, whereby the optical disc can be protected more reliably from improper duplication.

Note here that although above Embodiments 8 to 14 illustrate optical discs in which main information is recorded with recording marks, these "recording marks" include both of concave or convex marks.

Additionally, in the information reproducing apparatuses for reproduction from the optical storage media according to Embodiments 8 to 14, it is preferable to take measures for, if the optical storage medium is not judged as an authorized medium based on the reproduction result of the sub-information, issuing the output inhibition and the warning as described in Embodiment 2.

As stated above, according to the present invention, an optical storage medium and information recording/reproducing apparatuses can be provided by which an optical storage medium can be identified precisely without the degradation of storage capacity and illegal usage of the optical storage medium involving an infringement on the copyright can be prevented effectively.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical storage medium in which main information in a format including sectors, each of the sectors being provided with address information and composed of frames, each of the frames being provided with synchronous codes, is recorded as means of optically readable recording marks,
    wherein sub-information is recorded by a displacement of the recording marks in a radial direction, the displacement being implemented by forming the recording marks so as to be displaced toward an outer rim side of the optical storage medium or toward an inner rim side relative to a standard position,
    the sub-information is recorded at a portion in the sectors except an area in which a fixed pattern for frame synchronization is recorded in the synchronous codes and an area of a frame that is located at head of each sector, the displacement of the recording marks is according to a pseudo random number sequence generated based on a recording position of the synchronous code in the frame, and
    the pseudo random number sequence is generated by setting an initial value for each sector, the initial value being generated based on the address information in a sector at which the sub-information is recorded.

2. The optical storage medium according to claim 1, wherein there is no displacement from the outer rim side to the inner rim side or from the inner rim side to the outer rim side within the recording marks.

3. The optical storage medium according to claim 1, wherein an amount of the displacement of the recording marks in a radial direction is within an amount of displacement in the radial direction that is permissible in an optical disc in which the sub-information is not recorded.

4. The optical storage medium according to claim 1, wherein at least 1-bit of the sub-information is recorded by slightly displacing recording marks in a plurality of the frames in the radial direction.

5. The optical storage medium according to claim 4, wherein the plurality of frames are a group of frames that are continuously arranged on a track of the optical storage medium or a group of frames that are discretely arranged at predetermined intervals on a track.

6. The optical storage medium according to claim 1, wherein the slight displacement in the radial direction is not conducted in a specific frame and/or in a specific region of a frame.

7. The optical storage medium according to claim 1, wherein the region in which the sub-information is recorded by the slight displacement of the recording marks in the radial direction is a lead-in region in the optical storage medium.

8. The optical storage medium according to claim 1, wherein the portion in which the synchronous code is not recorded in the frame is divided into a plurality of blocks having nonuniform lengths,
    a period for slightly displacing the recording marks to the outer rim side or to the inner rim side is different for each of the blocks, and
    a length of the recording marks that are displaced to the inner rim side and a length of the recording marks that are displaced to the outer rim side are approximately equal to each other in each block.

9. The optical storage medium according to claim 8, wherein a total sum of lengths of recording marks displaced to the inner rim side and a total sum of lengths of recording marks displaced to the outer rim side in all of the frames are approximately equal to each other.

10. The optical storage medium according to claim 1, wherein the portion in which the synchronous code is not recorded in the frame is divided into a plurality of blocks having a predetermined length,
    a period for slightly displacing the recording marks to the outer rim side or to the inner rim side is different for each of the blocks, and
    a total sum of lengths of the recording marks that are displaced to the inner rim side and a total sum of lengths of the recording marks that are displaced to the outer rim side are approximately equal to each other in each block.

11. The optical storage medium according to claim 1, wherein the portion in which the synchronous code is not recorded in the frame is divided into n pieces of blocks having a predetermined length, where n is a natural number not less than 4, a period for slightly displacing the recording marks to the outer rim side or to the inner rim side is different for every m pieces of blocks, where m is a divisor of n except for 1, and a total sum of lengths of the recording marks that are displaced to the inner rim side and a total sum of lengths of the recording marks that are displaced to the outer rim side are approximately equal to each other in each block.

12. The optical storage medium according to claim 1, wherein information required for reproducing the sub-information is recorded by slightly displacing recording marks to the outer rim side or to the inner rim side in a frame in which the sub-information is not recorded.

13. The optical storage medium according to claim 12, wherein the information required for reproducing the sub-information is an error-correcting code of the sub-information.

14. The optical storage medium according to claim 1, wherein an amount of the displacement of the recording marks to the outer rim side or to the inner rim side is determined based on a signal obtained by superimposing dummy information to the sub-information.

* * * * *